United States Patent
Todeschini Hilgert et al.

(10) Patent No.: US 12,006,826 B2
(45) Date of Patent: Jun. 11, 2024

(54) AIRCRAFT ENGINE WITH OPPOSED PISTON ENGINE

(71) Applicant: HTS LLC, Houston, TX (US)

(72) Inventors: Carlos Marcelo Todeschini Hilgert, Bento Goncalves (BR); Gustavo Ludwig Schneider, Rio de Janeiro (BR)

(73) Assignee: HTS LLC, Houston, TX (US)

( * ) Notice: Subject to any disclaimer, the term of this patent is extended or adjusted under 35 U.S.C. 154(b) by 0 days.

(21) Appl. No.: 17/766,142

(22) PCT Filed: Sep. 3, 2020

(86) PCT No.: PCT/US2020/049143
§ 371 (c)(1),
(2) Date: Apr. 1, 2022

(87) PCT Pub. No.: WO2021/046180
PCT Pub. Date: Mar. 11, 2021

(65) Prior Publication Data
US 2022/0389818 A1    Dec. 8, 2022

Related U.S. Application Data

(60) Provisional application No. 62/895,435, filed on Sep. 3, 2019.

(51) Int. Cl.
*F01B 3/00*  (2006.01)
*B64D 27/02* (2006.01)
(Continued)

(52) U.S. Cl.
CPC ............ *F01B 3/0005* (2013.01); *B64D 27/04* (2013.01); *B64D 27/16* (2013.01); *F01B 3/0026* (2013.01); *B64D 27/026* (2024.01)

(58) Field of Classification Search
CPC ...... F01B 3/0026; F01B 3/0005; B64D 27/16; B64D 27/04
See application file for complete search history.

(56) References Cited

U.S. PATENT DOCUMENTS

| | | | |
|---|---|---|---|
| 4,742,683 A * | 5/1988 | Heminghous | F02B 41/10 60/624 |
| 5,031,581 A * | 7/1991 | Powell | F01B 3/045 123/56.9 |

(Continued)

OTHER PUBLICATIONS

International Search Report and Written Opinion issued for International Patent Application No. PCT/US2020/049143, dated Nov. 10, 2020, 21 pages, ISA/US.

*Primary Examiner* — Kevin A Lathers
(74) *Attorney, Agent, or Firm* — Haynes and Boone, LLP

(57) ABSTRACT

An aircraft engine has a hollow driveshaft with a spool coaxial with the driveshaft and extending through the driveshaft to rotate independently of the driveshaft. A first harmonic cam is mounted on the driveshaft and a second spaced apart harmonic cam is mounted on the spool. At least one combustion cylinder is positioned between the cams along a combustion cylinder axis that is parallel with but radially spaced apart from the driveshaft. A piston assembly is disposed in each end of the combustion cylinder, with each piston assembly engaging a separate cam. A high-pressure compressor turbine is mounted on the driveshaft and driven by movement of a piston assembly, compressing air for the combustion cylinder. A rotating component is mounted on the spool and driven by movement of the other piston assembly. The rotating component may be another compressor turbine, a drive turbine, a fan or a propeller.

24 Claims, 38 Drawing Sheets

(51) Int. Cl.
*B64D 27/04* (2006.01)
*B64D 27/16* (2006.01)

(56) References Cited

U.S. PATENT DOCUMENTS

| | | | |
|---|---|---|---|
| 5,743,220 | A | 4/1998 | Guarner-Lans |
| 6,279,520 | B1 | 8/2001 | Lowi, Jr. |
| 2012/0024147 | A1 | 2/2012 | Powell |

* cited by examiner

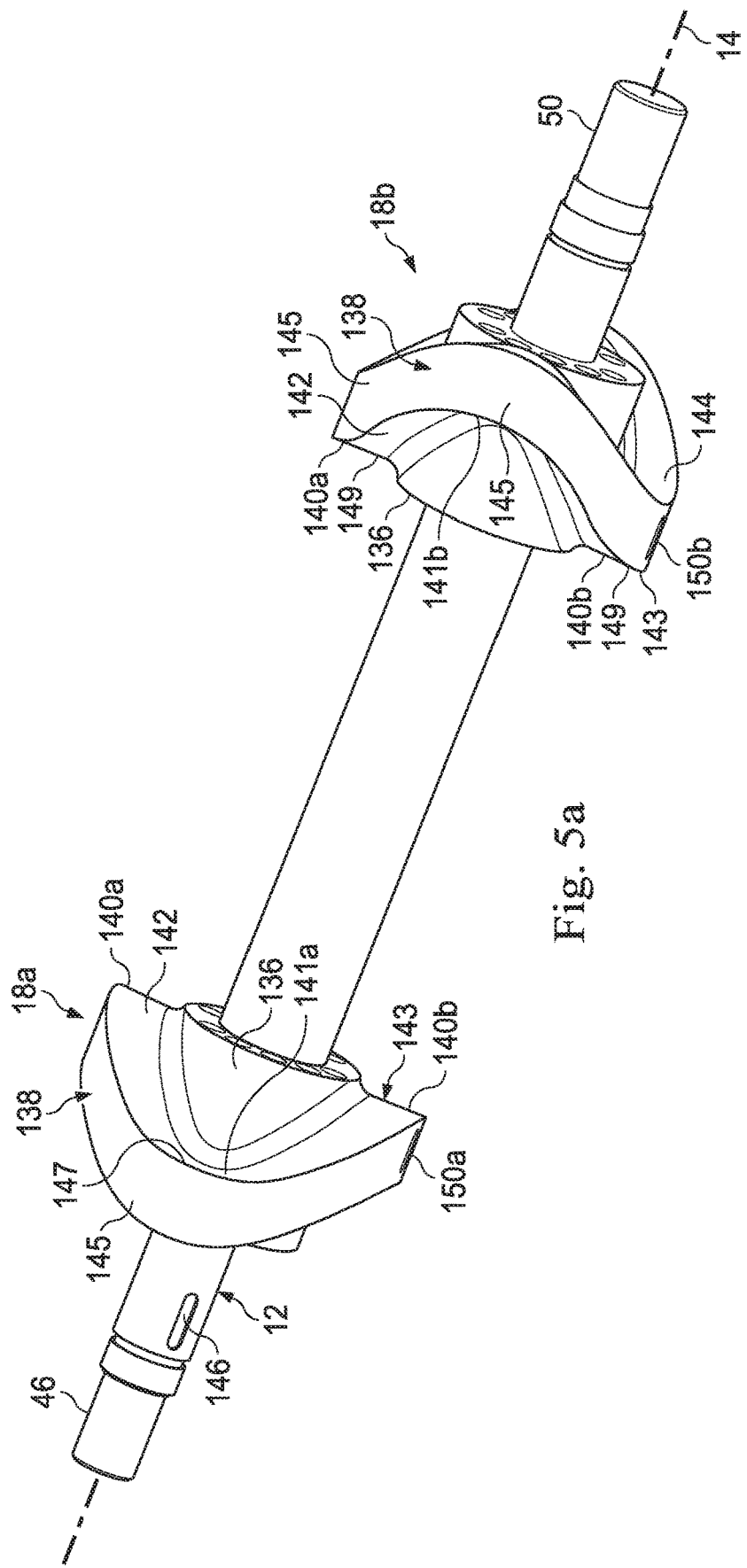

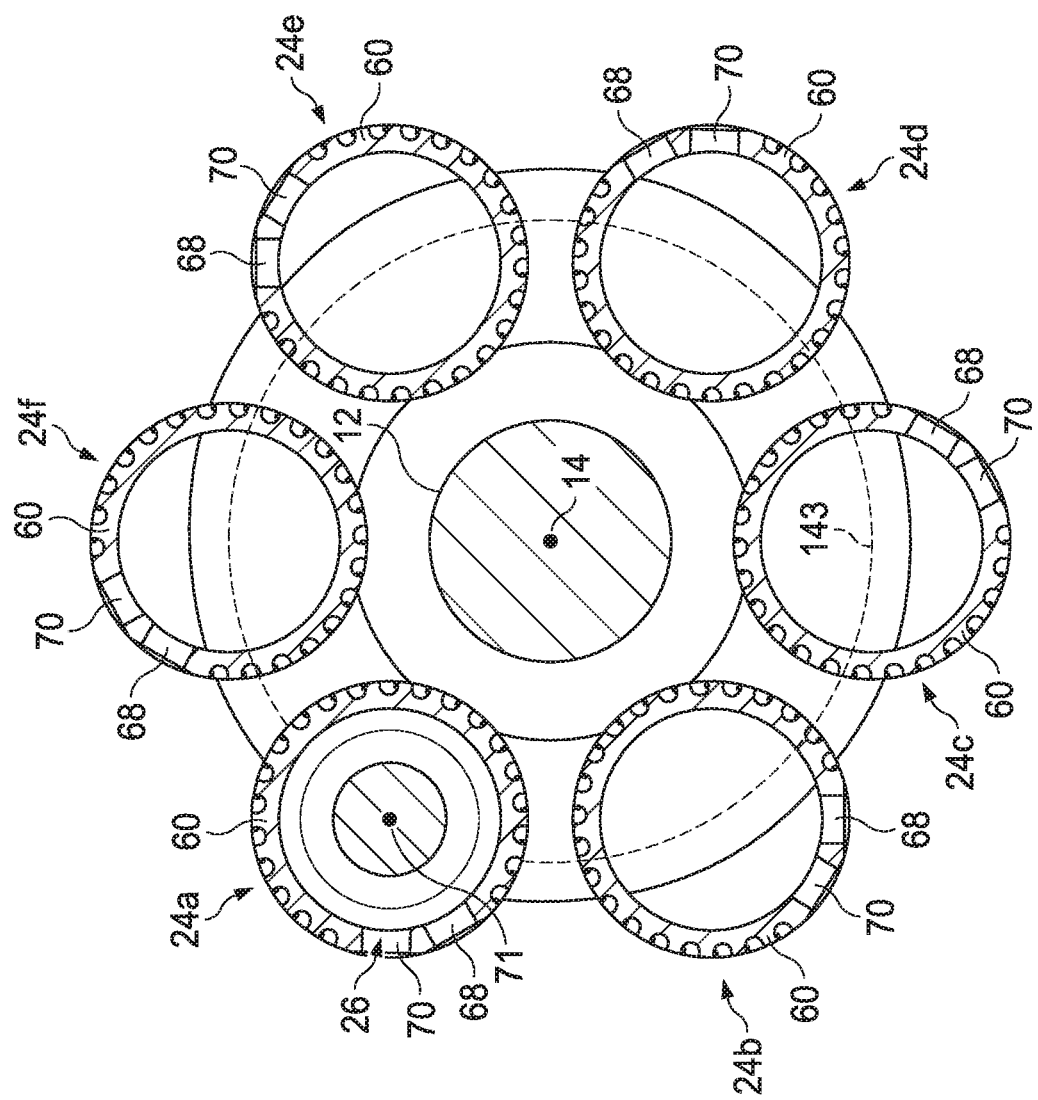

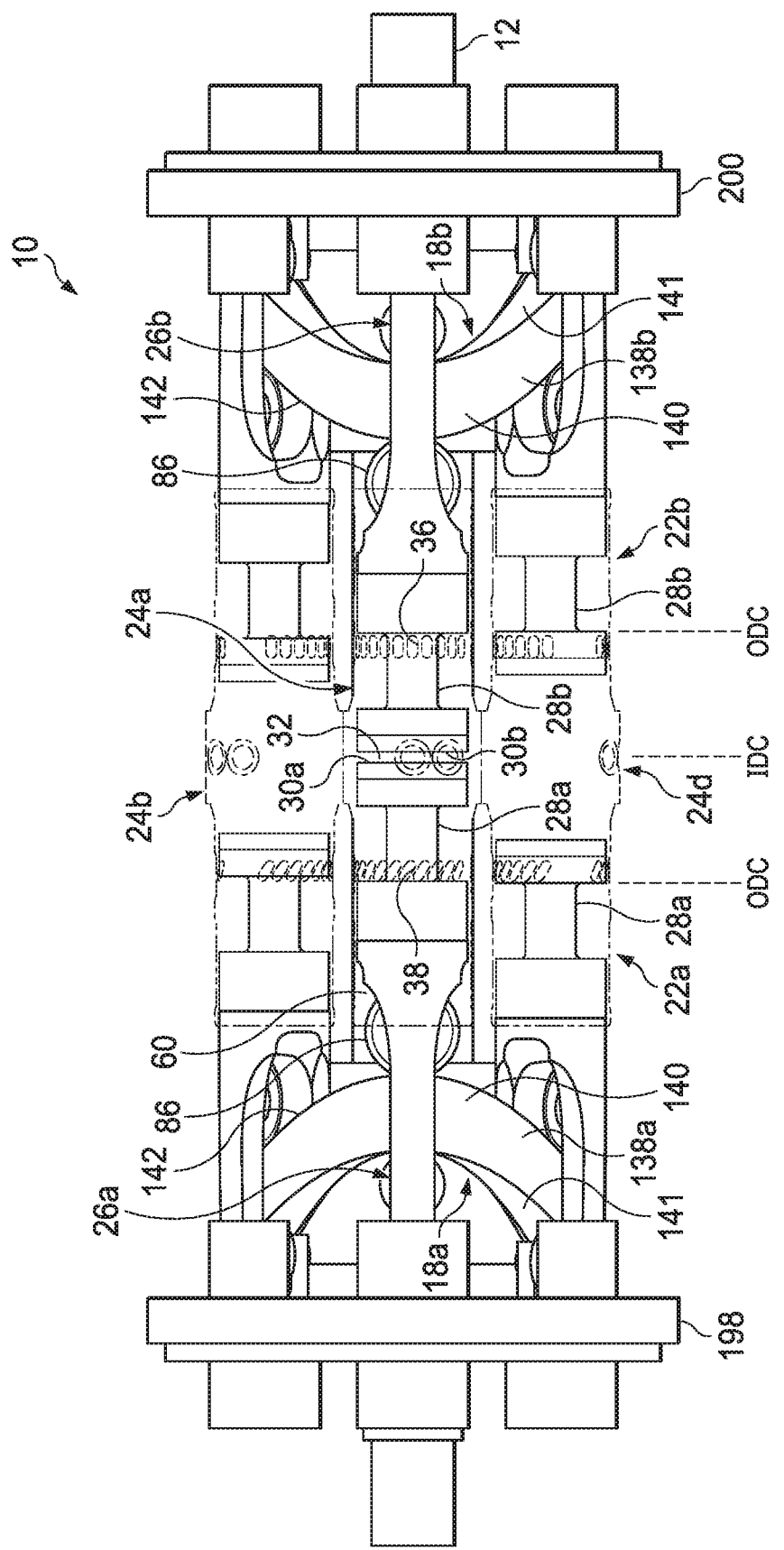

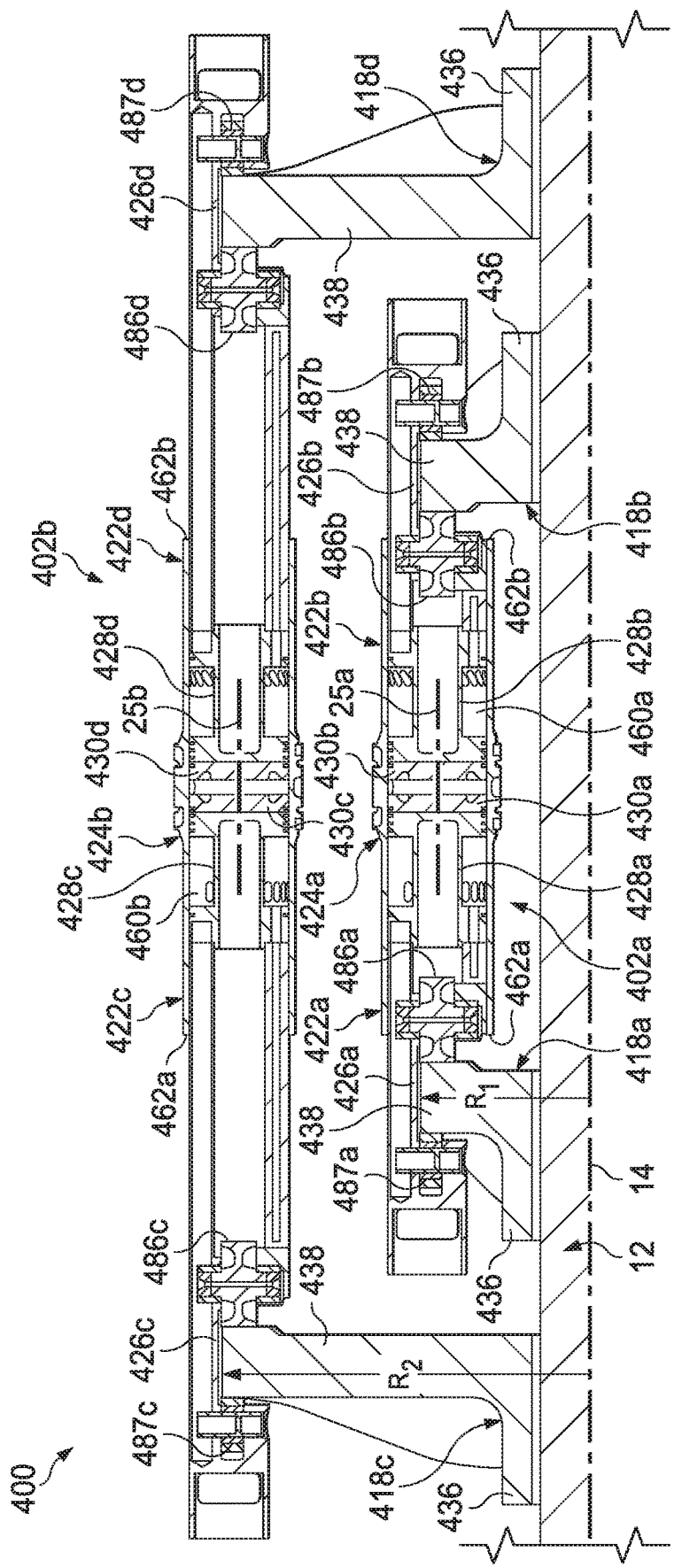

AIRCRAFT ENGINE WITH OPPOSED PISTON ENGINE

PRIORITY CLAIM

This application claims the benefit of priority to PCT/US2020/049143, filed on Sep. 3, 2020, which claims priority to U.S. Provisional Application No. 62/895,435, filed Sep. 3, 2019, the benefit of which is claimed and the disclosure of which is incorporated by reference in its entirety.

TECHNICAL FIELD OF THE INVENTION

The present disclosure relates to aircraft engines, and more particularly to an aircraft engine combining turbines with an internal combustion, opposed piston barrel engine.

BACKGROUND OF THE INVENTION

Traditional turbofan and turboprop engines at their core have a conventional gas turbine or turbojet engine with a high-pressure compressor to compress the airflow entering the core engine, in serial, axial flow relationship with a combustor in which a mixture of fuel and the compressed air is burned to generate a propulsive gas flow, and a high-pressure turbine which is rotated by the propulsive gas flow and which is connected by a large diameter shaft to drive the high-pressure compressor. A typical bypass turbofan engine adds a low-pressure turbine aft of the high-pressure turbine and may add a low-pressure compressor forward of the high-pressure compressor. In addition, the turbofan engine includes a large bypass fan located in front of the core engine. The bypass fan compresses air and passes it through a bypass duct which surrounds the core drive engine. The air compressed by the bypass fan exits the bypass duct to create thrust. For large thrust engines a turbofan is much more efficient than a turbojet engine. The bypass fan is driven by a turbine located at the exit of the core drive engine through a drive shaft which extends through substantially the full length of the core drive engine along its longitudinal center line. In addition, the core drive engine has a compressor at its inlet which is driven by another turbine located at the exit of the core drive engine through another drive shaft which extends through substantially the full length of the core drive engine along its longitudinal center line. Since these shafts are buried in the center of a turbojet engine, they become quite hot, which requires them to have expensive bearing systems and possibly even a cooling system of some type. This adds considerably to the cost of the engine.

More recently, composite cycle aircraft engines have been proposed, where the core turbojet engine is replaced with an internal combustion engine. Specifically, the high-pressure section of the engine is replaced with an in-line piston system where a plurality of pistons driven by a standard monolithic type crankshaft are arranged to reciprocate parallel to one another and generally perpendicular to an output driveshaft. The piston system tops the turbo-engine cycle at pressures and temperatures not achievable in turbofan engines. Typically, twelve piston engines drive twenty-four piston compressors in a self-contained unit. The piston system runs mechanically independently from the turbo shafts and can be placed freely within the engine core.

In such in-line piston systems, it will be appreciated that the crankshaft may include aligned main journal bearings with offset rod bearings or crankpins interconnected by webs and counterweights. Piston rods interconnect the piston heads and the rod bearings. The crankpin masses tend to bend and distort the crankshaft, causing excessive edge-loading in the main bearings. Counterweights are provided in an attempt to offset or balance the inertia effect of a relatively heavy piston and connecting rod moving in both a rotational and reciprocating fashion. Moreover, because of the asymmetrical design, such crankshafts are often subject to torsional vibrations along the length of the crankshaft and generally experience high levels of cyclical loading. However, even with counterweights, there are lateral or unbalanced forces acting on the crankshaft during operation due to the asymmetrical nature of the crankshaft. These forces can result in significant vibration to the aircraft engine, as well as the aircraft itself. To address these concerns, crankshafts, as well as the crankshaft housing and other engine components, are typically fabricated of stronger, heavier materials and the dimensions are selected to be sufficiently robust to reinforce the components of the engine and piston system so as to overcome such forces, thereby adding additional weight to the aircraft engine.

BRIEF DESCRIPTION OF THE DRAWINGS

For a more complete understanding of the present disclosure and the advantages thereof, reference is now made to the following brief description, taken in connection with the accompanying drawings and detailed description:

FIG. 5a is an elevation view of a driveshaft with harmonic barrel cams mounted thereon;

FIG. 7b is a cut away axial view of six-cylinder assemblies deployed about a driveshaft;

FIG. 8 is a perspective view of an engine block for a six-cylinder engine of FIG. 7a;

FIGS. 11a-11k illustrate the movement of pistons of a piston pair through an engine stroke.

FIG. 14a is a cut-away side view of one embodiment of a barrel engine with piston pairs deployed in parallel;

DETAILED DESCRIPTION OF THE EMBODIMENTS

Figure 1:
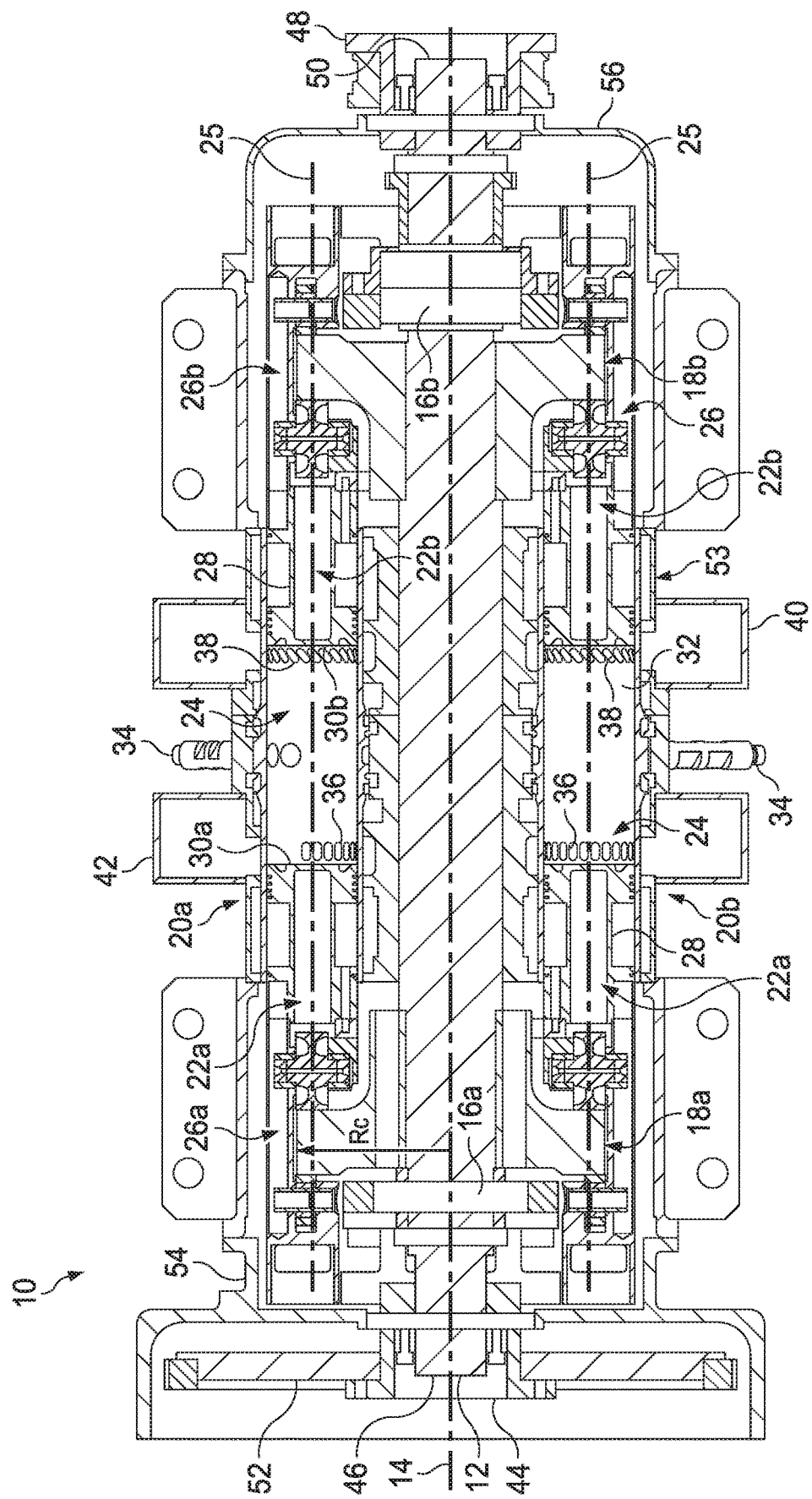
FIG. 1 is a sectional elevation view of an engine constructed according to the present invention showing the axial-cylinder, opposed-piston layout utilizing twin, double-harmonic cams.
Figure 2:
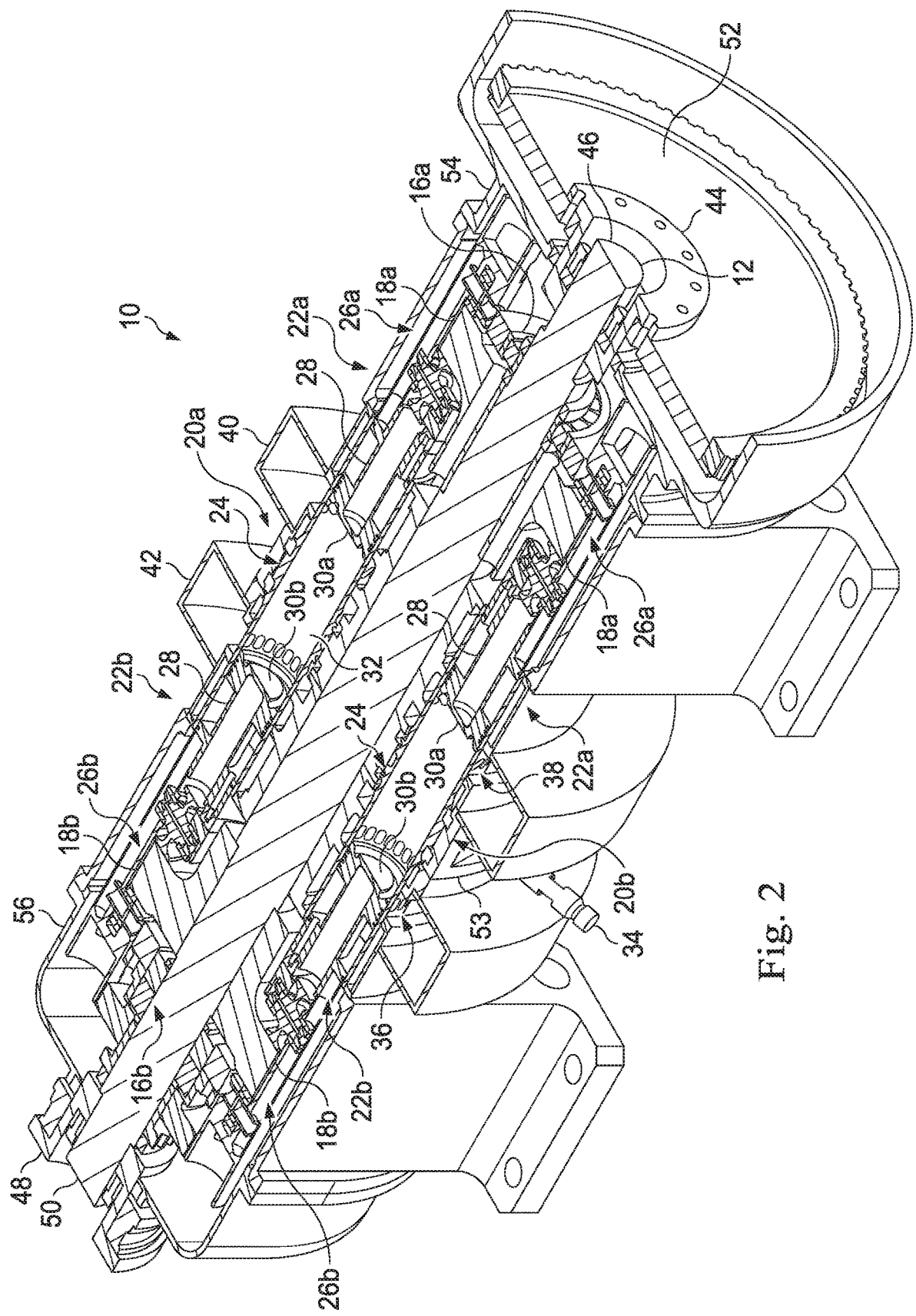
FIG. 2 is a perspective view of the engine of FIG. 1.

FIG. 1 shows a sectional elevation view of a 2-stroke engine 10 of the present invention, while FIG. 2 shows a perspective view of engine 10. Driveshaft 12 extends along a driveshaft axis 14 and passes axially through the center of the engine 10. Driveshaft 12 is supported by a pair of bearings 16a, 16b in a fixed axial position. Positioned along driveshaft 12 is at least one harmonic cam 18 with a cam radius $R_c$. In one or more embodiments, positioned along driveshaft 12 in spaced apart relationship to one another are at least two harmonic cams 18a, 18b. Positioned radially outward from driveshaft 12 is at least one combustion power assembly 20, which combustion power assembly 20 may generally be positioned adjacent the outer periphery of a cam 18 at approximately the cam radius $R_c$. Each combustion power assembly 20 includes at least one piston assembly 22 and one cam follower assembly 26. Each piston assembly 22 includes a piston 30. In one or more embodiments, each combustion power assembly 20 has a first piston assembly 22a and a second piston assembly 22b which piston assemblies 22a, 22b are axially aligned with one another within a combustion cylinder assembly 24 disposed along a combustion assembly axis 25 so that the pistons 30 with a combustion power assembly form a piston pair. In the illustrated embodiment, two combustion power assemblies 20a, 20b are illustrated, with each combustion power assembly 20 having first and second piston assemblies 22a, 22b. Combustion assembly axis 25 is spaced apart from but generally parallel with driveshaft axis 14 of driveshaft 12. Each piston assembly 22 generally includes a piston 30 which may be carried by a piston arm 28. The piston assembly 22 is attached to a cam follower assembly 26. The opposed pistons 30a, 30b of a combustion power assembly 20 are adapted to reciprocate in opposite directions along combustion assembly axis 25. Each cam follower assembly 26 straddles a corresponding cam 18 and acts on a piston 30 through its associated piston arm 28. Opposed pistons 30a, 30b within cylinder assembly 24 generally define a combustion chamber 32 therebetween into which fuel may be injected by a fuel injector 34. Upon combustion of fuel within combustion chamber 32, opposed pistons 30a, 30b are driven away from one another along combustion assembly axis 25. In one or more embodiments, engine 10 includes at least two combustion power assemblies 20 symmetrically spaced about driveshaft axis 14. In the illustrated embodiment, a first combustion power assembly 20a and a second combustion power assembly 20b are shown, each engaging a combustion cylinder assembly 24. In other embodiments, three or more combustion power assemblies 20 each with a corresponding combustion cylinder assembly 24 may be s spaced about driveshaft axis 14. The combustion power assemblies 20 may be symmetrically spaced about driveshaft axis 14.

As will be explained in more detail below, when engine 10 is being driven by internal combustion, as opposing pistons 30 are displaced in opposite directions as a result of combustion within combustion chamber 32, their respective cam follower assemblies 26 are likewise linearly displaced, which forces curvilinear shaped cams 18 engaged by the cam follower assemblies 26 to rotated axially about driveshaft axis 14. Since cams 18 are fixedly mounted on driveshaft 12, driveshaft 12 is rotated through an angle by cam 18. The shape of cam 18, being engaged by cam follower assembly 26, therefore determines the stroke of each piston assembly 22. Moreover, as cam 18 is rotated, the harmonic or undulating shape of cam 18 forces each cam follower assembly 26 engaging cam 18 to have a back and forth, linear movement along combustion assembly axis 25.

Air is supplied to combustion chamber 32 via air intake ports 38 formed in combustion cylinder assembly 24, while exhaust is removed from combustion chamber 32 via exhaust ports 36 formed in combustion cylinder assembly 24. An air intake manifold 40 is in fluid communication with intake ports 38, while an exhaust manifold 42 is in fluid communication with exhaust ports 36. In one or more embodiments, one or both of manifolds 40, 42 may be annular, extending at least partially around the perimeter of engine 10. In some embodiments, manifolds 40, 42 are toroidal in shape, extending fully around the perimeter of engine 10.

In one or more embodiments, a first flange 44 is attached to a first end 46 of driveshaft 12 and a second flange 48 is attached to a second end 50 of driveshaft 12. As shown, a flywheel 52 is mounted on first flange 44.

The piston assemblies 22 and combustion cylinder assembly 24 are mounted in an engine block 53. A sump casing 54 is attached to the engine block 53 adjacent the first end 46 of driveshaft 12 and a sump casing 56 is attached to engine block 53 adjacent the second end 50 of driveshaft 12.

Figure 3:
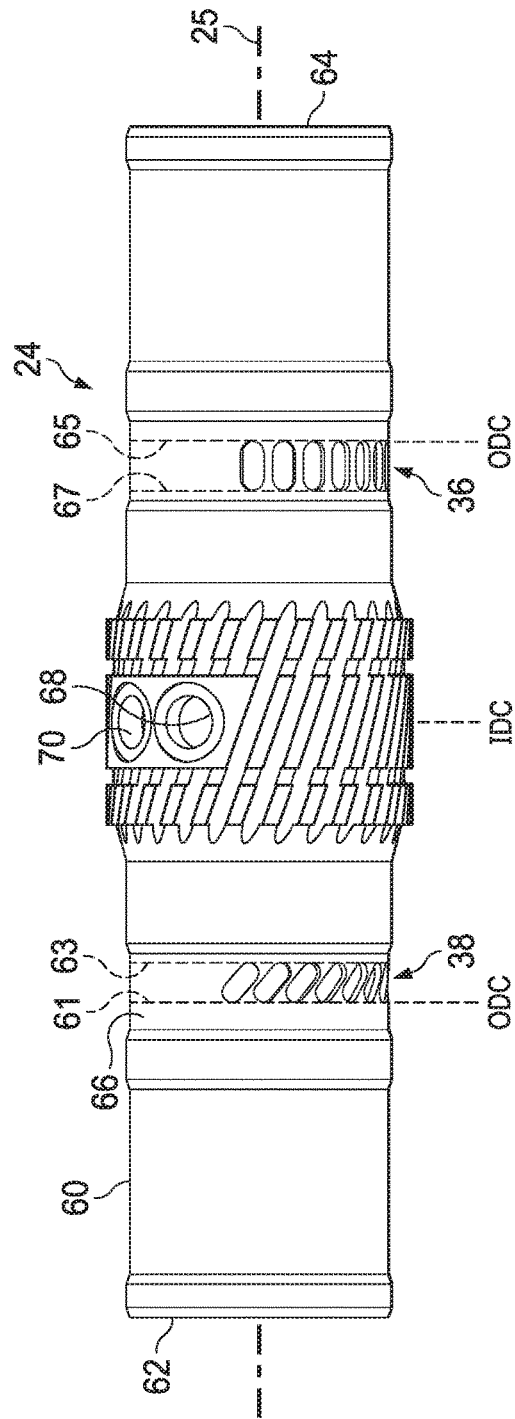
FIG. 3 is an elevation view of a piston cylinder assembly.

FIG. 3 illustrates the combustion cylinder assembly 24 disposed along a cylinder axis 25 in more detail. Specifically, combustion cylinder assembly 24 is formed of a combustion cylinder 60 extending between a first end 62 and a second end 64 and generally formed of a cylinder wall 66. A first injection port 68 may be provided in cylinder wall 66, in some embodiments, at approximately the midpoint between first and second ends 62, 64. First injection port 68 may be a fuel injection port, a sparkplug port or other port. In one or more embodiments, a second port 70 may likewise be provided adjacent first injection port 68. Second port 70 may be an additional fuel injection port or alternatively, a sparkplug port, it being appreciated that in some embodiments, compression of a combustible fuel is sufficient to ignite the fuel, while in other embodiments, a spark may be necessary to ignite the fuel. In yet other embodiments, additional injection ports may be provided adjacent port 68, where each fuel injection port may be utilized for a different type of fuel, it being an advantage of the engine 10 that it may utilize a variety of fuel types without the need to adapt the general components of the engine for a particular fuel type. Fuels on which engine 10 may run include for example liquid fuels such as diesel, ethanol, gasoline, kerosene and gaseous fuels such as SymGas, hydrogen and natural gas.

An exhaust port 36 is formed in cylinder wall 66 between fuel injection port 68 and the second end 64 of combustion cylinder 60, and an intake port 38 is formed in cylinder wall 66 between injection port 68 and the first end 62 of combustion cylinder 60. In one or more embodiments, intake port 38 has an outer port edge 61 closest to the first end 62 and an inner port edge 63 closest to second end 64. Similarly, exhaust port 36 has an outer port edge 65 closest to the second end 64 and an inner port edge 67 closest to first end 62. Inner dead center (IDC) of the combustion cylinder 60 is defined approximately equidistance between the outer edge 61 of the intake port 38 and the outer edge 65 of the exhaust port 36. In one or more embodiments, the inner port edge 67 of the exhaust port 36 is closer to inner dead center than the inner port edge 63 of the intake port 38, while the outer port edge 65 of exhaust port 36 is approximately the same distance from IDC as the outer port edge 61 of intake port 38, it being appreciated that as such, exhaust port 36 is longer along combustion assembly 25 than intake port 38. Moreover, outer dead center (ODC) of the combustion cylinder 60 is defined approximately equidistance from ODC at the outer edges 61, 65 of the respective intake port 38 and exhaust port 36. In one or more embodiments, each port 38 may be a plurality of apertures, openings or slots. In one or more embodiments, ports 36 are a plurality of elongated slots. In one or more embodiments, each port 36 may be a plurality of apertures, openings or slots, and in some embodiments, each slot may be formed along a longitudinal axis that is generally parallel with combustion assembly axis 25. In one or more embodiments, ports 38 are a plurality of slots each formed along a longitudinal axis that is generally acute with combustion assembly axis 25. Ports 38 may be a plurality of slots formed at an angle relative to the combustion assembly axis 25 so as to promote swirl in the incoming air passing into combustion cylinder 60, thereby enhancing mixture with fuel and combustion. In one or more embodiments, the plurality of slots are formed in cylinder wall 66 so as to have an angle of between 30-45 degrees with combustion assembly axis 25.

In one or more embodiments, one or both sets of ports 36, 38 extend only around a portion of the perimeter of cylinder wall 66. For example, ports 36 and/or 38 may extend only around 180 degrees of the perimeter of cylinder wall 66 or ports 36 and/or 38 may extend only around 90 degrees of the perimeter of cylinder wall 66. With respect to intake ports 38, intake ports 38 are provided only around that portion of the cylinder wall 66 that is not adjacent piston head notch (see FIG. 4) as described below. With respect to the exhaust ports 36, exhaust ports 36 are provided only around that portion of the cylinder wall 66 that is not adjacent piston head notch (see FIG. 4) as described below. In addition, to minimize exhaust heat transfer to the engine block 53 and other components of engine 10, exhaust ports 36 are provided only around that portion of the cylinder wall 66. It will be appreciated that this arrangement alone, but particularly in combination with the exhaust arrangement described with respect to FIGS. 8 and 9, minimizes transfer of exhaust heat to other components of the engine. As such, during operation, the overall engine remains much cooler than prior art engines. Moreover, by controlling heat transfer in this manner, certain engine components may be manufactured of materials that need not be selected to withstand the high temperatures associated with prior art engines. For example, certain engine components may be manufactured of plastics, ceramics, glass, composites or lighter metals, thus reducing the overall weight of the engine of the disclosure.

Figure 4A:
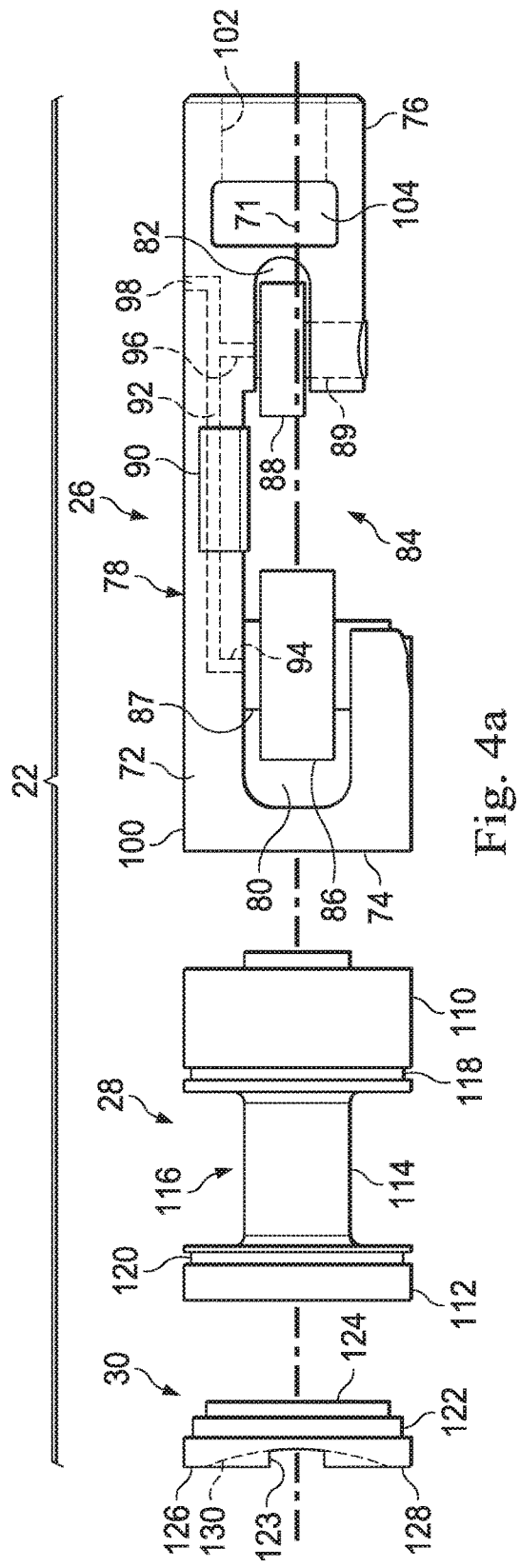
FIG. 4a is an exploded elevation view of a piston assembly.

Turning to FIG. 4A, an exploded side view of a piston assembly 22 and a cam follower assembly 26 is illustrated. Piston assembly 22 includes a piston 30 generally aligned along combustion assembly axis 25, and may further include a piston arm 28 interconnecting piston 30 and cam follower assembly 26. As used herein, a "hot" piston assembly 22 will be the piston assembly 22 adjacent exhaust ports 36 while "cool" piston assembly 22 will be the piston assembly 22 adjacent the intake ports 38 of a cylinder assembly 24. In some embodiments, piston assembly 22 may include a piston arm 28. Piston arm 28 may be the same diameter as piston 30 or may be of a different diameter.

Cam follower assembly 26 is an elongated structure 72 having a first end 74 and a second end 76. A notch or opening 84 in structure 72 is formed between ends 74, 76, which notch or opening 84, as described herein, is disposed for receipt of a cam 18 and in particular, a cam shoulder 138 (see FIG. 5a). Each end 74, 76 may be a cylinder which ends 74, 76 may be interconnected by a cam follower arm 78. In some embodiments, cylindrical end 74 may be of a larger diameter than cylindrical end 76, while in other embodiments, cylinder ends 74, 76 may be of the same diameter. Cam follower arm 78 may be rigidly attached to each cylindrical end 74, 76, or pivotally attached to one or both cylindrical ends 74, 76. In this regard, elongated structure 72 may be a unitary body or may be formed of interconnected components, such as cylindrical ends 74, 76 interconnected by cam follower arm 78. In one embodiment, cam follower arm 78 is pivotally attached to cylindrical first end 74 and pivotally attached to cylindrical second end 76, permitting at least one degree of freedom therebetween. In one or more embodiments, an axially extending slot 80 may be formed in first end 74 and an additional axially extending slot 82 may be formed in second end 76. First and second cylindrical ends 74, 76 may be interconnected by cam follower arm 78 so that slots 80, 82 are oriented to extend along planes that are generally parallel to one another. Cylindrical ends 74, 76 are spaced apart from one another by cam follower arm 78 to form opening 84 between slots 80, 82. In any event, cam follower assembly 26 may include at least one engagement mechanism 86 carried by the first end 74 and adjacent opening 84. In one or more embodiments, cam follower assembly 26 may include a first engagement mechanism 86 carried by the first end 74 and adjacent opening 84 and a second engagement mechanism 88 carried by the second end 76 and adjacent opening 84 so that the first and second engagement mechanisms 86, 88 oppose one another. Engagement mechanisms 86, 88 may be mounted on their respective ends 74, 76 so as to extend into opening 84. The opposing engagement mechanisms 86, 88 are disposed to clamp, bear against or otherwise engage the harmonic surface of cam 18. In one embodiments, engagement mechanisms 86, 88 may be rollers that are mounted in above described slots 80, 82 and at least partially extend into opening 84. Thus, in FIG. 4a, a first roller 86 is mounted in first slot 80, and a second roller 88 is mounted in second slot 82. Preferably, each roller has a rotational axis that is generally parallel with the rotational axis of the other roller and which axii are generally perpendicular to the planes along which the slots 80, 82 are formed. In one embodiment, roller 86 is of a larger diameter than roller 88 because roller 86 is utilized primarily to transfer the load to magnet slide. An adjustable spacer 90 may be mounted on arm 78 between rollers 86, 88 and opening 84. Spacer 90 is adjustable to move radially relative to combined assembly axis 71, towards or away from opening 84 in order to align cam follower assembly 26 with a cam 18. In one embodiment, adjustable spacer 90 may be a pad that bears against outer surface 145. An internal lubrication passage 92 may be defined and extend within arm 78. Lubrication passage 92 is in fluid communication with a port 94 opening adjacent roller 86 so as to lubricate the bearings 87 of roller 86; a port 96 opening adjacent roller 88 so as to lubricate the bearings 89 of roller 88; and a port 98 disposed along the outer surface 100 of arm 78. Cylindrically shaped second end 76 of cam follower assembly 26 may have a bore 102 formed therein, and may have one or more windows 104 opening into bore 102. While the engagement mechanisms 86, 88 of cam follower assembly 26 have generally been described as rollers in some embodiments, it will be appreciated that the engagement mechanisms 86, 88 of cam follower assembly 26 can be any structure that is disposed to bear against, ride along or otherwise engaged one or more surfaces of harmonic cam 18. For example, rollers 86, 88 and slots 80, 82 may be replaced with opposing pads (not shown) that clasp opposite surface of cam 18. In this regard, elongated structure 72 of cam follower assembly 26 may simply be an elongated body having a first end 74 and a second end 76 with a radially extending notch or opening 84 formed in elongated structure 72 between the two ends but without the additional slots 80, 82. In this embodiment, one or more engagement mechanisms 86, 88 may be mounted in the radially extending notch 84 to engage a cam 18. Piston assembly 22, and in particular, piston arm 28 is attached to first end 74 of cam follower assembly 26. In some embodiments, piston arm 28 may include a first annular body 110 spaced apart from a second annular body 112 of similar diameters and interconnected by a smaller diameter neck 114. Neck 114 may be solid or have a bore formed therein, but is of a smaller diameter so as to form an annulus 116 between spaced apart bodies 110, 112. In other embodiments, piston arm 28 may simply be formed of an annular body 110 that is of substantially uniform diameter along its length. In such embodiments, the diameter of piston arm 28 may be the same diameter as cylindrical first end 74 of cam follower assembly 26. In all embodiments, at least one, and preferably two or more, annular grooves 118 may be formed around first annular body 110 for receipt of a seal ring (not shown). Likewise, in embodiments with a second annular body 112, at least one, and preferably two or more, annular grooves 120 may be formed around second annular body 112 for receipt of a seal ring (not shown). In such embodiments, piston arm 28 utilizes annular bodies 110, 112 spaced apart from one another along neck 114 to minimize migration of combustion gases, unburned fuel and particulate matter into sump casings 54 and 56, often referred to as the blow-by effect.

Figure 4B:
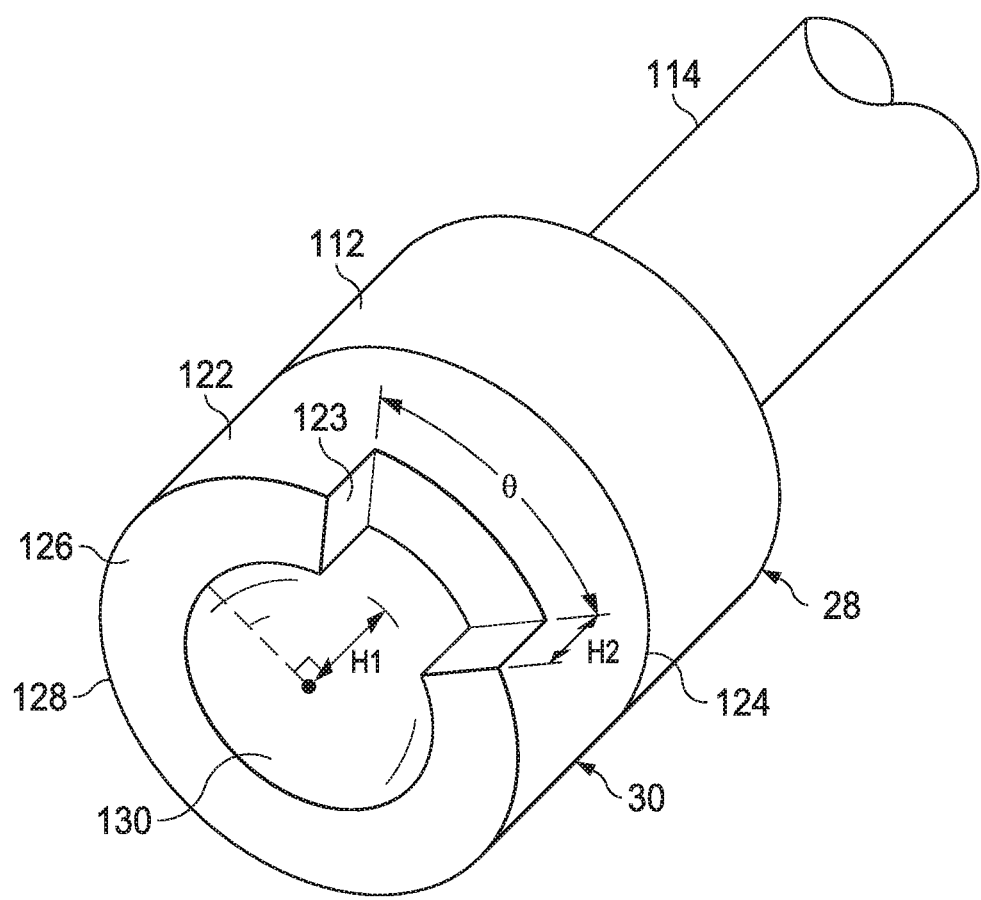
FIG. 4b is a perspective view of a piston crown.

With reference to FIG. 4B and ongoing reference to FIG. 4A, piston 30 is generally formed of an annular body 122 having a first end 124 attached to piston arm 28. A crown 126 is formed at the second end 128 of annular body 122. An indention 130 may be formed in crown 126 and have a depth H1. Indention 130 may be conically shaped in some embodiments. Likewise, in some embodiments, a notch 123 is formed at the periphery of annular body 122 and extends inward to intersect indention 130. In some embodiments, notch 123 preferably has a depth H2 no deeper than depth H1 of indention 130 formed in crown 126. Likewise, in some embodiments, notch 123 extends no more than approximately 90 degrees θ around the periphery of annular body 122, while in other embodiments, notch 123 extends no more than approximately 60 degrees θ around the periphery of annular body 122, while in other embodiments, notch 123 extends between 5 and 30 degrees θ around the periphery of annular body 122.

With reference to FIG. 5a, harmonic barrel cams 18a, 18b are shown in more detail mounted on driveshaft 12. As described above, driveshaft 12 extends along a driveshaft axis 14 between a driveshaft first end 46 and a driveshaft second end 50. Barrel cams 18a, 18b are mounted along driveshaft 12 in spaced apart relation to one another. Each cam 18 includes a cam hub 136 formed about a hub axis which cam hub 136 is mounted on driveshaft 12 to be coaxial therewith. Each cam 18 further includes a circumferential cam shoulder 138 extending around the periphery of cam hub 136. Cam shoulder 138 is generally of a curvilinear shape and can be characterized as having a certain frequency, where frequency may generally refer to the number of occurrences of peaks and troughs about the 360 degree circumference of shoulder 138, a peak and abutting troughs together forming a lobe.

In the certain embodiments of engine 10 as described herein, the cam shoulders need not be limited to a particular shape. However, in one or more other embodiments, the amplitude of the peaks of each cam shoulder 138 of each cam 18a, 18b may be the same, with the depth of the troughs and the height of the peaks being substantially equal, while in other embodiments, the depth of the troughs may differ from height of the peaks. By altering the depth of the troughs, the height of the peaks and the number of lobes, the torque output of engine 10 can be precisely controlled. In this regard, by altering the number of lobes and/or the shape of a cam 18, the function of a gearbox can be replicated, and thus, the need for a gearbox between inputs and outputs may be eliminated in some instance. This in turn, eliminates the frictional losses that would otherwise arise from a gearbox, thus improving overall efficiencies of the engine 10. For example, power generation, a cam 18 with only two lobes will result in slower reciprocation of a piston assembly 22 in combustion cylinder assembly 24 as described above, when compared to a cam 18 having more lobes. Thus, in one or more embodiments, by increasing the number of lobes of a cam 18, a higher revolution per minute (RPM) of driveshaft 12 can be achieved without the use of a gearbox.

In the embodiment of FIG. 5a, each curvilinear shaped cam shoulder 138 extending around cam hub 136 is illustrated with two peaks, namely a first peak 140a and a second peak 140b, with a corresponding number of troughs 141 formed therebetween, such as a first trough 141a and a second trough 141b. As such, the illustrated shoulder 138 creates two complete cycles about the 360-degree circumference of cam hub 136 and thus represents double harmonics. In other embodiments, shoulder 138 may have a different number of peaks 140 and troughs 141. In other words, the frequency of the curvilinear shape forming shoulder 138 may be selected to exhibit the desired number of peaks 140 and troughs 141.

Shoulder 138 is further characterized as having an inwardly facing track or first surface 142 and an outwardly facing track or second surface 144, as well as an outer circumferential surface 145. First and second surfaces 142, 144 may generally oppose one another on opposite sides of cam shoulder 138 and may be disposed for engagement by one or more engagement mechanisms such as first and second engagement mechanisms 86, 88. Each cam 18a, 18b may be mounted on driveshaft 12 so as to be aligned with a reference point or driveshaft index 146. In particular, each cam 18 may include a cam index 150, such as the first cam index 150a and second cam index 150b of cams 18a, 18b, respectively.

In one or more embodiments, cams 18a, 18b are generally mounted on driveshaft 12 so that the indexes 150a, 150b are generally aligned with one another relative to a specific reference point 146 on driveshaft 12. When the indices 150a, 150b are aligned with one another, the opposing cams 18a, 18b mirror one another and the respective peaks 140 of the two cams 18a, 18b align with one another, meaning that the respective peaks and troughs occur at the same angular position about driveshaft 12 relative to reference point 146. As such, the peaks 140 of each cam 18a, 18b face one another and the troughs 141 of each cam 18a, 18b face one another. For the avoidance of doubt, references to cams 18 "mirroring" one another herein simply mean that the respective troughs or peaks occur at the same angular position about driveshaft 12, but not necessarily that the curvilinear shape of the shoulders 138a, 138b are the same.

Figure 5B:
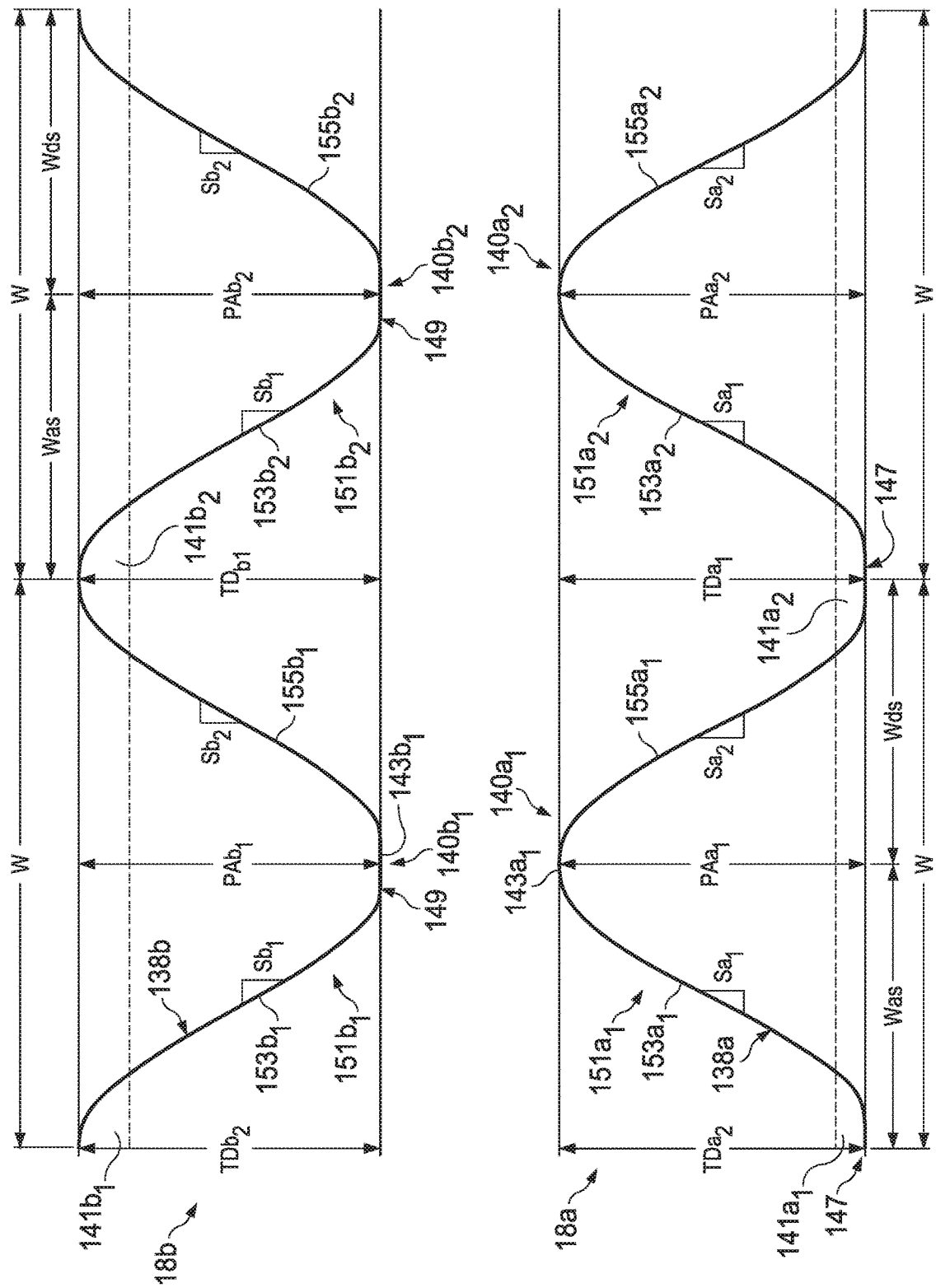
FIG. 5b is a cam shoulder profile having a substantially sinusoidal shape.
Figure 5C:
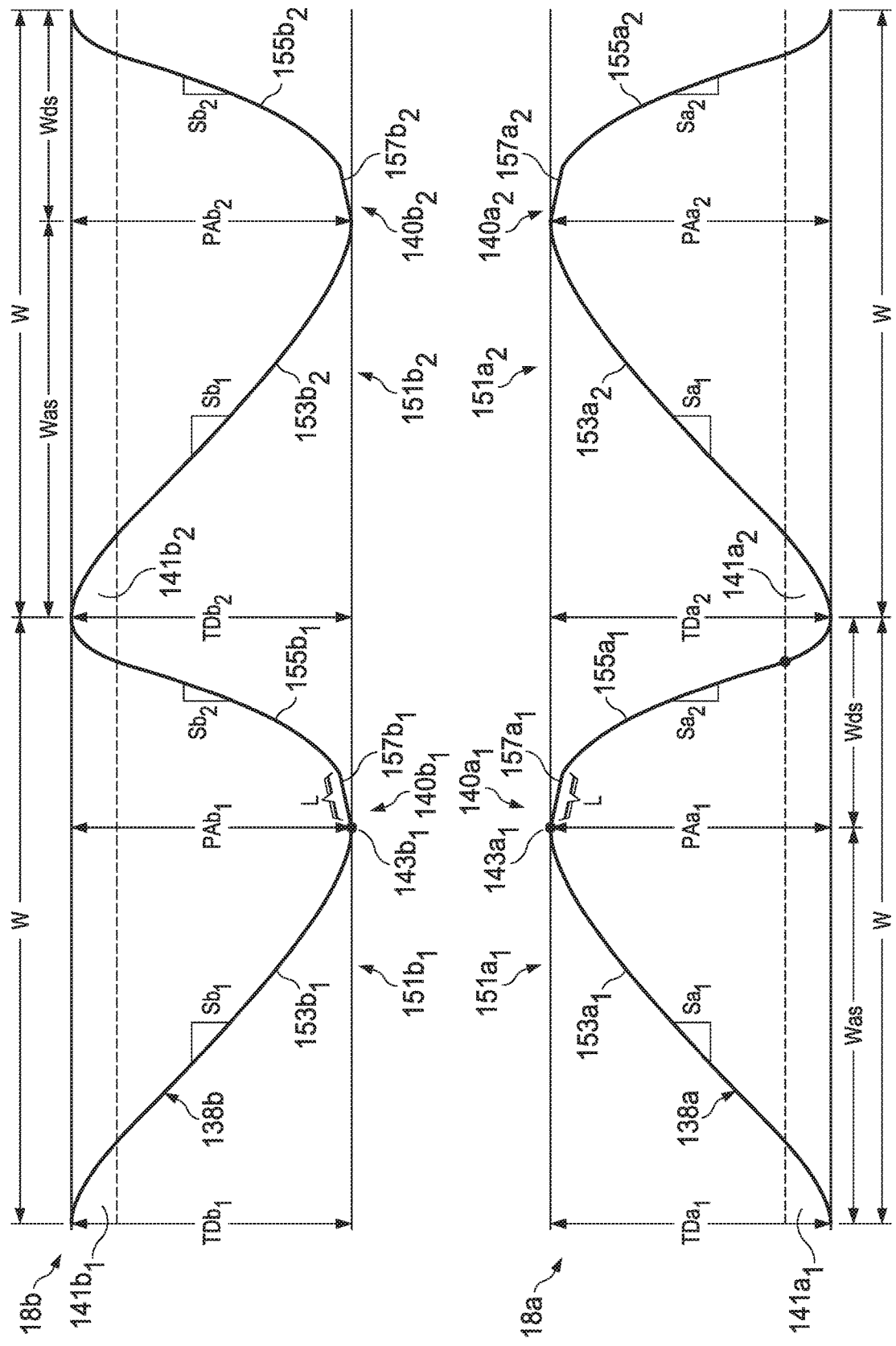
FIG. 5c is a cam shoulder profile having a segmented polynomial shape.

Finally, the top of each peak 140 may correspond with inner dead center (IDC) of combustion cylinder assembly 24 (see FIG. 3), while the bottom of each trough 141 may correspond with outer dead center (ODC) of combustion cylinder assembly 24. In other words, when a cam follower assembly 26 engages a shoulder 138 at a lobe peak 140, the piston 30 and/or magnet slide arm 31 driven by the cam follower assembly 26 is at IDC of their respective combustion cylinder 60 and stator cylinder 47. Likewise, when a cam follower assembly 26 (see FIG. 4A) engages a shoulder 138 at a trough 141, the piston 30 and/or magnet slide arm 31 driven by the cam follower assembly 26 is at ODC of the combustion cylinder 60 and/or stator cylinder 47, respectively. FIGS. 5b and 5c are cam profiles of cam shoulders 138a, 138b to better illustrated various embodiments of the curvilinear shape of cam shoulders 138a, 138b. In one or more embodiments as illustrated in FIG. 5b, the curvilinear shape may be a sinusoidal shape, with a peak occurring equidistance between successive troughs, while in other embodiments as illustrated in FIG. 5c, the curvilinear shape may be a segmented polynomial shape, with the peak occurring between two successive troughs and skewed or shifted closer to one trough. In any event, cam shoulder 138a may be associated with the intake cam 18a and cam shoulder 138b may be associated with the exhaust cam 18b. Each shoulder 138 forms a guide or track along which a cam follower (see FIG. 4A) moves. As such, the shape of the shoulder 138 governs movement of a corresponding piston within a combustion cylinder, such as combustion cylinder 60 described above. The shoulder shape, as represented by the profiles of FIGS. 5a, 5b is therefore an important part of the operation of some embodiments of engine 10.

It will be appreciated that cam shoulders 138a, 138b are illustrated in FIGS. 5b and 5c as they would oppose one another on driveshaft 12 when radially indexed to substantially mirror one another. As such, peaks 140 oppose one another and troughs 141 oppose one another so that the opposing features have approximately the same radial position on driveshaft 12 relative to the driveshaft index 146 (see FIG. 5). Generally, each cam 18 has at least one lobe 151 formed of a peak 140 bounded by a trough 141. In the illustrated embodiment, each cam 18 is shown with a first lobe and a second lobe. Each peak 140 has a maximum peak amplitude PA. Each lobe 151 has an overall wavelength distance W, defined as the distance between successive troughs 141 across a peak 140. Each trough has a maximum trough depth TD. Moving clockwise along the circumference of a cam shoulder 138 (or left to right as shown in FIG. 5b and fc), each lobe 151 has an ascending side or shoulder portion 153 and a descending side or shoulder portion 155.

Additionally, to ensure that the opposing pistons driven by cams 18a, 18b are continuously moving, no portion of the curvilinear shaped shoulder of cam 18a is parallel with any portion of curvilinear shaped shoulder of cam 18b. As such, opposing curvilinear shaped shoulders 138a, 138b, whether of a sinusoidal shape or a segmented polynomial shape, are constantly diverging or converging from one another. In other words, no portion of shoulders 138a, 138b are parallel since this would result in a loss of momentum of movement of the opposing pistons within the combustion chamber in which they are disposed, which in turn would result in a loss of engine torque.

With specific reference to FIG. 5b, cam 18a is shown as having a sinusoidal shaped cam shoulder 138a. As such, first lobe $151a_1$ is located approximately equidistance between a first trough $141a_1$ and a second trough $141a_2$. In particular, the maximum peak amplitude $PAa_1$ occurs at approximately ½ the overall wavelength distance W for lobe $151a_1$. As such, first lobe $151a_1$ is symmetrical in shape, illustrated by wavelength distance Was of an ascending shoulder portion $153a_1$ from the first trough $141a_1$ to the peak or apex $143a_1$ of lobe $151a_1$ being equal to the wavelength distance $W_{ds}$ of descending shoulder portion $155a_1$ from the peak or apex $143a_1$ of lobe $151a_1$ to second trough $141a_2$. First trough $141a_1$ has a trough depth $TDa_1$ that is substantially the same as trough depth $TDa_1$ of second trough $141a_2$. Similarly, second lobe $151a_2$ is of substantially the same shape as first lobe $151a_1$. In this regard, lobe $151a_1$ has an ascending shoulder portion $153a_1$ that is of substantially the same shape as descending shoulder portion $155a_1$. As such, the absolute value of the average slope $Sa_1$ of ascending shoulder portion $153a_1$ between trough $141a_1$ and peak $140a_1$ is approximately the same as the absolute value of the average slope $Sa_2$ of descending shoulder portion $155a_1$ between peak $140a_1$ and trough $141a_2$ moving clockwise along cam shoulder 138a.

As with cam 18a, cam 18b is shown as having a symmetrical sinusoidal shaped cam shoulder 138b. As such, first lobe $151b_1$ is located approximately equidistance between a first trough $141b_1$ and a second trough $141b_2$. In particular, the maximum peak amplitude $PAb_1$ occurs at approximately ½ the overall wavelength distance W for lobe $151b_1$. First trough $141b_1$ has a trough depth $TDb_1$ that is substantially the same as trough depth $TDb_1$ of second trough $141b_2$. Similarly, second lobe $151b_2$ is of substantially the same shape as first lobe $151b_1$. In this regard, lobe $151b_1$ has an ascending shoulder portion $153b_1$ that is of substantially the same shape as descending shoulder portion $155b_1$. As such, the absolute value of the average slope $Sb_1$ of ascending shoulder portion $153b_1$ between trough $141b_1$ and peak $140b_1$ is approximately the same as the absolute value of the average slope $Sb_2$ of descending shoulder portion $155b_1$ between peak $140b_1$ and trough $141b_2$ moving clockwise along cam shoulder 138b.

In any event, cams 18a, 18b are angularly mounted on driveshaft 12 (see FIG. 5a) to mirror one another so that the lobes 151 of the respective cams opposed one another with corresponding peaks 140 in general alignment and the number of lobes 151a of cam 18a corresponds with the number of lobes 151b of cam 18b. In this regard, the opposing features may be angularly aligned with one another so that opposing peaks 140 and opposing troughs 141 generally occur at the same angular position about driveshaft 12 relative to index 146.

Although in some embodiments, the opposing cam shoulders 138a, 138b of spaced apart cams 18a, 18b are generally disposed to have substantially the same sinusoidal shape, adjustments to portions of the shape of a particular shoulder, including the width of circumferential surface 145 and/or the shape of inwardly facing track 142 of a cam shoulder 138 may be utilized to adjust relative movements of opposing first and second piston assemblies 22a, 22b, respectively, for a desired purpose. Thus, in some embodiments, the trough 141$a_1$ of one cam 18a may be shaped to include a flat portion 147 that lies in a plane perpendicular to driveshaft axis 14 and the axis of cam hub 136 or otherwise be deeper than the corresponding opposing trough 141$b_1$ of cam 18b, which is illustrated as generally curved through the entire trough 141$b_1$. In other words, the trough depth TDb$_1$ of trough 141$b_1$ is greater than opposing trough depth TDa$_1$ of corresponding trough 141$a_1$. Similarly, peak 140$a_1$ of cam 18a may have a rounded shape at its apex 143, while the shape of opposing peak 140$b_1$ of cam 18b may have a flat portion 149 that lies in a plane perpendicular to driveshaft axis 14 and the axis of cam hub 136 at its corresponding apex 143. In the illustrated embodiments, because each flat portion 147, 149 of the corresponding cams 18a, 18b lies in a plane perpendicular to driveshaft axis 14 and the axis of cam hub 136, it will be appreciated that flat portions 147, 149 are in parallel planes.

With specific reference to FIG. 5c, cam 18a is shown as having a segmented polynomial shaped cam shoulder 138a. As such, first lobe 151$a_1$ is asymmetrical in shape, with the maximum peak amplitude PAa1 occurring closer to second trough 141$a_2$ as opposed to first trough 141$a_1$, illustrated by wavelength distance W$_{as}$ from the first trough 141$a_1$ to the apex 143 of lobe 151$a_1$ as being greater than the wavelength distance W$_{ds}$ from the apex 143$a_1$ of lobe 151$a_1$ to second trough 141$a_2$. In other words, wavelength distance W$_{as}$ from the first trough 141$a_1$ to peak 140$a_1$ of an ascending shoulder portion 153$a_1$ of lobe 151$a_1$ is greater than the wavelength distance W$_{ds}$ from the peak 140$a_1$ to the second trough 141$a_2$ of a descending shoulder portion 155$a_1$ of the lobe 151$a_1$. In these embodiments, first trough 141$a_1$ has a trough depth TDa$_1$ that is substantially the same as trough depth TDa$_2$ of second trough 141$a_2$, which is substantially the same as maximum peak amplitudes PAa$_1$ and PAa$_2$ of lobes 151$a_1$ and 151$a_2$, respectively. Similarly, second lobe 151$a_2$ is of substantially the same shape as first lobe 151$a_1$. However, because lobes 151$a_1$ and 151$a_2$ are asymmetrical, lobe 151$a_1$ has an ascending shoulder portion 153$a_1$ that is shallower in shape than the steeper shape of descending shoulder portion 155$a_1$. As such, the absolute value of the average slope Sa$_1$ of ascending shoulder portion 153$a_1$ between trough 141$a_1$ and peak 140$a_1$ is less than the absolute value of the average slope Sa$_2$ of descending shoulder portion 155$a_1$ between peak 140$a_1$ and trough 141$a_2$ moving clockwise along cam shoulder 138a. It will be appreciated that the steeper shape (or greater slope) of descending shoulder portion 155$a_1$ results in faster movement of a corresponding piston 30 and/or magnet slide arm 31 during the exhaust stroke of engine 10 as compared to the intake stroke.

Cam 18b is shown in FIG. 5c as having a segmented polynomial shaped cam shoulder 138b. As such, first lobe 151$b_1$ is asymmetrical in shape, with the maximum peak amplitude PAb$_1$ occurring closer to second trough 141$b_2$ as opposed to first trough 141$b_1$, illustrated by wavelength distance Was from the first trough 141$b_1$ to the apex 143$b_1$ of lobe 151$b_1$ as being greater than the wavelength distance W$_{ds}$ from the apex 143$b_1$ of lobe 151$b_1$ to second trough 141$b_2$. In these embodiments, first trough 141$b_1$ has a trough depth TDb$_1$ that is substantially the same as trough depth TDb$_2$ of second trough 141$b_2$, which is substantially the same as maximum peak amplitudes PAb$_1$ and PAb$_2$ of lobes 151$b_1$ and 151$b_2$, respectively. Similarly, second lobe 151$b_2$ is of substantially the same shape as first lobe 151$b_1$. However, because lobes 151$b_1$ and 151$b_2$ are asymmetrical, lobe 151$b_1$ has an ascending shoulder portion 153$b_1$ that is shallower in shape than the steeper shape of descending shoulder portion 155$b_1$. As such, the absolute value of the average slope Sb1 of ascending shoulder portion 153$b_1$ between trough 141$b_1$ and peak 140$b_1$ is less than the absolute value of the average slope Sb$_2$ of descending shoulder portion 155$b_1$ between peak 140$b_1$ and trough 141$b_2$ moving clockwise along cam shoulder 138b.

In any event, cams 18a, 18b are angularly mounted on driveshaft 12 relative to reference point 146 (see FIG. 5a) to mirror one another so that the lobes 151 of the respective cams opposed one another with corresponding peaks 140 in general alignment and the number of lobes 151a of cam 18a corresponds with the number of lobes 151b of cam 18b. In this regard, the opposing features may be angularly aligned with one another so that opposing peaks 140 and opposing troughs 141 generally occur at the same angular position about driveshaft 12 relative to index 146.

In one or more embodiments, each descending shoulder portion 155 of a segmented polynomial shaped cam shoulder 138 further includes a substantially linear portion 157 extending from each lobe apex 143 toward the second trough 141. While portion 157 may be linear or flat, it will be appreciated that it is not perpendicular to driveshaft axis 14 or the axis of cam hub 136 (and thus, a piston continues to move as its associated cam follower moves across linear portion 157 during operation of engine 10.) In other words, linear portion 157 has a slope greater than zero. In preferred embodiments, linear portion 157 has a slope of greater than zero and less than approximately 20 degrees. Thus, descending shoulder portion 155$a_1$ of lobe 151$a_1$ of cam 18a includes a linear portion 157$a_1$ extending from apex 143$a_1$. Similarly, opposing cam 18b has a descending shoulder portion 155$b_1$ of lobe 151$b_1$ with a linear portion 157$b_1$ extending from apex 143$b_1$. The other lobes 151$a_2$, 151$b_2$ likewise include linear portions 157 as described. In one or more embodiments, opposing linear portions 157 have the same slope. In one or more embodiments, at least one, or both ascending shoulder portion 153 of a segmented polynomial shaped cam shoulder 138 may likewise include a substantially linear portion (not shown) similar to linear portion 157, extending from each lobe trough 141 extending towards an apex 143. Again, while such portion may be linear or flat, it will be appreciated that it is not perpendicular to driveshaft axis 14 or the axis of cam hub 136, and thus, a piston continues to move as its associated cam follower moves across such linear portion and the slope of such portion would be greater than zero.

The cam shoulders 138a, 138b of spaced apart cams 18a, 18b illustrated in FIG. 5c are generally disposed to have substantially the same segmented polynomial shape at least along the opposing descending shoulder portions 155$a_1$, 155$a_1$. However, because the shape of the segmented polynomial shoulder governs i) opening and closing of the intake and exhaust ports, and in particular, how fast a piston moves within its combustion cylinder to open or close a port and ii) movement of a magnet within a stator cylinder, and in particular, how fast a magnet moves within its stator cylinder, then the opposing ascending shoulder portion 153 of cams 18a, 18b may differ. As such, the in one or more embodiments, the discreet slope Sa1 at any given point along the ascending shoulder portion $153a_1$ of cam 18a may differ from the discreet slope $Sb_1$ at any given point along the ascending shoulder portion $153b_1$ of cam 18b. For example, the initial shape of ascending shoulder portion $153b_1$ adjacent trough $141b_1$ may be steeper than the initial shape of ascending shoulder portion $153a_1$ adjacent trough $141a_1$, resulting in i) faster movement of the exhaust piston back towards IDC and thus faster closing of the exhaust port as compared to the intake port associated with the intake piston movement governed by ascending shoulder portion $153a_1$ and ii) faster movement of the one magnet towards IDC and thus faster movement of the magnet as compared to the movement of the opposing magnet governed by ascending shoulder portion $153a_1$.—. Regardless, it will be appreciated that for the overall segmented polynomial shape of opposing cam shoulders 138a, 138b, the trough depth $TDa_1$ of trough $141a_1$ is substantially the same as the opposing trough depth $TDb_1$ of corresponding trough $141b_1$. Similarly, peak $140a_1$ of cam 18a has substantially the same peak amplitude $PAa_1$ as the peak amplitude $PAb_1$ of opposing peak $140b_1$. The length L of linear portion 157 may be selected to correspond with a particular desired waveform which may in turn be selected based on a type of fuel. It will be appreciated that while opposing cam shoulders 138a, 138b are constantly diverging or converging without any parallel portions of their respective segmented polynomial shapes, the opposing linear portions 157 of a shallow slope result in slower movement apart of magnet slide arms and cams in their respective cylinders, thereby permitting a substantially constant combustion chamber volume for a period of time without having the pistons stop in the combustion cylinder. In one or more embodiments, opposing linear portions 157 have the same length L. However, it will be appreciated that in this embodiment, while the peak 140a of each lobe 151a of cam 18a is substantially aligned with the corresponding peak 140b of each lobe 151b of cam 18b, no portion of segmented polynomial shaped cam shoulder 138a is parallel with any portion of segmented polynomial shaped cam shoulder 138b.

Likewise, the angular alignment of cams 18a, 18b relative to the driveshaft index 146, and also to one another may be adjusted to achieve a particular purpose. Cam 18a may be angularly rotated a desired number of degrees relative to driveshaft index 146 (and cam 18b) in order to adjust the movement of the magnet slide arm 31 and/or piston 30 associated with cam 18a relative to the magnet slide arm 31 and/or piston 30 associated with cam 18b. In some embodiments, one cam 18, such as cam 18b, may be rotated approximately 0.5 to 11 degrees relative to the other cam 18, such as cam 18a.

In any event, in one or more embodiments, cam shoulders 138a, 138b are shaped and positioned on driveshaft so that engine 10 has the following configurations of an intake piston and opposing exhaust piston, an intake port and an exhaust port at different stages of the combustion and expansion strokes relative to the point of engagement of a cam follower with a cam shoulder:

(1) at the apex 143 of cam shoulder 138, opposing intake and exhaust pistons are at inner dead center (IDC) within a combustion cylinder and both exhaust port and intake port are closed; (2) along the linear portion 157 of a descending shoulder portion 155, the intake and exhaust ports remained closed and intake and exhaust pistons retract slowly away from one another (and from IDC) in the combustion cylinder, the shallowly sloped linear portions 157 allowing an almost constant volume within the combustion cylinder to be maintained during combustion but without stopping movement of the pistons; (3) further along descending shoulder portion 155, due to the steep slope, opposed intake and exhaust pistons retract more quickly from one another, the retraction of the exhaust piston opening an exhaust port to allow scavenging of exhaust gases while intake port remains closed (because the inner edge 67 of the exhaust port 36 is closer to IDC than the inner edge 63 of intake port 38) (see FIG. 3); (4) further along descending shoulder portion 155, approaching the bottom of the second trough 141, as opposed intake and exhaust pistons continue to retract from one another, the intake port is opened by virtue of movement of the intake piston; (5) at the base of the second trough, the intake and exhaust piston reach outer dead center (ODC) within the combustion cylinder, with both intake and exhaust ports open; (6) in one or more embodiments, the exhaust piston initially moves from ODC to IDC more quickly than the intake piston because the ascending shoulder portion $153b_1$ of the cam shoulder 138b driving the exhaust piston is steeper adjacent the trough $141b_1$ than the corresponding ascending shoulder portion $153a_1$ of the cam shoulder 138a adjacent the trough $141a_1$ associated with the intake piston, the result being that the exhaust port adjacent the exhaust piston closes earlier than the intake port adjacent the intake piston (which closes more slowly since the ascending portion $153a_1$ adjacent trough $141a_1$ that drives the intake piston is shallower); (7) as the respective cam followers continue to move along the respective ascending portions 153 of the cam shoulders 138, the intake piston (which was lagging behind the exhaust piston in their respective movement towards each other and IDC) catches up with the exhaust piston so that the pistons reach the apex 143 of their respective cam shoulders 138 at the same time, the intake piston, having remained at least partially open while the exhaust piston was closed, also is closed by the intake piston.

Figure 6:
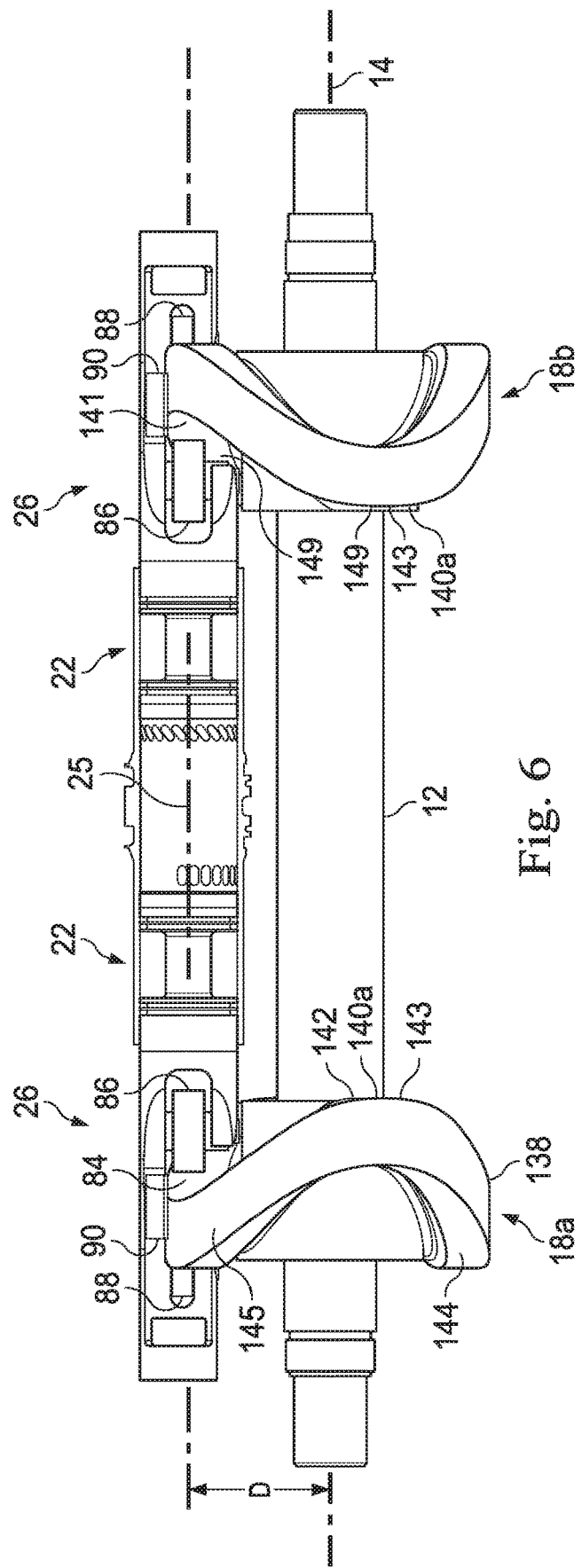
FIG. 6 is an elevation view of a piston assembly engaging a harmonic barrel cam.

FIG. 6 illustrates a piston assembly 22 engaged with cam 18a. Specifically, piston assembly 22 engages cam 18a via a cam follower assembly 26. In the illustrated embodiment, cam follower assembly 26 and piston assembly 22 are all axially aligned along combustion assembly axis 71.

Specifically, cam follower assembly 26 engages cam 18a so that the shoulder 138 of cam 18a extends into opening 84 of cam follower assembly 26, allowing first roller 86 to engage inwardly facing track 142 of cam 18a and second roller 88 to engage outwardly facing track 144 of cam 18a. For each cam follower assembly 26, an adjustable spacer 90 may bear against outer surface 145 of shoulder 138. Spacer 90 can be radially adjusted to correspondingly adjust the position and alignment of rollers 86, 88 on tracks 142, 144, respectively. Piston assembly 22 is constrained to reciprocate along combustion assembly axis 71 which is spaced apart from driveshaft axis 14 a distance D. Axial movement of piston assembly 22 along combustion assembly axis 71 is translated into rotational movement of driveshaft 12 about axis 14 by virtue of cams 18a and 18b. In the illustrated embodiment, it will be appreciated that the shape of shoulder 138 is generally sinusoidal and peak 140a of cam 18a has a rounded shape at its apex 143, while the corresponding surface of peak 140a of cam 18b has a linear or flat portion 149 (as described above) at its apex 143. In other embodiments, the shoulder 138 may have a segmented polynomial shape, in which case, opposing peaks 140 would be rounded at apex 143 of both cams 18 and opposing troughs 141 would likewise be similarly rounded at their bottom. In other embodiments, the shoulder 138 of each cam 18a, 18b may have other shapes.

Figure 7A:
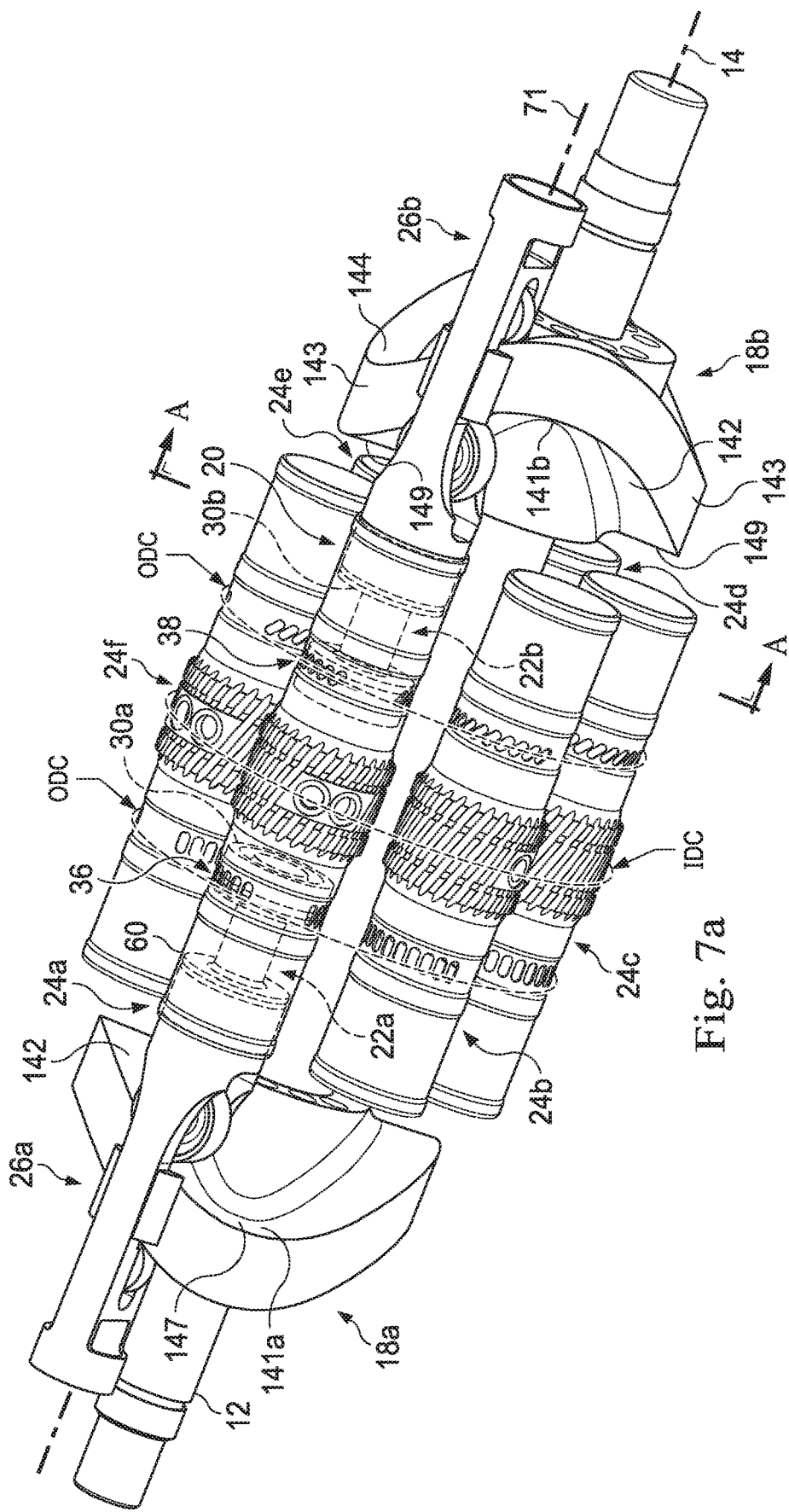
FIG. 7a is a perspective view of six-cylinder assemblies deployed about a driveshaft.

FIGS. 7a and 7b illustrate cylinder assemblies 24 symmetrically positioned around driveshaft 12. While cylinder assemblies 24 are generally supported by engine block 53 (see FIG. 1), for ease of depiction, the engine block 53 is not shown in FIGS. 7a and 7b. In one embodiment, six cylinder assemblies 24a, 24b, 24c, 24d, 24e and 24f are utilized, although fewer or more cylinder assemblies 24 could be incorporated as desired. In any event, the cylinder assemblies 24a-24f are positioned around driveshaft 12 between cams 18a, 18b. It will be understood that while a pair of piston assemblies 22 is only illustrated as being engaged with cylinder assembly 24a for ease of description, each cylinder assembly 24 includes a pair of piston assemblies 22. In any event, a first piston assembly 22a and a second piston assembly 22b which piston assemblies 22a, 22b are axially aligned with one another within a cylinder assembly 24a. Cams 18a, 18b are mounted on driveshaft 12 so that the cams 18a, 18b are aligned to generally mirror one another. Each piston assembly 22 within combustion cylinder 60 moves between ODC (where each piston is adjacent a respective port outer edge 61, 65 as shown in FIG. 3) to a position adjacent IDC where combustion occurs. Combustion within cylinder 60 of cylinder assembly 24a drives first piston assembly 22a and second piston assembly 22b away from one another along the combustion assembly axis 71 of cylinder assembly 24a towards ODC. Cylinder 60 constrains each piston assembly 22a, 22b to axial reciprocation along combustion assembly axis 71. This axial movement of piston assemblies 22a, 22b along combustion assembly axis 71 is translated by cams 18a and 18b into rotational movement of driveshaft 12 about axis 14 as the rollers 86, 88 of respective cam follower assemblies 22a, 22b moves along the tracks 142, 144 of their respective cams 18a, 18b.

While cams 18a, 18b generally mirror one another, as explained above, in some embodiments where shoulder 143 has a sinusoidal shape, the trough 141a of cam 18a may be shaped to include a flat portion 147 (a portion that lies in a plane perpendicular to driveshaft axis 14) relative to corresponding opposing trough 141b of cam 18b, which is illustrated as generally curved through the entire trough 141b, causing piston 30a to have a different momentary displacement in combustion cylinder 60 relative to piston 30b. In particular, as shown, as cam follower assembly 26a reaches flat portion 147 of track 142 of cam 18a, piston 30a will remain retracted at outer dead center ("ODC") momentarily even as piston 30b continues to translate as its cam follower assembly 26b moves along track 142 of cam 18b. It will be appreciated that this allows intake ports 38 to remain open while exhaust ports 36 are closed by the proximity of piston 30b to exhaust ports 36. A similar phenomenon occurs when cam follower assemblies 22a, 22b reach an apex 143 of their respective cams 18a, 18b. As described, the apex 143b of cam 18b includes a flat portion 149 (a portion that lies in a plane perpendicular to driveshaft axis 14) relative to corresponding opposing apex 143a of cam 18a, which is illustrated as generally curved through the entire apex 143a, causing piston 30b to have a different displacement in combustion cylinder 60 relative to piston 30a. In particular, as cam follower assembly 26b reaches flat portion 149 of track 142 of cam 18b, piston 30b will remain extended at inner dead center ("IDC") momentarily even as piston 30a continues to translate as its cam follower assembly 26a moves along track 142 of cam 18a. It will be appreciated in other embodiments, it may be desirable to ensure that each piston 30 is continuously moving within combustion cylinder 60, in which case, the shape of shoulder 138 does not include a portion that lies in a plane perpendicular to driveshaft axis 14. Thus, by utilizing the shape of shoulders 138 of opposing cams 18a, 18b, the relative translation of pistons 30a, 30b can be adjusted to achieve a desired goal, such as controlling the timing of opening or closing of ports 36, 38. In other words, the cams 18a, 18b control the timing for opening and closing of the ports 36, 38 utilizing the curvilinear shape of shoulder 138 to provide desired timing for each opening and closing operation as the pistons translate across their respective ports.

In addition or alternatively, to using the shape of shoulders 138 to adjust relative axial movement of pistons 30a, 30b, it will be appreciated that cam 18a can be radially displaced on driveshaft 12 relative to cam 18b, thereby achieving the same objective described above. Cams 18 may be located on driveshaft 12 with a small angular displacement with respect to each other in order to cause one of pistons 30 to be displaced in the combustion cylinder 60 slightly ahead or behind its opposing piston 30. This asymmetric piston phasing feature can be used to enhance scavenging operations, particularly as may be desirable when different fuel types are utilized within engine 10.

It will be appreciated particularly with reference to FIG. 7b that additional cylinder assemblies 24 may be symmetrically deployed about driveshaft 12 by simply increasing the diameter of cam shoulder 138. In some embodiments, where high torque is required, cam shoulder 138 may be large, with a corresponding large plurality of cylinder assemblies 24, but where each cylinder assembly has a much shorter stroke.

Figure 8:
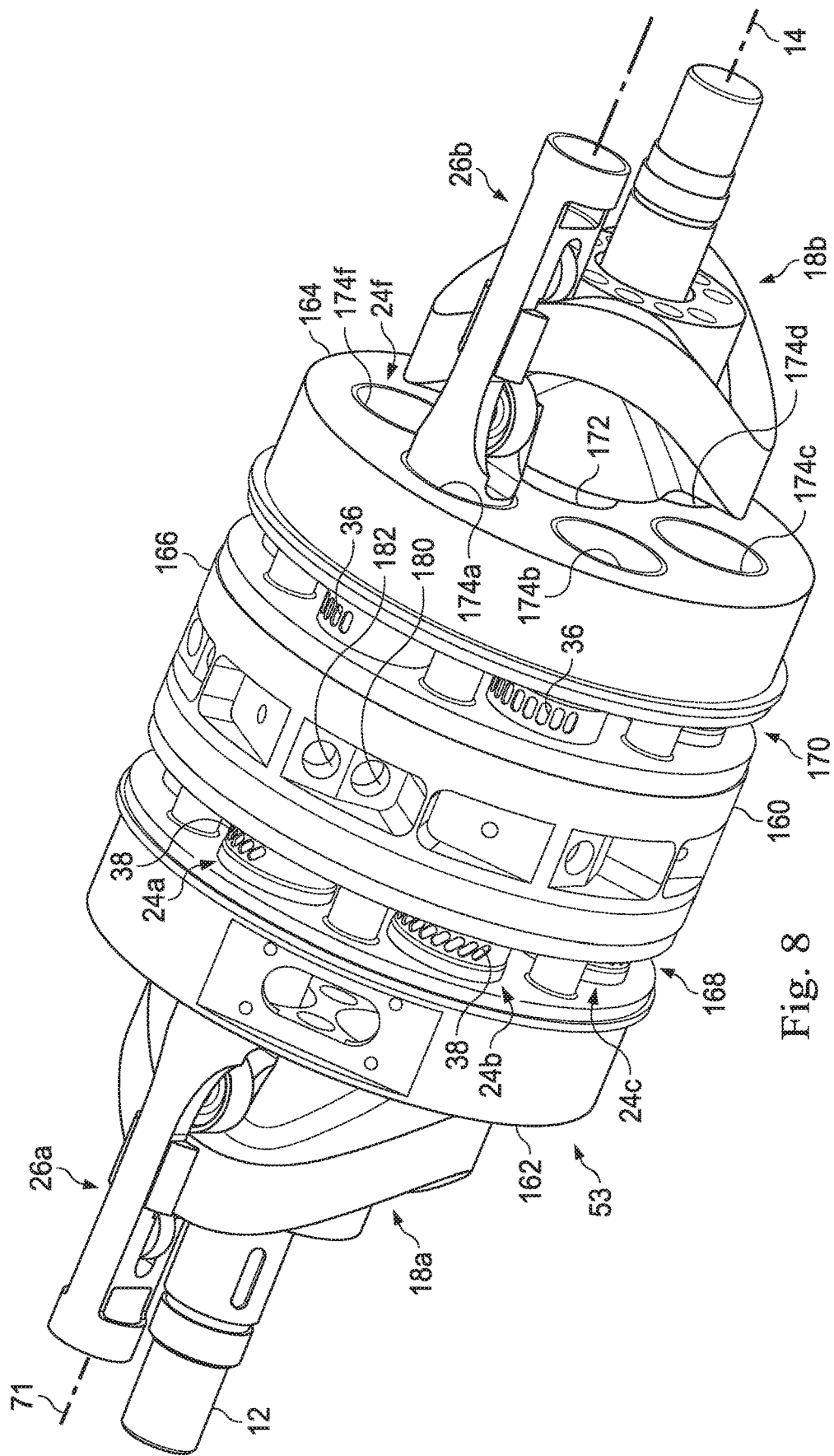

FIG. 8 illustrates the cylinder assemblies 24a-24f and driveshaft 12 of FIG. 7a in relation to engine block 53. In one or more embodiments, a magnet slide arm 31 may be attached to the second end 76 of one or more cam follower assemblies 22a, 22b with an associated stator cylinder assembly 24 disposed adjacent each magnet slide arm 31 along combined assembly axis 71. Thus, as shown, engine block 53 is positioned about driveshaft 12 between cam 18a and cam 18b. Engine block 53 generally extends between a first end 162 and a second end 164 and includes an annular body portion 160 therebetween, which annular body portion 160 is characterized by an exterior surface 166. Formed in body 160 is a first annular channel 168 and a second annular channel 170 spaced apart from one another. Although annular channels 168, 170 may be formed internally of the exterior surface 166, in the illustrated embodiment annular channels 168, 170 extend from exterior surface 166 inwardly. Similarly, while the illustrated embodiment shows annular channels 168, 170 extending around the entire circumference of cylindrical body 160, in other embodiments, one or both annular channels 168, 170 may extend only partially around the circumference of cylindrical body 160. A central driveshaft bore 172 extends between ends 162, 164. Likewise, two or more symmetrically positioned cylinder bores 174 extend between ends 162, 164 and are radially spaced outward of central driveshaft bore 172. In the illustrated embodiment, engine block 53 has six cylinder bores 174 symmetrically spaced about driveshaft bore 172, of which cylinder bores 174a, 174b 174c and 174f are visible. Disposed in each cylinder bore 174 is a cylinder assembly 24, and thus, illustrated are cylinder assemblies 24a, 24b, 24c and 24f. As such, engine block 53 supports the cylinder assemblies 24. Each cylinder assembly 24 is positioned in engine block 53 so that its intake ports 38 are in fluid communication with the first annular channel 168 and that its exhaust ports 36 are in fluid communication with the second annular channel 170. When so positioned, each first injection port 68 and each second injection port 70 of cylinder assembly 24 align with a first port 180 and a second port 182 provided in the exterior surface 166 of engine block 53. Opposing cam follower assemblies 26*a*, 26*b* are illustrated as engaging their respective cams 18*a*, 18*b* and extending along combined assembly axis 71 into the cylinder assembly 24*a* supported in cylinder bore 174*a* of engine block 53.

One benefit of the engine of the disclosure, particularly with respect to engine block 53, but also with respect to other engine components, is that it maintains a closed circuit of forces/reaction throughout an engine stroke, keeping all the stress, compression, pressures, moments and forces contained within the circuit, from the cylinder combustion chamber, to pistons, to rollers, cams and finally driveshaft. There is no lateral or unbalanced forces acting during operation, as always occur on crankshaft systems with its geometry naturally unbalanced and misaligned. The closed circuit of forces refers to the sequence of forces applied during each power stroke. This eliminates the need for heavy reinforced engine blocks, housings, bearing, driveshafts and other components. The sequence commences upon combustion, followed by burnt gases expansion creating a power stroke in opposed directions, applying aligned compressive forces on the pistons, transmitted to the cam follower assemblies engaging the cams, through the cams, where the reciprocating linear motion from the pistons became rotational motion on the cams that then returns as opposed, aligned compressive forces in the driveshaft. In other words, the expansion forces passing through the pistons are always aligned, as are the compressive forces applied to the driveshaft. This also significantly reduces the presence of engine vibrations during operation. In contrast, asymmetric forces are applied on conventional driveshafts during operation, which creates a variety of deflections and reactions that must be contained by the engine block, driveshaft and bearings through the use of heavier, stronger materials. By eliminating the need for such reinforced engine components, the engine block, driveshaft and other components of the engine of the disclosure may be formed of other materials that need only be utilized to support the engine components as opposed to withstand unbalanced forces. Such materials may include plastics, ceramics, glass, composites or lighter metals. Thus, there may be a weight savings, which is particularly desirable for use of engine 10 in aircraft.

Figure 9:
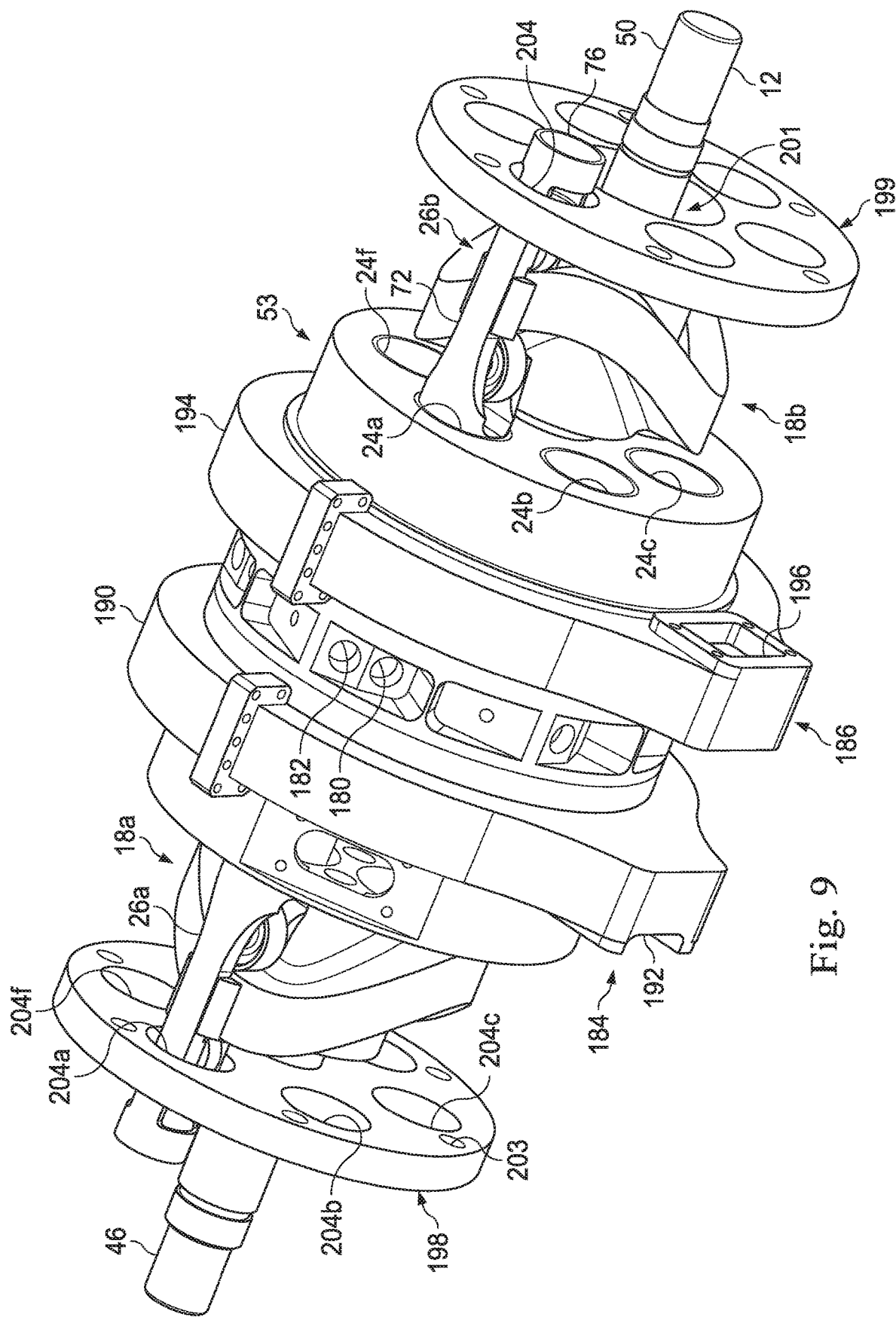
FIG. 9 is a perspective view of an engine illustrating annular air intake and exhaust manifolds.

FIG. 9 illustrates the cylinder assemblies 24*a*-24*f*, driveshaft 12, cam follower assemblies 26*a*, 26*b*, cams 18*a*, 18*b* and engine block 53 of FIG. 8, but with annular flow manifolds installed. In particular, a first annular manifold 184 is illustrated installed over and around first annular channel 168. First annular manifold 184 may be an air intake manifold for supplying air to first annular channel 168 and intake ports 38 of the cylinder assemblies 24. Also illustrated is a second annular manifold 186 installed over and around second annular channel 170. Second annular manifold 186 may be an exhaust manifold for removing exhaust from cylinder assemblies 24 via exhaust ports 36 in fluid communication with second annular channel 170.

Manifold 184 is generally formed of a torodial shaped wall 190 in which a port 192 is formed. Likewise, manifold 186 is generally formed of a toroidal shaped wall 194 in which a port 196 is formed.

Also shown in FIG. 9 is a first guidance cap 198 deployed around driveshaft 12 between its first end 46 and cam 18*a*, and a second guidance cap 199 deployed around driveshaft 12 between its second end 50 and cam 18*b*. In one or more embodiments, a magnet slide arm 31 may be attached to the second end 76 of each cam follower assembly 26*a*, 26*b* with an associated stator cylinder assembly 24 disposed adjacent each magnet slide arm 31 along combined assembly axis 71. Each guidance cap 198, 199 generally includes a central bore 201 through which driveshaft 12 extends and two or more guide bores 204 radially spaced outward of central bore 201, with each guide bore 204 corresponding with and axially aligned with an adjacent cylinder assembly 24 supported by engine block 53. In one or more embodiments, a guidance cap 198, 199 may be a plate with the above described bores 201, 204 formed therein. In other embodiments, a guidance cap 198, 199 may be a plate with support cylinders passing through the plate to form each guide bore 204. The support cylinders may, in turn, seat in corresponding cylindrical-shaped reliefs formed in sump casings 54, 56, thereby providing additional support to guidance caps 198, 199. In the illustrated embodiment, each guidance cap 198, 199 has six bores 204, namely 204*a*, 204*b*, 204*c*, 204*d*, 204*e* and 204*f*, symmetrically spaced about central bore 201. Each bore 204 is disposed to receive a cam follower assembly 26 and/or a cylinder assembly 24 to provide support as the cam follower assembly 26 reciprocates into and out of its respective cylinder assembly 24. In some embodiments, the bore 204 is sized to correspond with the smaller diameter cylindrical end 76 forming cam follower assembly 26, allowing the smaller diameter cylindrical end 76 to slide within bore 204 as piston 30 reciprocates in cylinder assembly 24. In other embodiments, bore 204 may be sized to receive a cylinder assembly 24. In addition, one or both guidance caps 198, 199 may be utilized to inject lubricating and cooling oil into to port 98 of the cam follower assembly 26. In particular, the guidance caps may be used to transfer the oil coming from an oil pump (not shown) to bearings 87, 89 of cam follower assembly 26. Each guidance cap 198, 199 may include one or more ports 203 for communicating a lubricant through port 203 to port 98 of the cam follower assembly 26.

A fuel injector assembly 208 is shown mounted in one of the ports 180, 182 of the engine block 53, while a sparkplug 210 is shown as mounted in the other of the ports 180, 182 of engine block 53. Engine block 53 is supported by and partially encased by a first engine block support 212 at one end of the engine 10 and engine block 53 is supported by and partially encased by a second engine block support 214 at the opposite end of the engine 10. In this regard, sump casing 54 cooperates with first engine block support 212 to enclose engine block 53 around the first end 46 of driveshaft 12 forming an oil lubrication and cooling chamber for providing oil to cam 18*a* and its associated cam follower assemblies 26, while sump casing 56 cooperates with second engine block support 214 to enclose engine block 53 around the second end 50 of driveshaft 12 forming an oil lubrication and cooling chamber for providing oil to cam 18*b* and its associated cam follower assemblies 26. An oil port 218 may be provided in each of engine block support 212, 214 or sump casing 54, 56.

A first flange 44 is attached to a driveshaft 12 with a flywheel 52 mounted on first flange 44.

An electric starter 219 may be provided to initiate rotation of driveshaft 12 (not shown).

In some embodiments, an air supply device 220, may be used to introduce air into first annular manifold 184 via port 192 in wall 190. Air supply device 220, while not limited to a certain type, may be a turbocharger or blower in some embodiments to maintain positive air pressure in order to provide continuous new charges of air in each engine cycle.

In other embodiments, air supply device 220 may be eliminated and pulse jet effect, also known as the Kadenacy effect, may be utilized to draw combustion air into cylinder assembly 24 (as opposed to air supply device 220 or retraction movement of a hot piston assembly 22). More specifically, if the period of opening and closing of the exhaust ports 36 is less than a 300th of a second, the speed of the exhaust gas exchange from the cylinder assembly 24 to atmosphere is extremely rapid. This rapid opening and closing of the exhaust ports 36 of a cylinder assembly 24, just before the air intake port 38 is opened, added by a specific exhaust port area to piston bore ration, will produce the pulse jet effect. This effect can be mechanically achieved by the engine of the disclosure using the phasing of cams 18 as described above, in conjunction with the timing of the exhaust port cam to speed up the hot piston when traveling through open/closing the exhaust port, and holding the cold piston in a opened air intake port just after closing exhaust port. This can be achieved by using curvilinear shaped cam shoulders to control cam phasing.

Turning to FIGS. 11a-11K, the operation of engine 10 will be described with reference to a system of four cylinder assemblies 24, of which cylinder assembly 24a will be the primary focal point, with references to cylinder assemblies 24b and 24d. Generally depicted is driveshaft 12 on which is mounted cams 18a and 18b, each having a curvilinear shaped shoulder 138. In the illustrated embodiment, each of cams 18a, 18b has two lobes 151 formed by two peaks 140 and two troughs 141 and are disposed on driveshaft so as to be radially aligned, i.e., without a radial offset of one cam 18 relative to the other cam. A cam follower assembly 26a engaged cam 18a and a cam follower assembly 26b engages cam 12b so that roller 86 of the respective cam follower assemblies 26a, 26b engage the inwardly facing track 142 of the shoulder 138 of each cam 18a, 18b. Cam follower assembly 26a reciprocates a piston arm 28a and piston 30a within cylinder 60 of cylinder assembly 24a, while cam follower assembly 26b reciprocates a piston arm 28b and piston 30b within cylinder 60. First guidance cap 198 supports cam follower assembly 26a while second guidance cap 199 supports cam follower assembly 26b. Movement of piston 30a within cylinder 60 will be described relative to intake ports 38 formed in cylinder 60. Movement of piston 30b within cylinder 60 will be described relative to exhaust ports 36 formed in cylinder 60. The area between opposing pistons 30a, 30b within cylinder 60 forms combustion chamber 32. Inner dead center (IDC) and outer dead center (ODC) relative to the piston 30 for cylinder assembly 24a are indicated.

FIG. 11a illustrates the pistons 30a, 30b at IDC, wherein each piston 30a, 30b is at its innermost axial position within cylinder 60. In this position, each cam follower 26a, 26b engages its respective cam 12a, 12b at a peak 140. In this position, intake ports 38 are in a "closed" configuration, whereby the piston head 30a is positioned between IDC of cylinder assembly 24a and intake ports 38, thereby blocking flow of combustion air combustion chamber 32. Likewise, exhaust port 36 is in a "closed" configuration, in that piston head 30b is positioned between IDC of cylinder assembly 24a and exhaust port 36, thereby blocking fluid communication between combustion chamber 32 and exhaust port 36. In this position, driveshaft 12 is illustrated as being at a reference angle of 0°. Intake port 38 and exhaust port 36 (as highlighted by the boxes) are closed, with the piston 30 between the ports 38, 36 and the center of the cylinder 60.

Figure 11B:
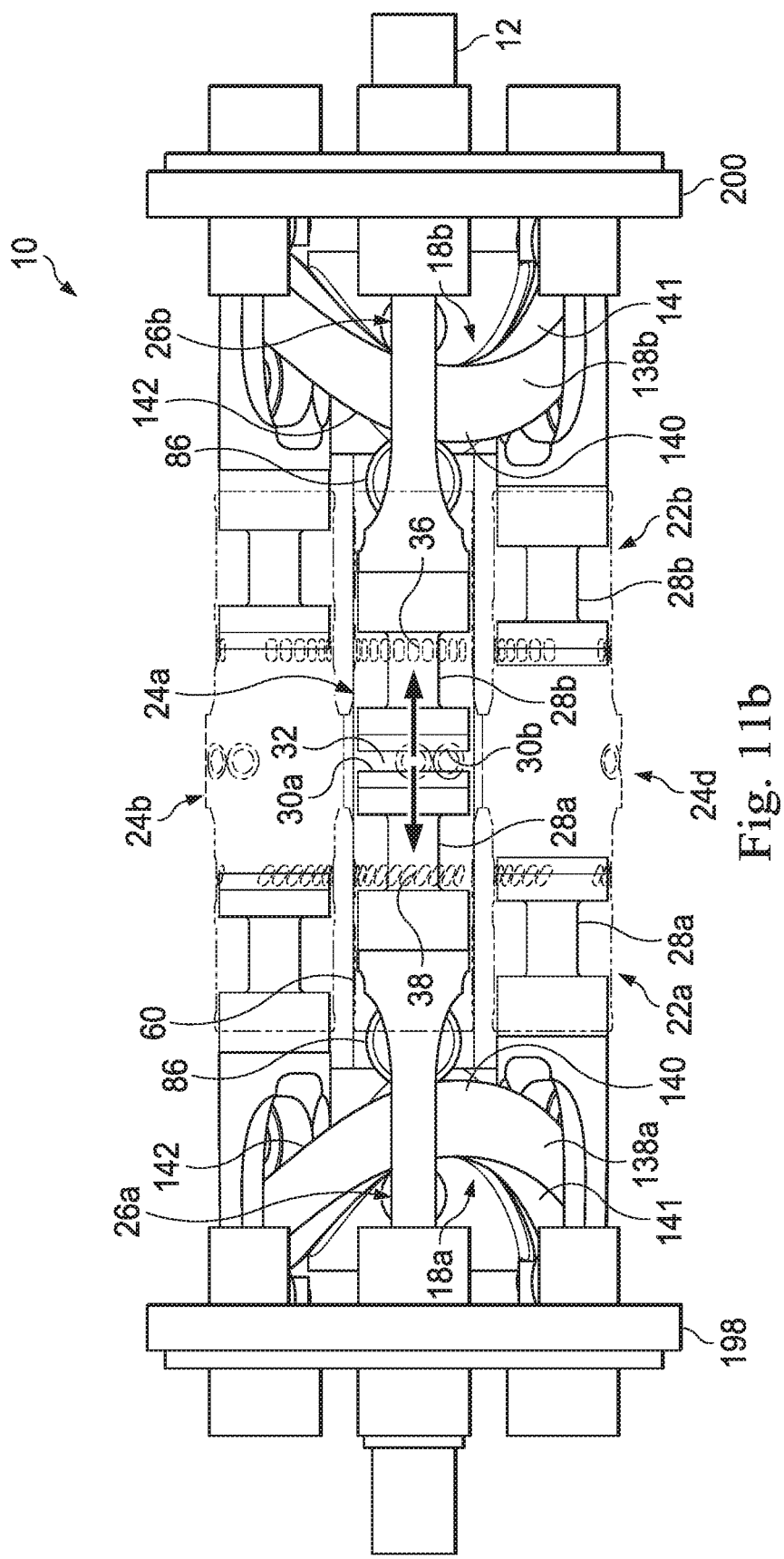

In FIG. 11b, combustion occurs within combustion chamber 32, initiating the expansion stroke and applying an axial force (as indicated by the arrows) to each of pistons 30a, 30b. At the point of the expansion stroke, intake port 38 and exhaust port 36 (as highlighted by the boxes) are still closed, with the piston 30 between the ports 38, 36 and the center of the cylinder 60.

Figure 11C:
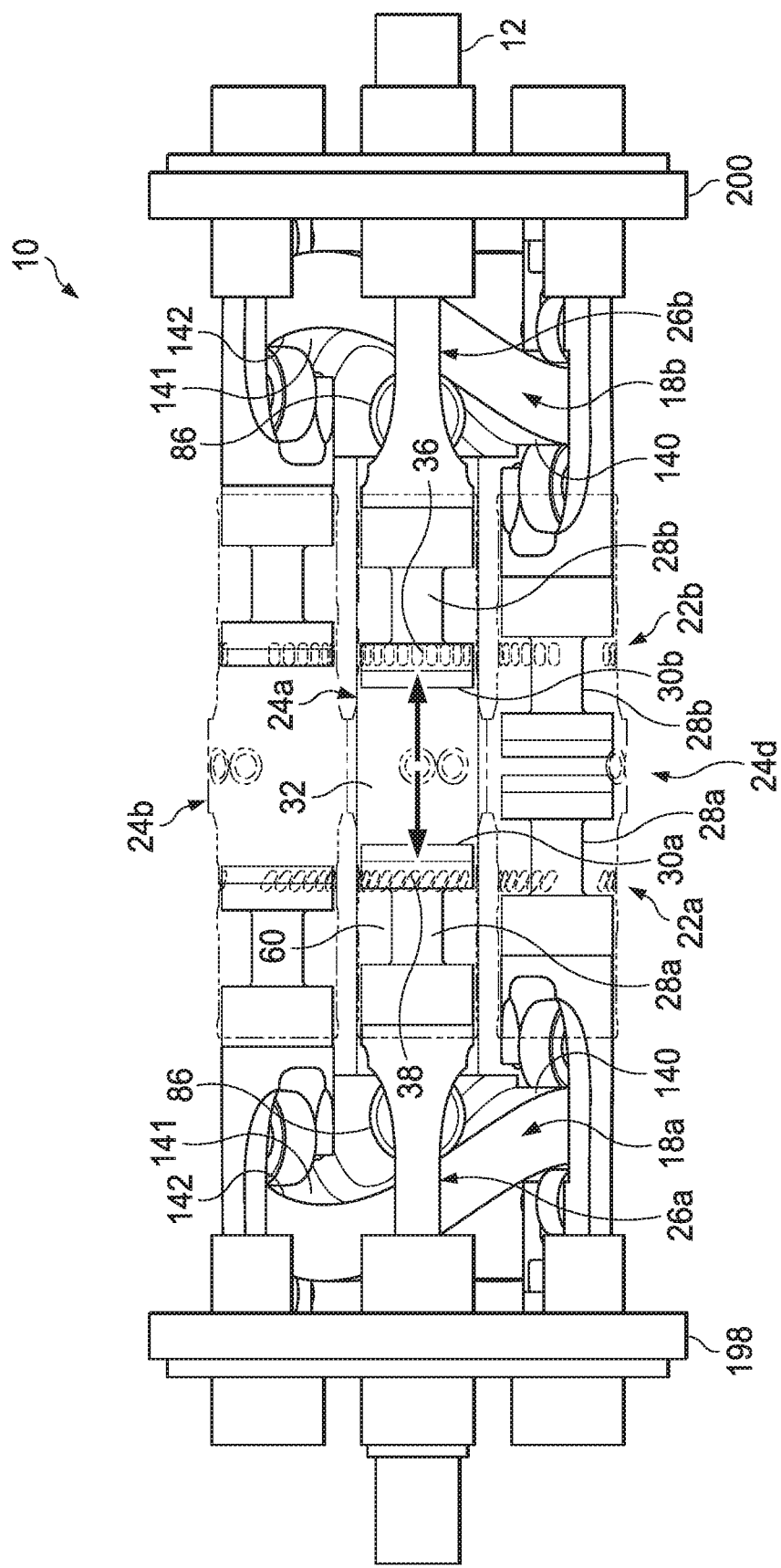
Figure 11D:
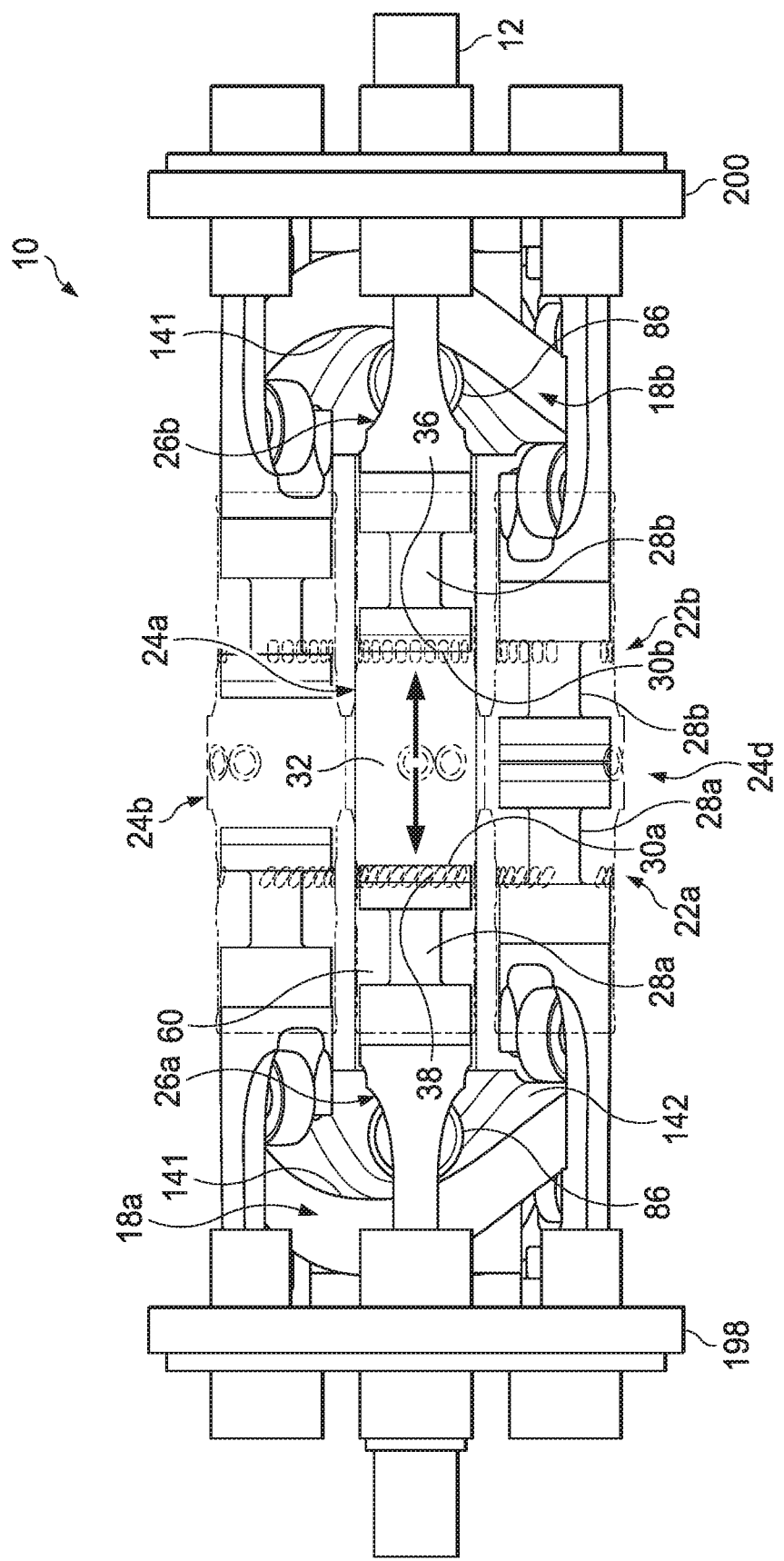

In FIG. 11c, with the expansion of the combustion gases within cylinder 60, pistons 30a, 30b begin to move axially away from one another (as shown by the arrows). This in turn forces each cam follower assembly 26a, 26b to begin to move along a descending portion of the shoulder track of their respective cams 18a, 18b. In doing so, the axial motion of the cam follower assembly 26 is converted to rotational motion of driveshaft 12. At this point in the expansion stroke, both ports 36, 38 remain closed by virtue of the proximity of the piston heads 30a, 30b to the respective ports. Although pistons 30a, 30b have begun to move, at the point of the expansion stroke, intake port 38 and exhaust port 36 are still closed by virtue of the proximity of piston 30a, 30b to ports 38, 36, respectively. As described above, the speed of movement of the respective pistons can be adjusted by adjusting the slope of the descending portion In FIG. 11d, as the expansion stroke continues, piston 30b has translated a sufficient distance towards cam 18b that exhaust port 36 begins to open, releasing exhaust air through port 36 (although port 36 is not open). Because exhaust port 36 has an inner port edge 67 (see FIG. 3) that is closer to IDC than the inner port edge 63 (see FIG. 3) of the intake port 38, intake port 38 remains closed by virtue of the position of the port 38 relative to piston head 30a. As can be seen, roller 86 of cam follower assembly 26b has begun to move toward a trough 141 of cam 18b along a descending portion of cam shoulder 138.

Figure 11E:
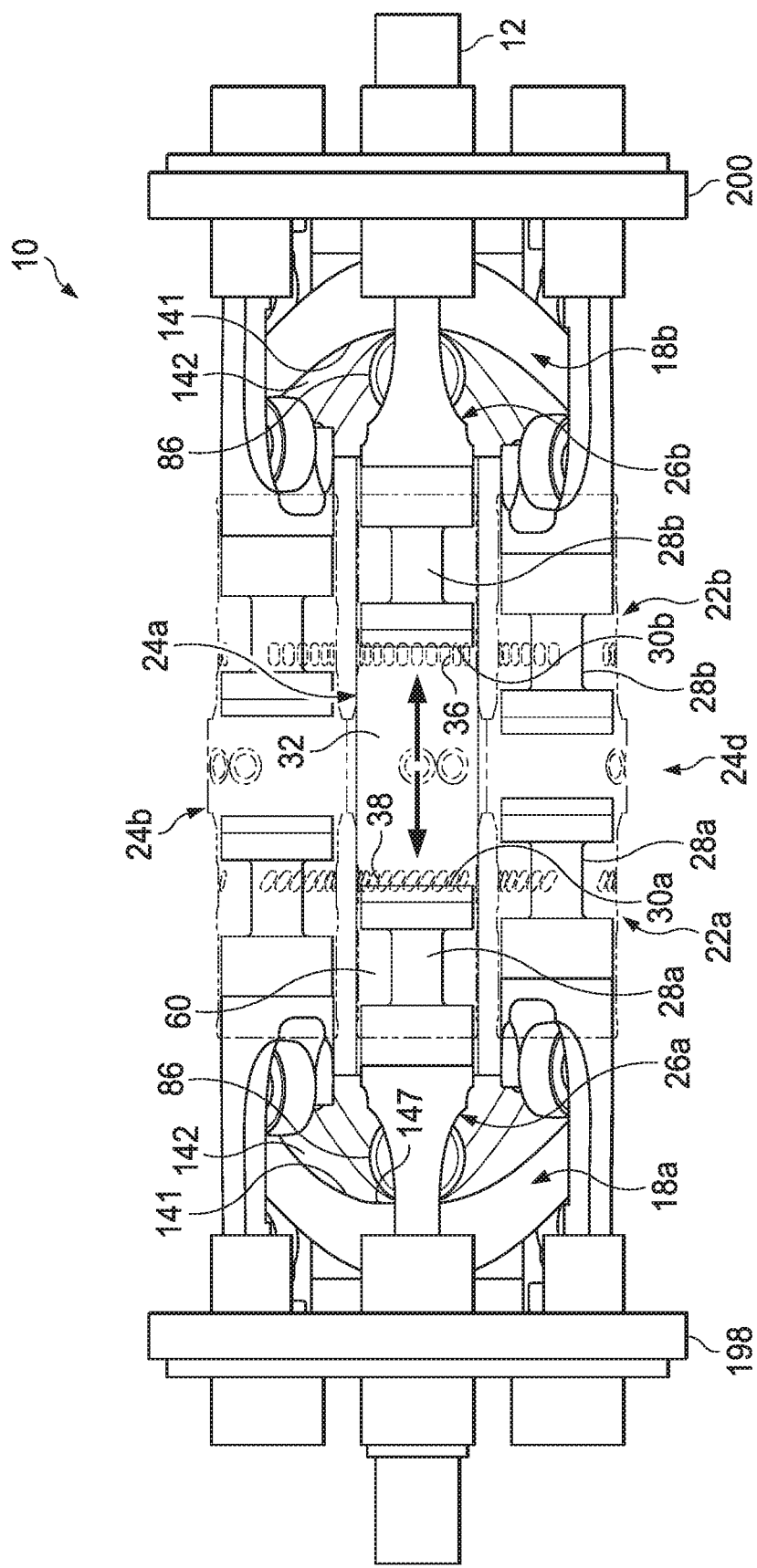

In FIG. 11e, piston 30b has translated a sufficient distance towards cam 18b that exhaust port 36 is open, releasing exhaust through exhaust port 36. In addition, piston 30a has translated a sufficient distance towards cam 18a that intake port 38 begins to open, allowing air to flow into combustion chamber 32 via port 38 (although port 38 is not open). In some embodiments where port 38 comprises a plurality of angled slots, the angled nature of the slots and the length of the slots themselves causes air to begin to swirl as it enters combustion chamber 32, thereby enhancing mixing of the air with fuel injected by a fuel injector (not shown). As noted above, in some embodiments, exhaust port 36 is comprised of a plurality of slots that extend only around a portion of the perimeter of cylinder 60 so as to minimize heat transfer to internal portions of engine 10. For example, such slots may extend only around that portion of the perimeter that is not adjacent or facing another cylinder 60.

Figure 11F:
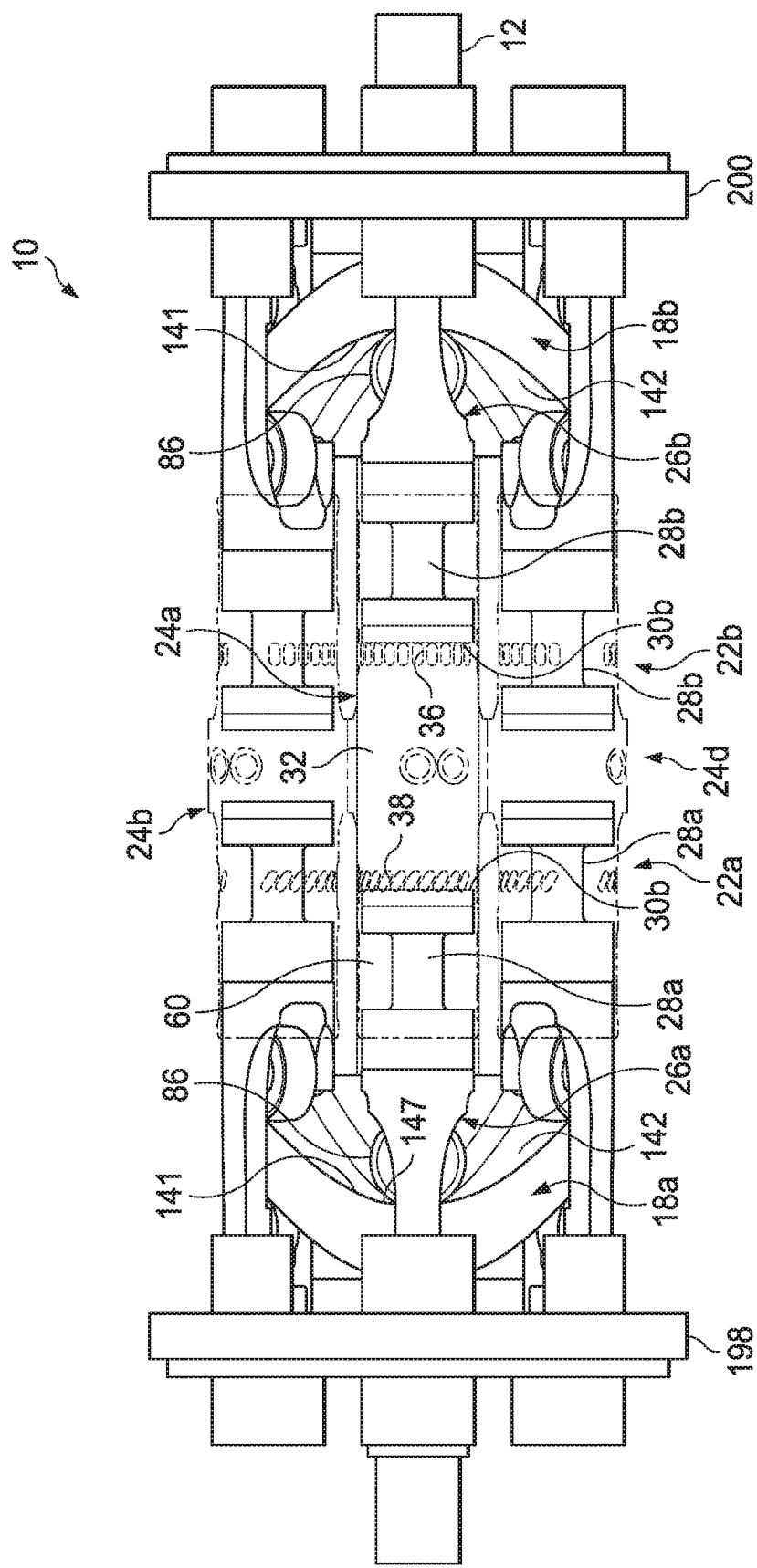

In FIG. 11f, each piston 30a, 30b reaches ODC adjacent the outer port edges 61, 65 of their respective ports 38, 36 by virtue of cam follower assemblies 26a, 26b reaching the bottom of the troughs 141 of their respective cams 18a, 18b. When pistons 30a, 30b are at ODC, exhaust port 36 and intake port 38 are open, allowing exhaust to exist combustion chamber 32 and combustion air to enter combustion chamber 32. The illustrated embodiment depicts cams 18a, 18b with substantially sinusoidal shaped shoulders 138a, 138b, and as such, as described above, it will be observed that on the intake side of the engine 10, a portion 147 of trough 141 of cam 18a is flattened (as compared to opposing trough 141 of cam 18b which is rounded).

Figure 11G:
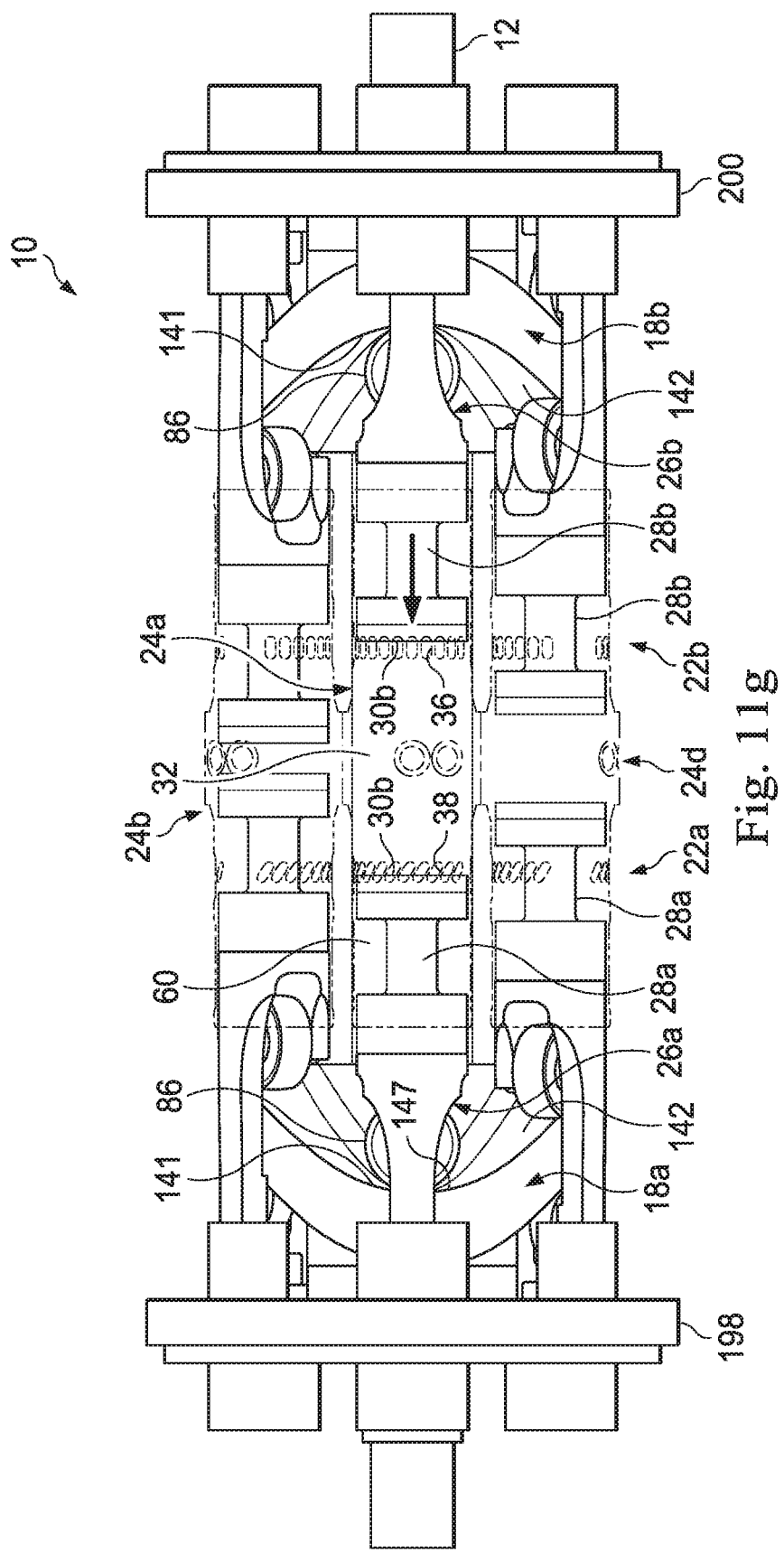

In FIG. 11g, piston 30b begins to move, while piston 30a remains stationary due to the flattened portion 147 of trough 141 of cam 18a (as compared to opposing trough 141 of cam 18b which is rounded). While piston 30a temporarily remains at ODC, the movement of piston 30b begins closing off exhaust port 36. The lag in timing between piston 30a and piston 30b permits additional combustion air to enter combustion chamber 32 since intake port 38 remains open when piston 30a is at ODC.

Figure 11H:
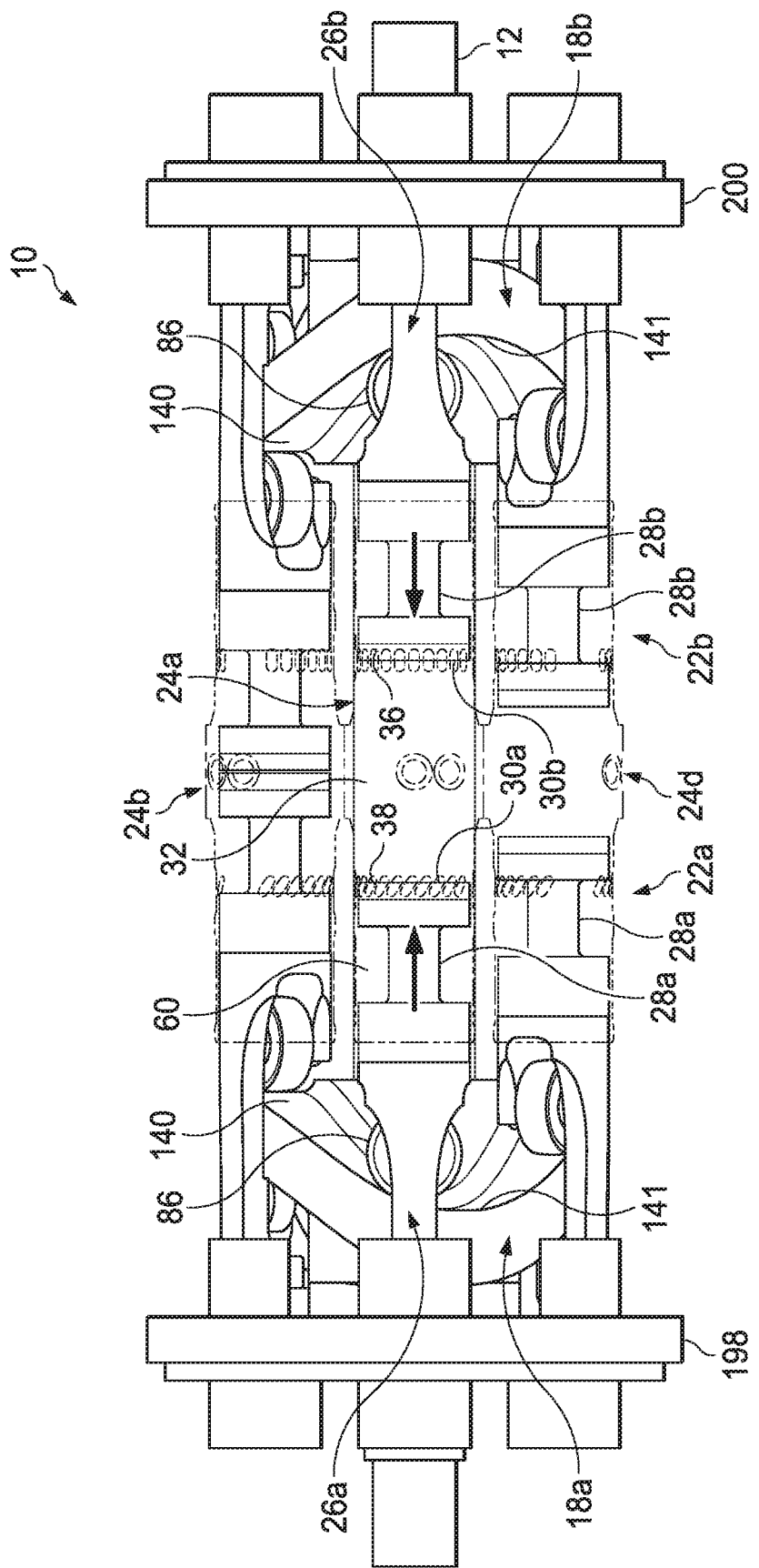

In FIG. 11h, both cam follower assemblies 26a, 26b are shown beginning to move along the ascending shoulder portion of their respective cam tracks 142 from trough 141 towards peak 140, thus beginning the compression stroke. As illustrated, each piston 30a, 30b is still spaced apart from their respective port 38, 36, such that the ports are still open at this point in the stroke.

Figure 11I:
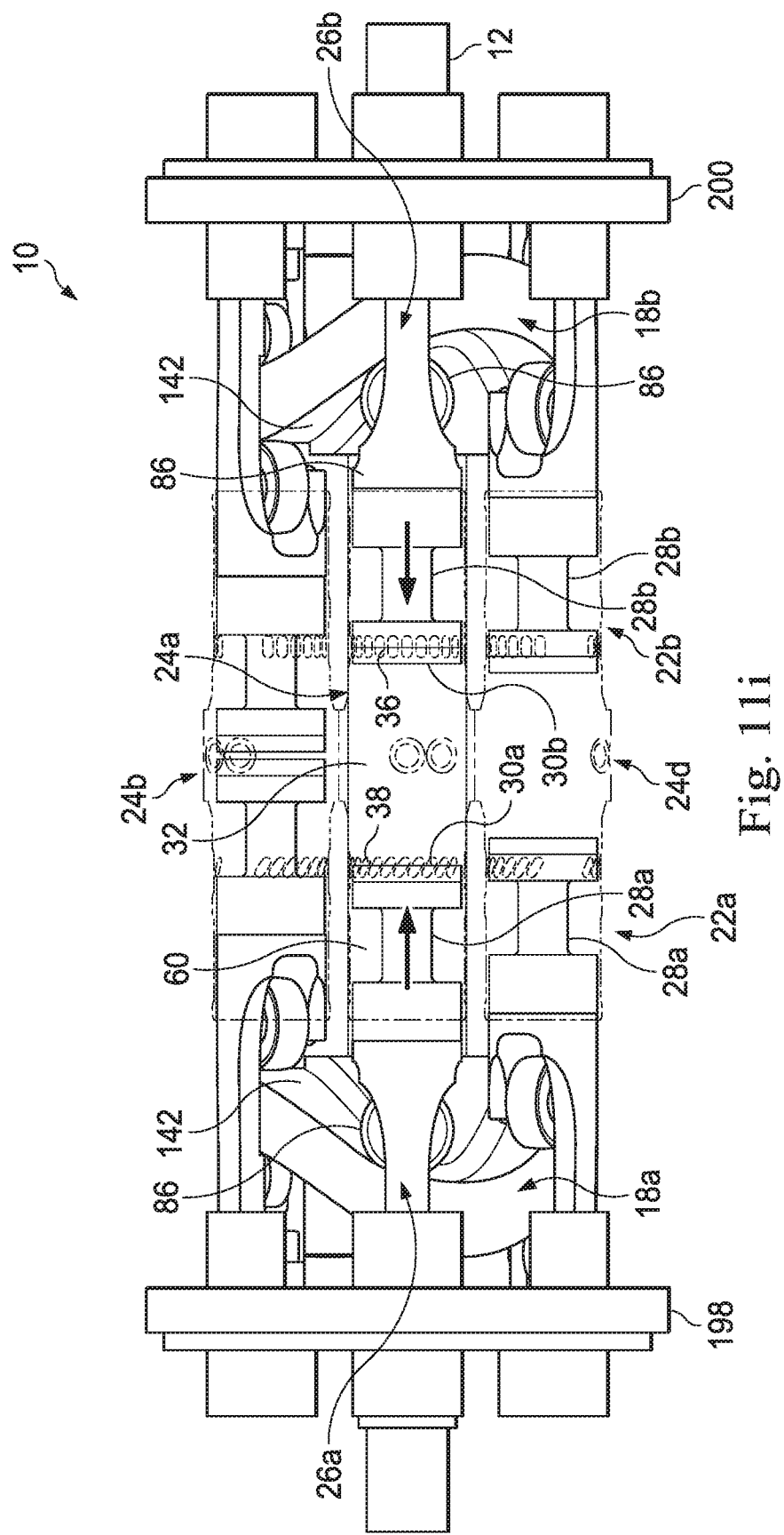

In FIG. 11i, cam follower assembly 26b has progressed farther along track 142 of cam 18b than cam follower assembly 26a has progressed along track 142 of cam 18a. As such, exhaust port 36 is closed by piston 30b, which is adjacent thereto. However, because piston 30a along its track 142 lags behind piston 30b on its respective track, intake port 38 remains open for a period of time after exhaust port 36 has closed, thus allowing additional combustion air to enter combustion chamber 32. As noted above, intake port 38 may comprise a plurality of angled slots to promote swirl of the combustion air passing through port 38.

Figure 11J:
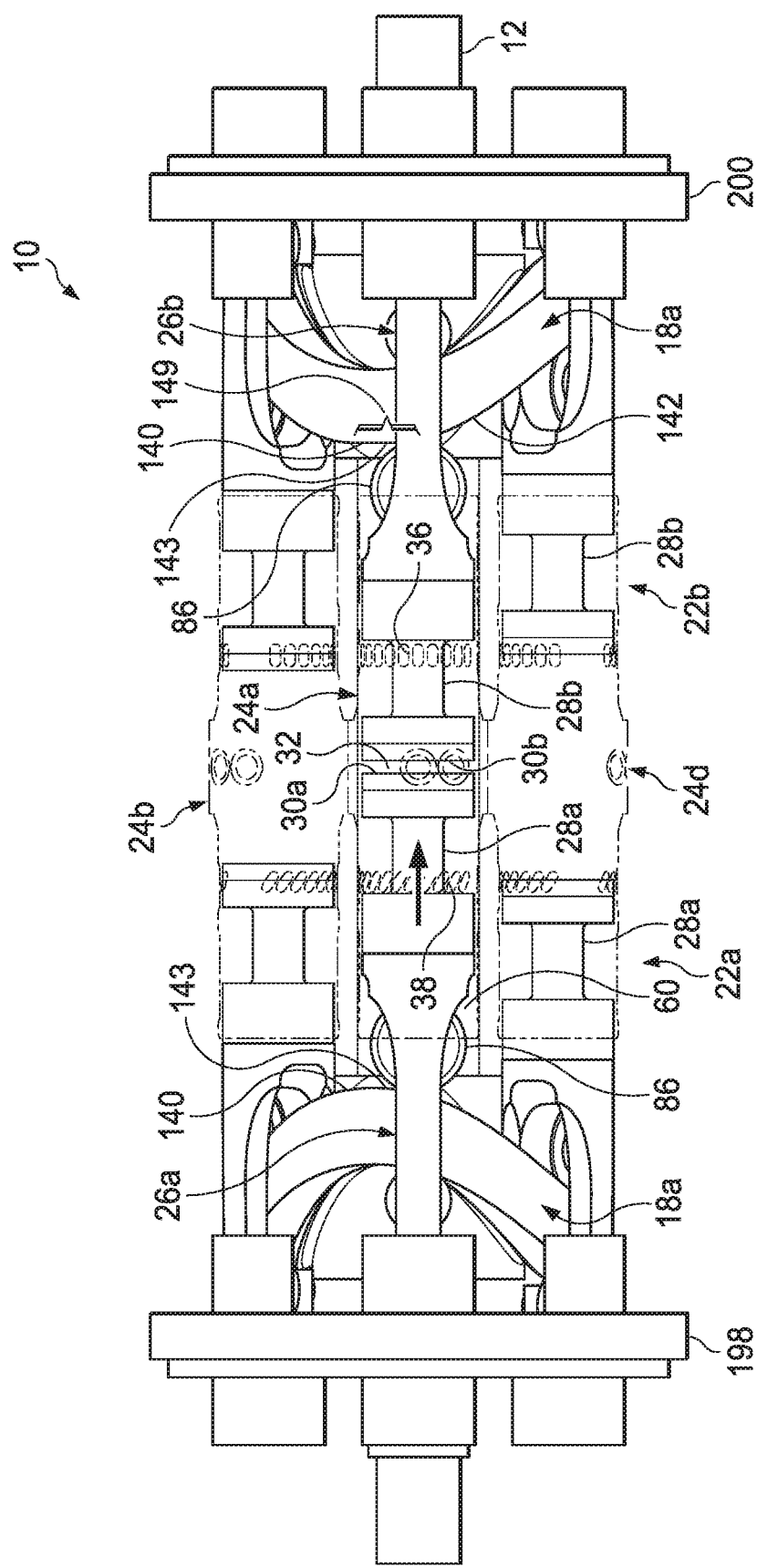

In FIG. 11j, both port 36, 38 are shown as being in a "closed" configuration by their respective pistons 30a, 30b, which prevent fluid communication between chamber 32 and ports 36, 38. In addition, cam follower assembly 26b has reached the apex 143 of peak 140 of track 142 of cam 18b, causing exhaust piston 30b to reach IDC. Because intake piston 30a still lags behind exhaust piston 30b at this point, intake piston 30a continues to move (as indicated by the arrow), compressing the combustion air and fuel injected in chamber 32. It will be observed that on the exhaust side of the engine 10, a portion 149 of apex 143 of cam 18b is flattened (as compared to opposing apex 143 of cam 18a), such that piston 30b temporarily remains at IDC even while piston 30a continues to move towards IDC. This lag by piston 30b permits piston 30a to "catch up" to piston 30b, so that their movement along their respective tracks 142 at the beginning of the next stroke once again are synchronized and mirror one another (until piston 30a reaches the bottom of the next trough 141).

Figure 11K:
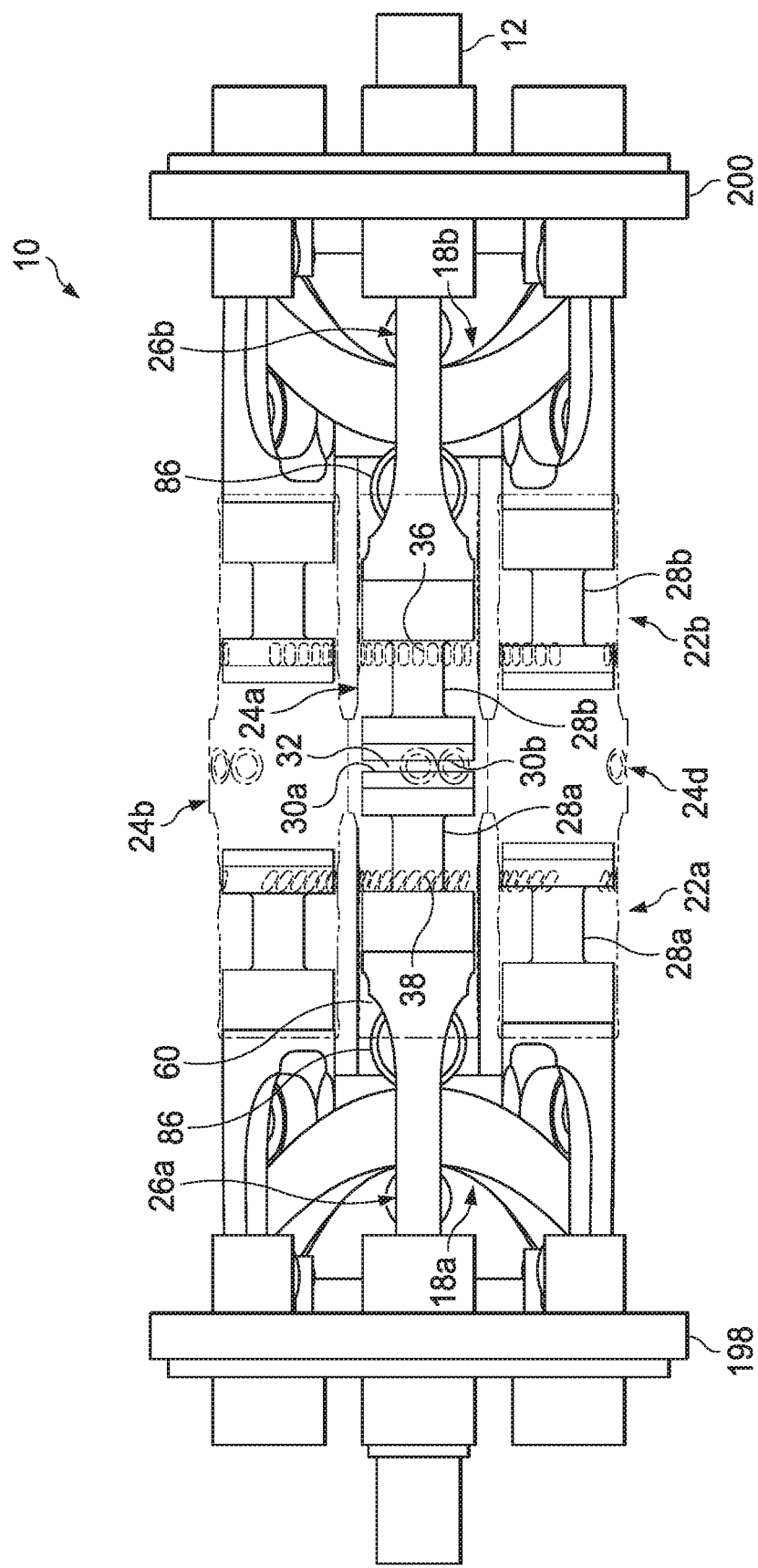

In FIG. 11k, both pistons 30a, 30b have reached IDC and are once again synchronized with one another along their respective cams 18a, 18b. Being at IDC, combustion air and fuel in combustion chamber 32 are compressed for ignition. At this point, having progressed from expansion stroke, through compression stroke and back to expansion stroke, driveshaft 12 has rotated 180° from its original reference point describe in FIG. 11a.

Figure 12:
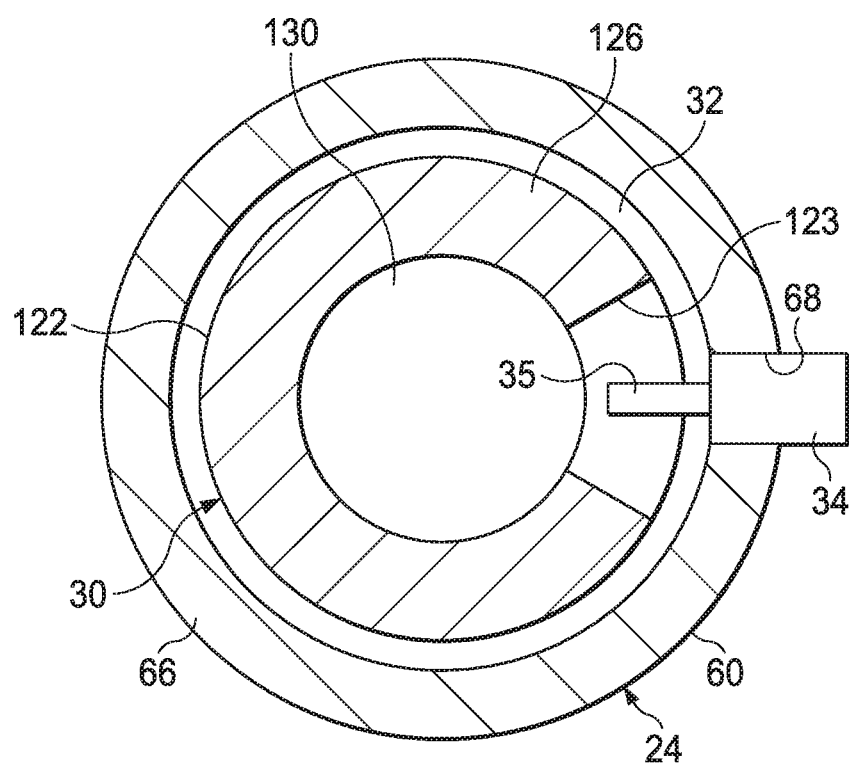
FIG. 12 is a cross-sectional view of a cylinder assembly with a fuel injection nozzle extending into a combustion chamber.

Turning to FIG. 12, a cross-sectional view of a cylinder assembly 24 with a piston 30 extended to IDC as described above is shown. In particular, cylinder assembly 24 includes a cylinder 60 having a fuel injection aperture 68 into which a fuel injector 34 is mounted. A nozzle 35 of fuel injector 34 extends from wall 66 of cylinder 60 into the combustion chamber 32. Piston 30 is shown in relation to nozzle 35. Piston 30 has a crown 126 in which an indention 130 is formed. Piston 30 is aligned within cylinder 60 so that fuel injector nozzle 35 is adjacent notch 123 formed at the periphery of crown 126. Notch 123 prevents piston 30 from contacting fuel injector nozzle 35 when piston 30 is at IDC. It has been found that in certain embodiments, it is desirable for fuel injector nozzle 35 to extend into combustion chamber 32 because heat within combustion chamber 32 can be utilized to pre-heat fuel in nozzle 35 before the fuel is injected into combustion chamber 32. By preheating fuel within fuel injector nozzle 35, combustion of the fuel within combustion chamber 32 is enhanced once the preheated fuel is injected into combustion chamber 32.

Figure 13:
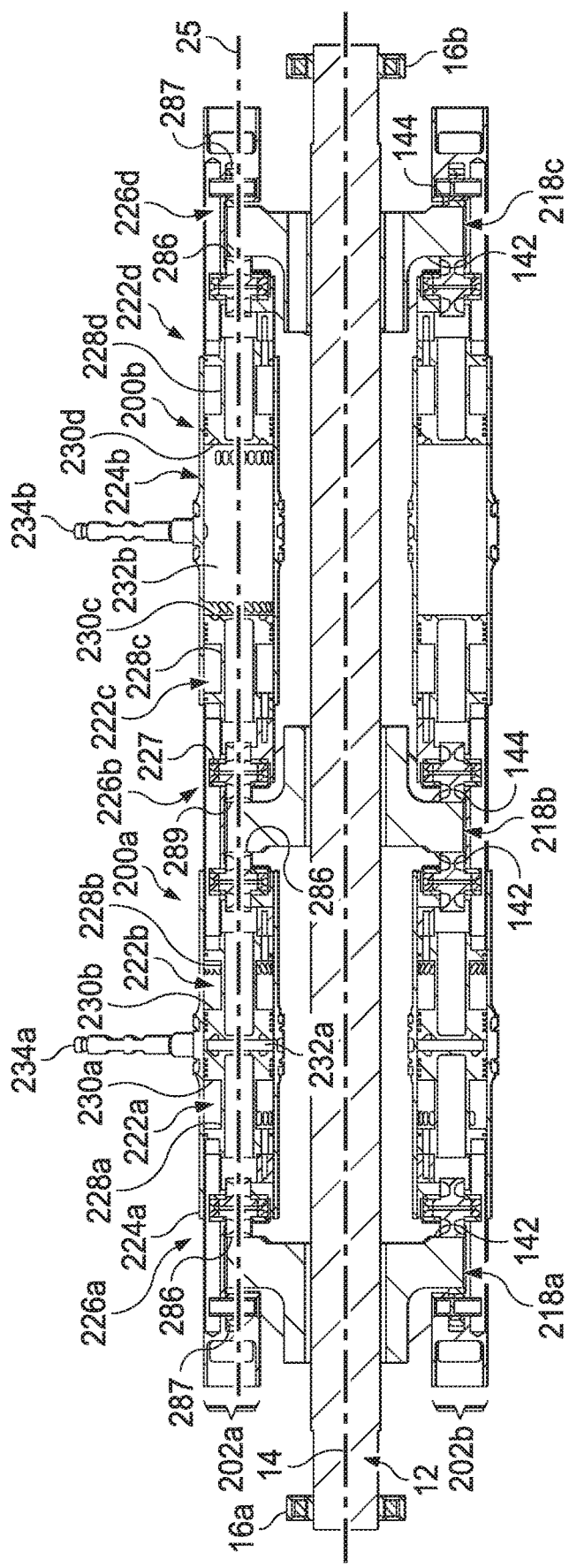
FIG. 13 is a cut-away side view of a barrel engine with piston pairs axially aligned in series.

Turning to FIG. 13, an alternative embodiment of engine 10 is illustrated, wherein two or more piston pairs 200, such as piston pairs 200a, 200b, are axially aligned in series along cylinder axis 25, together forming a piston series 202, such as piston series 202a. Specifically, in FIG. 13, driveshaft 12 extends along a driveshaft axis 14 and passes axially through the center of the engine 10. Driveshaft 12 is supported by a pair of bearings 16a, 16b in a fixed axial position. Positioned along driveshaft 12 in spaced apart relationship to one another are at least three harmonic barrel cams 218a, 218b, 218c, such as the barrel cams 18 described above. Each piston pairs 200 is comprised of a first piston assembly 222a and a second piston assembly 222b which piston assemblies 222a, 222b are axially aligned with one another within a combustion cylinder assembly 224a disposed along a cylinder axis 25. Cylinder axis 25 is spaced apart from but generally parallel with driveshaft axis 14 of driveshaft 12. Piston assembly 222a includes a piston arm 228a to which is mounted a piston 230a. Piston arm 228a is attached to a cam follower assembly 226a. Likewise, opposing piston assembly 222b is attached to a cam follower assembly 226b via a piston arm 228b to which is mounted a piston 230b. The opposed pistons 230a, 230b of piston pair 200a are adapted to reciprocate in opposite directions along cylinder axis 25. Each cam follower assembly 226a, 226b straddles its respective cam 218a, 218b and acts on its respective piston 230a, 230b. Opposed pistons 230a, 230b within cylinder assembly 224a generally define a combustion chamber 232a therebetween into which fuel may be injected by fuel injector 234a.

Piston pair 200b of piston series 202a likewise includes a first piston assembly 222c and a second piston assembly 222d which piston assemblies 222c, 222d are axially aligned with one another within a combustion cylinder assembly 224b disposed along a cylinder axis 25. Piston assembly 222c includes a piston arm 228c to which is mounted a piston 230c. Opposing piston assembly 222d includes a cam follower assembly 226d attached to a piston arm 228d to which is mounted a piston 230d. The opposed pistons 230c, 230d of piston pair 200b are adapted to reciprocate in opposite directions along cylinder axis 25. Opposed pistons 230c, 230d within cylinder assembly 224b generally define a combustion chamber 232b therebetween into which fuel may be injected by fuel injector 234b.

Thus, combustion cylinder assembly 224a is axially aligned with combustion cylinder assembly 224b so as to be in series along cylinder axis 25.

Piston assembly 222c may include a cam follower bridge 227 interconnecting piston arm 228c to cam follower assembly 226b of piston assembly 222b. Each cam follower assembly 226a, 226b, 226d straddles its respective cam 218a, 218b, 218c and is movable with respect to its respective cam 218a, 218b, 218c so that axial movement of pistons 230a, 230b and 230d can be translated into radial rotation of the respective cams 218a, 218b, 218d so as to rotate driveshaft 12. Further, because cam follower bridge 227 interconnects piston assembly 222b and 222c, axial movement of piston 230c is likewise utilized drive radial rotation of cam 218b. In this regard, the second roller 289 of cam follower assembly 226b may be of a larger diameter than the second roller 287 of the other cam followers, since both rollers 286, 289 of cam follower assembly 226b are used to transfer load to cam 218b. Thus, rollers 286 may be larger in diameter than rollers 287 in order to transfer load. Additionally, cam 218b may have an inwardly facing track 142 and an outwardly facing track 144 that are shaped the same as the corresponding track inwardly facing track of cam 218a and 218c Engine 10 includes at least two piston series 202 symmetrically spaced about driveshaft axis 14, such as piston series 202a and 202b. In one or more embodiments, engine 10 includes at least three symmetrically spaced piston series 202, while in other embodiments, engine 10 incudes at least four symmetrically spaced piston series 202.

Moreover, while two serially aligned combustion chamber assemblies 224 with three corresponding cams 18 have been described, the disclosure is not limited in this regard. Thus, in other embodiments three or more combustion chamber assemblies 224 may be axially aligned in series along cylinder axis 25, with a cam 18 disposed between each adjacent combustion chamber assemblies 224, as well as a cam 18 disposed at opposing ends of the series of combustion chamber assemblies 224.

Turning to FIG. 14a, an alternative embodiment of engine 10 (of FIG. 1) is illustrated as engine 400, wherein two or more piston pairs 402, such as piston pairs 402a, 402b, are positioned to be parallel with driveshaft 12 but at different diameters about driveshaft 12, and as such, utilize two or more cam pairs of different diameters mounted on driveshaft 12. As shown, driveshaft 12 extends along a driveshaft axis 14. Mounted along driveshaft 12 between driveshaft ends 412 and 413, in spaced apart relationship to one another, are at least four harmonic barrel cams 418a, 418b, 418c and 418d, such as the barrel cams 18 described above, with barrel cams 418a, 418b forming a first set of cams and barrel cams 418c, 418d forming a second set of barrel cams. The cams 18 of each set oppose one another as generally described above. However, cams 18a, 18b of the first cam set have a first cam set diameter D1 (defined as R1*2) while cams 18c, 18d of the second cam set have a second cam set diameter D2 (defined as R2*2) that is greater than the first cam set diameter D1.

In some embodiments, piston pairs 402a, 402b may have the same angular position about driveshaft 12 so as to be generally adjacent one another, but radially spaced apart from one another in the same plane extending radially from driveshaft 12, while in other embodiments, piston pairs 402a, 402b may have different angular position about driveshaft 12.

More specifically, piston pair 402a is comprised of a first piston assembly 422a and a second piston assembly 422b which piston assemblies 422a, 422b are axially aligned with one another within a combustion cylinder assembly 424a disposed along a combustion cylinder axis 25a. Combustion cylinder assembly 424a is formed of a combustion cylinder 460a extending between a first end 462a and a second end 464a. Cylinder axis 25a is spaced apart from, but generally parallel with, driveshaft axis 14 of driveshaft 12. Piston assembly 422a includes a piston arm 428a to which is mounted a piston 430a. Piston arm 428a is attached to a cam follower assembly 426a. Likewise, opposing piston assembly 422b is attached to a cam follower assembly 426b via a piston arm 428b to which is mounted a piston 430b. The opposed pistons 430a, 430b of piston pair 402a are adapted to reciprocate in opposite directions along cylinder axis 25a. Each cam follower assembly 426a, 426b includes a first roller 486 and a second roller 487, straddles its respective cam 418a, 418b so as to be engaged by rollers 486, 487 and acts on its respective piston 430a, 430b. Opposed pistons 430a, 430b within cylinder assembly 424a generally define a combustion chamber 432a therebetween into which fuel may be injected.

Piston pair 402b likewise is comprised of a first piston assembly 422c and a second piston assembly 422d which piston assemblies 422c, 422d are axially aligned with one another within a combustion cylinder assembly 424b disposed along a cylinder axis 25b. Combustion cylinder assembly 424b is formed of a combustion cylinder 460b extending between a first end 462c and a second end 464d. Cylinder axis 25b is spaced radially outward from, but generally parallel with cylinder axis 25a of piston pair 402a. Piston assembly 422c includes a piston arm 428c to which is mounted a piston 430c. Piston arm 428c is attached to a cam follower assembly 426c. Likewise, opposing piston assembly 422d is attached to a cam follower assembly 426d via a piston arm 428d to which is mounted a piston 430d. The opposed pistons 430c, 430d of piston pair 402b are adapted to reciprocate in opposite directions along cylinder axis 25b. Each cam follower assembly 426c, 426d straddles its respective cam 418c, 418d and acts on its respective piston 430c, 430d. Opposed pistons 430c, 430d within cylinder assembly 424b generally define a combustion chamber 432b therebetween into which fuel may be injected.

Thus, the combustion cylinder 460a associated with piston pair 402a is spaced apart from driveshaft 12 at a first radius R1 and the combustion cylinder 460b associated with piston pair 402b is spaced apart from driveshaft 12 at a second radius R2, where the second radius R2 is greater than the first radius RE In some embodiments, therefore, a plurality of first combustion cylinders 460a may be spaced about driveshaft 12 at the first radius R1 and a plurality of second combustion cylinders 460b may be spaced about driveshaft 12 at the second radius R2.

In one or more embodiments, piston arms 428c, 428d are longer than piston arms 428a, 428b, it being appreciated that the cams 218c, 218d are spaced farther apart from one another on driveshaft 12 than cams 218a, 218b, thus requiring longer piston arms to permit the corresponding piston assemblies 422c, 422d to engage cams 218c, 218d, respectively.

Each cam follower assembly 226a, 226b, 226c and 226d straddles its respective cam 218a, 218b, 218c, 218d and is movable with respect to its respective cam 218a, 218b, 218c, 218d so that axial movement of pistons 230a, 230b, 230c and 230d can be translated into radial rotation of the respective cams 218a, 218b, 218c, 218d so as to rotate driveshaft 12.

In one or more embodiments, each cam 18 further includes a circumferential shoulder 438 extending around the cylindrical periphery of a cam hub 436. Shoulder 438 is generally curvilinear in shape and can be characterized as having a certain frequency, where the frequency may generally refer to the number of occurrences of repeating peaks and troughs about the 360 degree circumference of the circumferential shoulder 438. In some embodiments, the curvilinear shape of shoulders 438 of the first cam 418a and second cam 418b are of a first frequency and the curvilinear shape of shoulders 438 of the third cam 418c and fourth cam 418d are of a second frequency, which in some embodiments may differ from the first frequency. In some embodiments, it may be desirable for piston pairs 402a, 402b to translate in unison. In such case, the second frequency is less than the first frequency. In other embodiments, it may be desirable for piston pair 402b to translate more rapidly than piston pair 402, in which case, the second frequency may be equal to or greater than the first frequency.

Similarly, in one or more embodiments, the amplitude of the curvilinear shoulders 438 of each cam 18a, 18b, 18c, 18d are the same, with the depth of the troughs and the height of the peaks being substantially equal, while in other embodiments, the depth of the troughs may differ from height of the peaks. In some embodiments, the amplitude of the third and fourth cams 18c, 18d, respectively is less than the amplitude of the first and second cams 18a, 18b in order to adjust timing of the respective piston pairs 402a, 402b. Because cams 18a, 18b of the first cam set have a different diameter D1 than the diameter D2 of cams 18c, 18d, shoulders 438 of the respective cams 18 are at different diameters. As such, piston pairs 402a, 402b may have the same angular position about driveshaft 12 so as to be generally adjacent one another, but radially spaced apart from one another in the same plane extending radially from driveshaft 12.

Figure 14B:
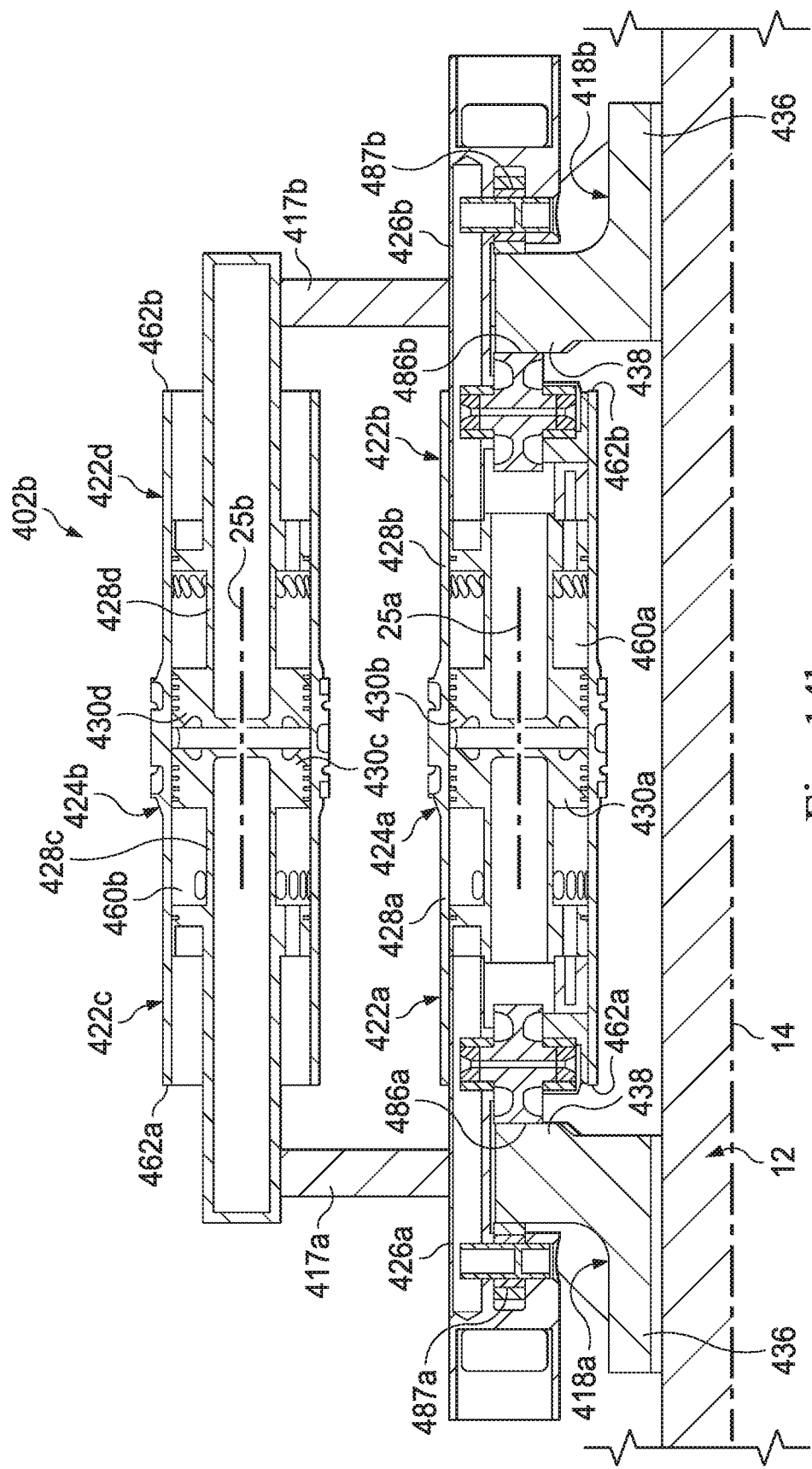
FIG. 14b is a cut-away side view of another embodiment of a barrel engine with piston pairs deployed in parallel.

While only two sets of cam pairs are illustrated, any number of sets of cam pairs may be utilized, each set with a different diameter, thereby allowing the density of piston pairs 402 about driveshaft 12 to be increased. It will be appreciated that the greater number of piston pairs about driveshaft 12, the more torque that can be generated by engine 10. Thus, the foregoing arrangement allows greater engine power than would a barrel engine with piston pairs disposed at only one diameter about driveshaft 12. Turning to FIG. 14b, is an alternative embodiment of engine 400 with two or more piston pairs 402, such as piston pairs 402a, 402b, aligned in parallel about driveshaft 12. In the embodiment of FIG. 14b, rather than utilizing cam pairs of different diameters, a single cam pair 418a, 418b is utilized, but an interconnecting link 417 connects adjacent piston assemblies 422 so that the adjacent piston assemblies reciprocate in unison. Specifically, driveshaft 12 extends along a driveshaft axis 14. Mounted along driveshaft 12 between driveshaft ends 412 and 413, in spaced apart relationship to one another, are two harmonic barrel cams 418a, 418b, such as the barrel cams 18 described above. Cams 18a, 18b oppose one another as generally described above.

Piston pair 402a is comprised of a first piston assembly 422a and a second piston assembly 422b which piston assemblies 422a, 422b are axially aligned with one another within a cylinder assembly 424a disposed along a cylinder axis 25a. Combustion cylinder assembly 424a is formed of a combustion cylinder 460a extending between a first end 462a and a second end 464a. Cylinder axis 25a is spaced apart from, but generally parallel with, driveshaft axis 14 of driveshaft 12. Piston assembly 422a includes a cam follower assembly 426a attached to a piston arm 428a to which is mounted a piston 430a. Likewise, opposing piston assembly 422b includes a cam follower assembly 426b attached to a piston arm 428b to which is mounted a piston 430b. The opposed pistons 430a, 430b of piston pair 402a are adapted to reciprocate in opposite directions along cylinder axis 25a. Each cam follower assembly 426a, 426b straddles its respective cam 418a, 418b and acts on its respective piston 430a, 430b. Opposed pistons 430a, 430b within cylinder assembly 424a generally define a combustion chamber 432a therebetween into which fuel may be injected.

Piston pair 402b likewise is comprised of a first piston assembly 422c and a second piston assembly 422d which piston assemblies 422c, 422d are axially aligned with one another within a cylinder assembly 424b disposed along a cylinder axis 25b. Combustion cylinder assembly 424b is formed of a combustion cylinder 460b extending between a first end 462c and a second end 464d. Cylinder axis 25b is spaced radially outward from, but generally parallel with cylinder axis 25a of piston pair 402a. Piston assembly 422c includes a piston arm 428c to which is mounted a piston 430c. Likewise, opposing piston assembly 422d includes a piston arm 428d to which is mounted a piston 430d. The opposed pistons 430c, 430d of piston pair 402b are adapted to reciprocate in opposite directions along cylinder axis 25b. Opposed pistons 430c, 430d within cylinder assembly 424b generally define a combustion chamber 432b therebetween into which fuel may be injected.

A link 417a extends between adjacent piston assemblies 422a, 422c. Likewise, a link 417b extends between adjacent piston assemblies 422b, 422d. Link 417 interconnects the respective adjacent piston assemblies 422 so that the assemblies will reciprocate in unison. Moreover, link 417 transfers axial force applied generated by the outer piston assembly 422 to inner piston assembly, and thus to the respective cam 18. Link 417 may be any suitable structure for such interconnection, such as, for example, an arm, plate, rod, body or similar structure. Moreover, link 417 can extend between any reciprocating portion of the piston assemblies 422. In the illustrated embodiment, link 417 extends between a piston arm 428 and a cam follower assembly 226, but in other embodiments, link 417 may interconnect other reciprocating components of piston assembly 422. Thus, as shown, link 417a interconnects cam follower assembly 226a with piston arm 428c, and link 417b interconnects cam follower assembly 226b with piston arm 428d.

Each cam follower assembly 226a, 226b straddles its respective cam 218a, 218b and is movable with respect to its respective cam 218a, 218b so that axial movement of pistons 230a, 230b, 230c and 230d can be translated into radial rotation of the respective cams 218a, 218b, so as to rotate driveshaft 12.

In other embodiments, cam follower assembly 226 is connected to two piston arms 428 and functions as the link 417 interconnecting the two adjacent piston assemblies 422. In such embodiments, the cam 18 may have a radius that is between the two cylinder axii 25a, 25b, and cam follower assembly 226 may be positioned radially between adjacent piston arms 428.

Figure 10:
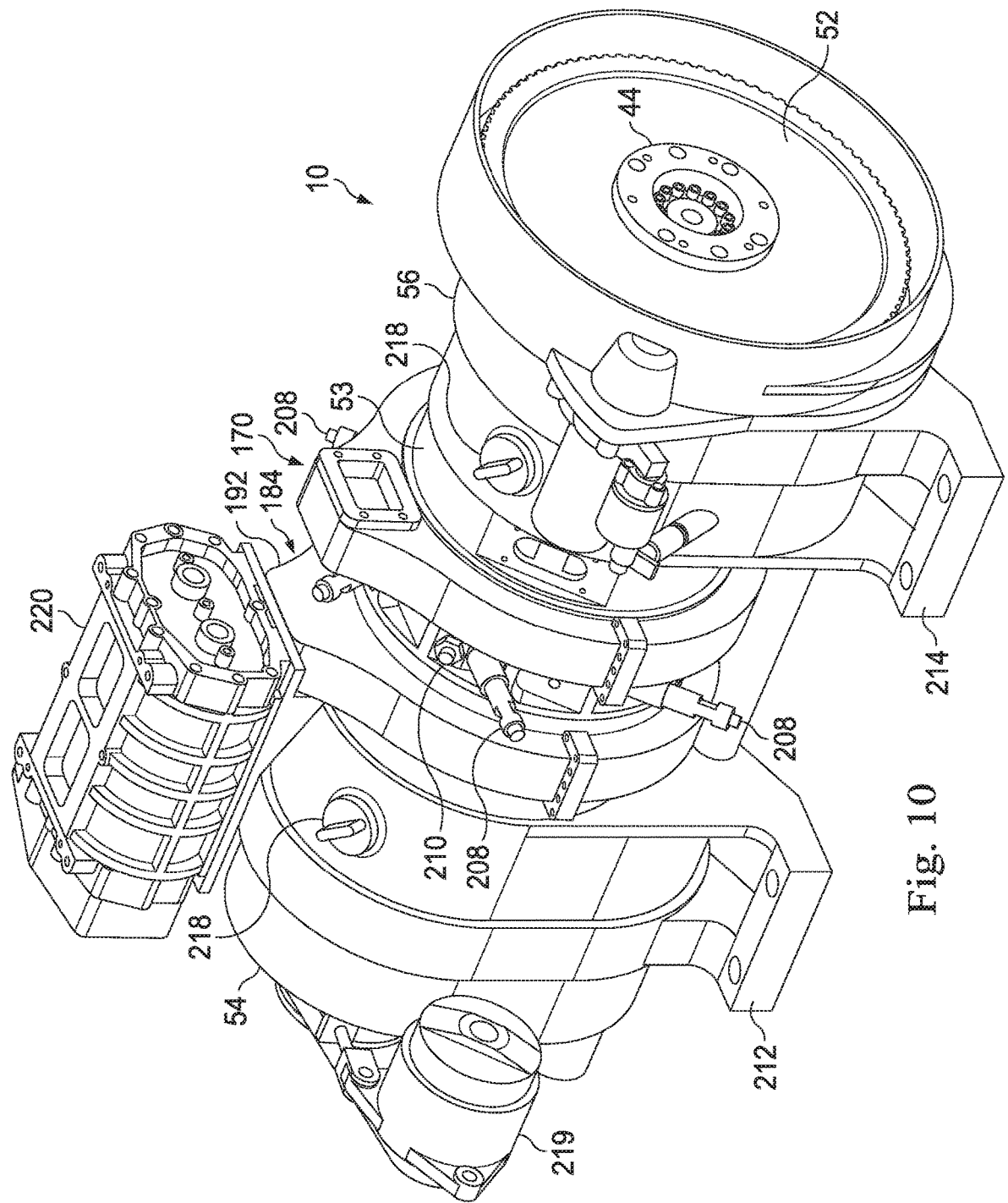
FIG. 10 is a perspective view of an assembled engine of the disclosure.

In one or more embodiments, an annular manifold, such as is described above in FIGS. 9 and 10, may be positioned radially between the combustion cylinders 460a positioned at the first radius R1 and the combustion cylinder 460b positioned at the second radius R2 so as to fluidically connect exhaust or intake ports of combustion cylinders 460a with exhaust or intake ports combustion cylinders 460b. In such case, the annular manifold is disposed about a radius greater than the first radius R1 but less than the second radius R2.

While FIG. 13 describes piston pairs 402 and combustion cylinder assemblies 424 in series, and FIGS. 14a and 14b describe piston pairs 402 and combustion cylinder assemblies 424 in parallel, it will be appreciated that in other embodiments of an engine, piston pairs 402 and combustion cylinder assemblies 424 can be mounted in the engine of the disclosure to be in both parallel and in series. Thus, in some embodiments of an engine, two or more combustion cylinder assemblies 424 may be aligned in series along a first axis, such as axis 25a, which first axis is parallel with and spaced apart from driveshaft axis 14, with each of the two serially aligned combustion cylinder assemblies 424 having piston pairs 402 that are also generally aligned along the first axis 25a. Likewise, two or more combustion cylinder assemblies 424 may be aligned in series along a second axis, such as axis 25b, which second axis is parallel with and spaced apart from both driveshaft axis 14 and first axis 25a, with each of the two serially aligned combustion cylinder assemblies 424 along second axis 25b having piston pairs 402 that are also generally aligned along the second axis 25b. For example, an embodiment of the foregoing engine may include first and second combustion cylinders serially or sequentially disposed along a first center cylindrical axis and third and fourth combustion cylinders serially or sequentially disposed along a second center cylindrical axis, where the first and second center cylindrical axii are parallel with one another, but the second center cylindrical axis is spaced radially outward from the first center cylindrical axis. In such an arrangement, it will be appreciated that the engine will have first, second, third, fourth, fifth, sixth, seventh and eighth piston assemblies mounted in the ends of the four combustion cylinders.

Figure 15:
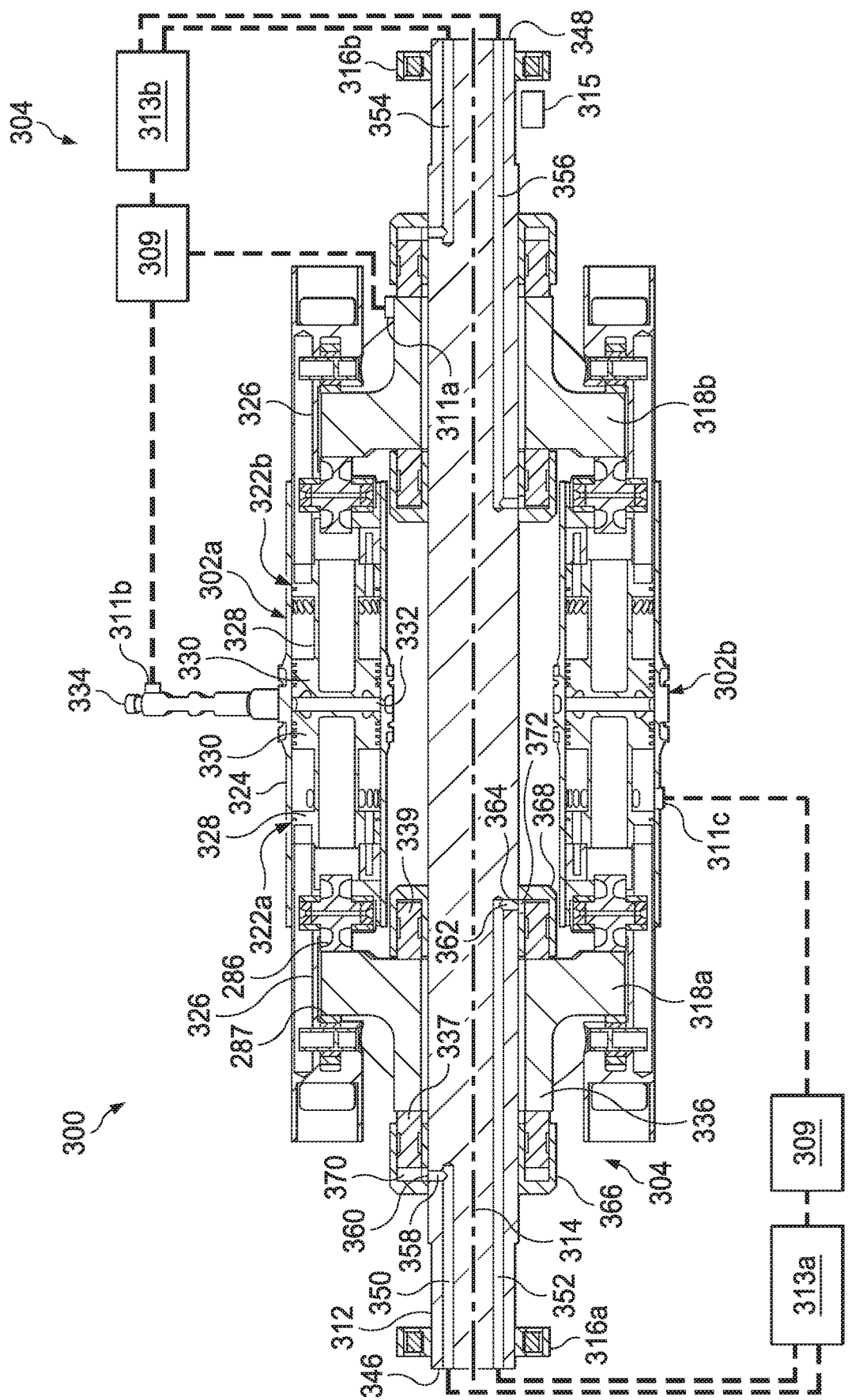
FIG. 15 is a cut-away side view of a barrel engine with a radial adjustment mechanism for altering the relative position of a cam on a driveshaft.

Turning to FIG. 15, engine 300 is illustrated, where one or more cams 318, such as spaced apart cams 318a and 318b, are radially adjustable relative to driveshaft 312 utilizing a radial adjustment mechanism 304. Specifically, in FIG. 15, a simplified longitudinal section and cutaway view of an engine 300 is shown, where driveshaft 312 extends along a primary axis 314 and passes axially through the center of the engine 300. Driveshaft 312 is supported by a pair of bearings 316a, 316b in a fixed axial position. Positioned along driveshaft 312 in spaced apart relationship to one another are harmonic barrel cams 318a, 318b. A piston pair 302a comprises a first piston assembly 322a and a second piston assembly 322b which piston assemblies 322a, 322b are axially aligned with one another within a cylinder assembly 324 disposed along a cylinder axis 325. Cylinder axis 325 is spaced apart from but generally parallel with primary axis 314 of driveshaft 312. Each piston assembly 322 generally includes a piston arm 328 to which is mounted a piston 330. Piston arm 328 is attached to a cam follower assembly 326. The opposed pistons 330 of a piston pair 302a are adapted to reciprocate in opposite directions along cylinder axis 325. Each cam follower assembly 326 straddles its respective cam 318 and acts on piston 330 through piston arm 328. Opposed pistons 330 within cylinder assembly 324 generally define a combustion chamber 332 therebetween into which fuel may be injected by a fuel injector 334. Upon combustion of fuel within combustion chamber 332, pistons 330 are driven away from one another along cylinder axis 325, all as generally described above with respect to other embodiments. In the illustrated embodiment, engine 300 further includes a second piston pair 302b symmetrically positioned relative to piston pair 302a.

Driveshaft 312 is further characterized by a first end 346 and a second end 348. Axially formed in at least one end of driveshaft 312 is a first axially extending hydraulic passage 350 and a second axially extending hydraulic passage 352, such as shown at first end 346. In the illustrated embodiment, second end 348 likewise has a first axially extending hydraulic passage 354 and a second axially extending hydraulic passage 356. A first radial passage 358 in fluid communication with the first hydraulic passage 350 is formed in driveshaft 312 and terminates at an outlet 360. Likewise, a second radial passage 362 in fluid communication with the second hydraulic passage 352 is formed in driveshaft 312 and terminates at an outlet 364.

Formed along driveshaft 312 is first collar 366 and second collar 368, each extending radially outward from driveshaft 312. In one embodiment, collars 366, 368 are spaced apart from one another along driveshaft 312. Collars 366, 368 may be integrally formed as part of driveshaft 312 or separately formed.

Cam 318 is mounted on driveshaft 312 adjacent outlets 360, 364 and collars 366, 368. In particular, cam 318 includes a hub 336 having a first end 337 mounted relative to first collar 366 so as to form a first pressure chamber 370 therebetween, with outlet 360 in fluid communication with first pressure chamber 370. Likewise, hub 336 has a second end 339 mounted relative to second collar 368 so as to form a second pressure chamber 372 therebetween, with outlet 364 in fluid communication with second pressure chamber 372.

Radial adjustment mechanism 304 may include a hydraulic fluid source 313a in fluid communication with each of hydraulic passage 350 and hydraulic passage 352 to alternatively supply pressurized fluid (not shown) to one or the other of first pressure chamber 370 or second pressure chamber 372. In this regard, radial adjustment mechanism 304 may further include a controller 309 to control delivery of fluid from fluid source 313 to the pressure chambers 370, 372. In this regard, controller 309 may receive data from one or more sensors 311 about a condition of the engine 300, such as the rotational speed of cam 318 (sensor 311a) or type of fuel being injected by fuel injector 334 (sensor 311b) or the condition of the combustion gas existing cylinder assembly 324 (sensor 311c), and control delivery of fluid from fluid source 313 in order to optimize the position of cam 318 relative to driveshaft 312 for a particular purpose. For example, it has been found that cam 318 may be in a first radial orientation relative to driveshaft 312 when a first type of fuel, such as gasoline, is utilized in engine 300 and cam 318 may be in a second radial orientation (different than the first radial orientation) relative to driveshaft 312 when a second type of fuel, such as diesel, is utilized in engine 300. Persons of ordinary skill in the art will appreciate that application of a pressurized fluid to first pressure chamber 370 will result in radial rotation of cam 318 in a first direction relative to driveshaft 312 and application of a pressurized fluid (not shown) to second pressure chamber 372 will result in radial rotation of cam 318 in a second direction relative to driveshaft 312. Moreover, the relative pressures of the pressurized fluids in each of the chambers 370, 372 may be adjusted to adjust the radial orientation of cam 318 on driveshaft 12, as described above. It will also be appreciated that the foregoing is particularly desirable because changes to the relative position of cam 318 may be made dynamically in real time while engine 300 is in operation. These changes may be based on monitoring of various operational parameters and/or conditions of engine 300 with one or more sensors 315 in real time. Thus, in some embodiments, based on measurements from sensor 315, hydraulic fluid source 313 may be operated to rotate cam 318 in a first direction or a second direction relative to driveshaft 312 in order to achieve a desired output from a piston pair 302. Alternatively, the system may be static by maintaining the relative fluid pressure in each chamber at the same pressure.

Figure 16:
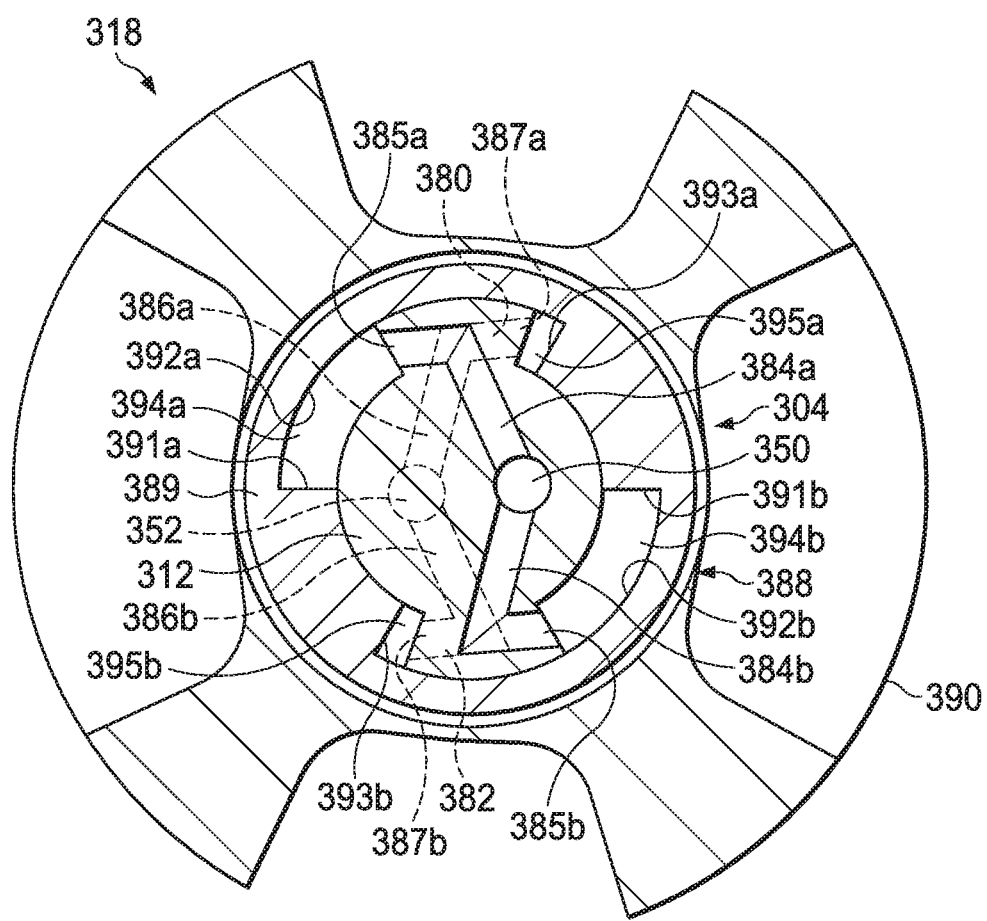
FIG. 16 is a cut-away axial view another embodiment of a radial adjustment mechanism for altering the relative position of a cam on a driveshaft.
Figure 17:
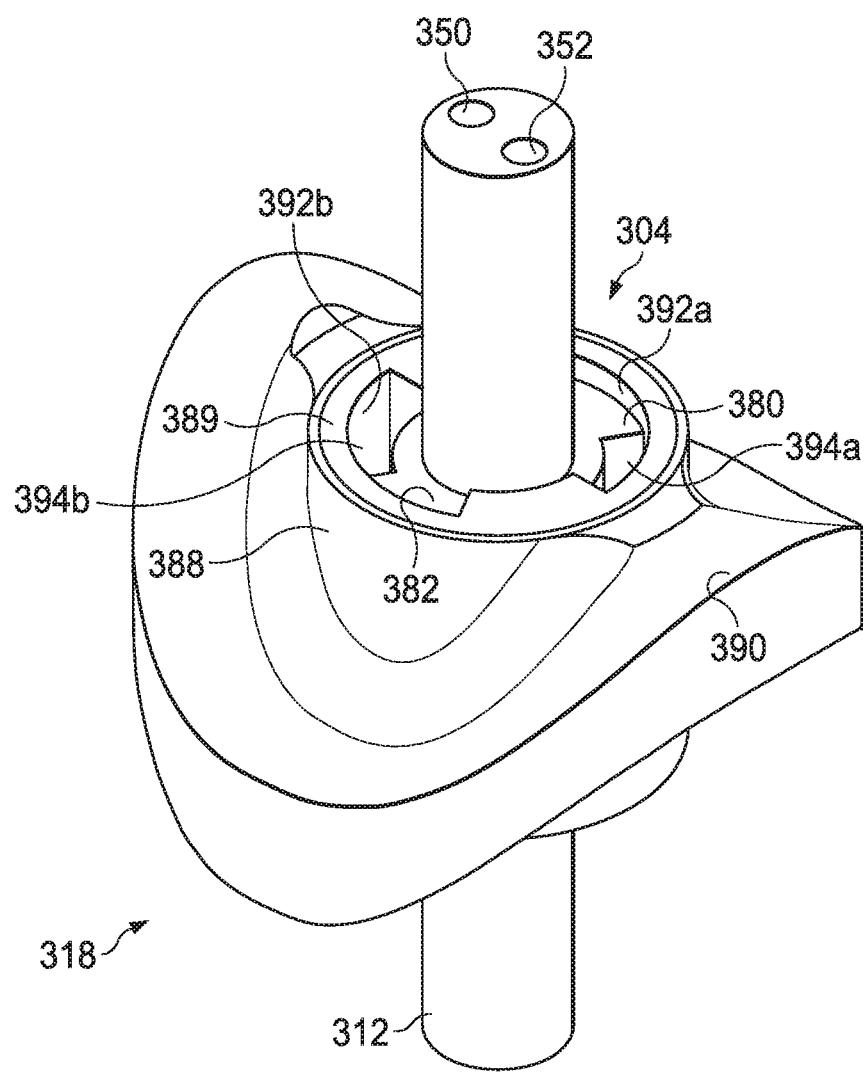
FIG. 17 is a perspective view of the radial adjustment mechanism of FIG. 16.

Turning to FIGS. 16 and 17, cam 318 is shown with another embodiment of radial adjustment mechanism 304. Specifically, in this embodiment, driveshaft 312 includes a first lug 380 and second lug 382, each extending radially outward from driveshaft 312. In one embodiment, lugs 380, 382 opposed one another about driveshaft 312. Lugs 380, 382 may be integrally formed as part of driveshaft 312, as shown, or separately formed.

Driveshaft 312 further includes a first axially extending hydraulic passage 350 and a second axially extending hydraulic passage 352, preferably of varied axial lengths.

A first set of radial passages 384a, 384b is in fluid communication with the first axially extending hydraulic passage 350, each of the radial passages 384a, 384b formed in a lug 380, 382, respectively, and terminates at a ported lug outlet 385a, 385b. Likewise, a second set of radial passages 386a, 386b (shown in dashed), preferably spaced apart axially from the first set of radial passages 384a, 384b, is in fluid communication with the second axially extending hydraulic passage 352. Each of the radial passages 386a, 386b is formed in a lug 380, 382, respectively, and terminates at a ported lug outlet 387a, 387b.

Cam 318 is mounted on driveshaft 312 adjacent outlets 385, 387 and lugs 380, 382. In particular, cam 318 includes a hub 388 having a hub wall 389 with a curvilinear shoulder 390 extending radially outward from the outer circumference of hub wall 389. In some embodiments, as illustrated, shoulder 390 may be shaped to have two peaks with a corresponding number of troughs, such that the cam profiles describe two complete cycles per revolution and are thus double harmonics, while in other embodiments, shoulder 390 may have other number of peaks and troughs, as desired.

Formed along the inner circumference of hub wall 389 are first and second spaced apart slots 392a, 392b, each slot 392a, 392b disposed to receive a lug 380, 382, respectively. In one or more embodiments, the slots 392a, 392b may oppose one another. First slot 392a is characterized by a first shoulder 391a and a second shoulder 393a, while second slot 392b is characterized by a third shoulder 391b and a fourth shoulder 393b. In particular, lug 380 extends into first slot 392a to form a first pressure chamber 394a between lug 380 and a first slot shoulder 391a, with outlet 385a in fluid communication with first pressure chamber 394a. Likewise, lug 382 extends into second slot 392b to form a third pressure chamber 394b between lug 382 and a third slot shoulder 391b, with outlet 385b in fluid communication with third pressure chamber 394b.

In one or more embodiments, such as the illustrated embodiments, a second pressure chamber 395a is formed between lug 380 and a second slot shoulder 393a, with outlet 387a in fluid communication with second pressure chamber 395a. Likewise, a fourth pressure chamber 395b is formed between lug 382 and a fourth slot shoulder 393b, with outlet 387b in fluid communication with fourth pressure chamber 395b.

It will be appreciated that in some embodiments, pressure chambers 394b and 395b, as well as passages 384b and 386b and outlets 385b and 387b can be eliminated, with only a pressure chamber 394a utilized as a first pressure chamber to rotate cam 318 in a first direction relative to driveshaft 312, and only a pressure chamber 395a utilized as a second pressure chamber to rotate cam 318 in a second opposite direction relative to driveshaft 312.

Moreover, during operation of an engine, such as engine 300 employing the radial adjustment mechanism 304, pressurized fluid can be alternatingly supplied to chamber 394a or chamber 395a to dynamically adjust the radial position of cam 318 relative to driveshaft 312 as desired, rotating cam 318 either in a first clockwise direction or a second counterclockwise direction about driveshaft 312.

It will be appreciated that in each of the engine embodiments described herein, more work may be produced out of every increment of fuel with a shortened intake stroke combined with a full-length power stroke in longer displacements made by the counter opposed pistons arrangement in a central combustion chamber. Moreover, the engines experience very low vibration due to naturally balanced barrel architecture combined with balanced power pulse operating sequence described above. Variable compression ratio and phasing tune can be obtained through automatic or manual adjustment of the barrel cams relative to the driveshaft. Moreover, the closed circuit of forces during engine operations allows a much less robust and lighter casing for enveloping the engine. This also permits the use of a wide range of materials, such as plastics, cast and forged aluminum of the casing parts, block and other components. The closed circuit of forces comprises with the forces and stress induced by the power stroke expansion pressure applied on the piston head during the power stroke which flows from the piston head to the piston neck, to the piston rod, to the cam-rollers, to the cam and finally to the driveshaft so as to minimize applying moments and bending forces on the engine block, bearings and other parts as in a conventional engine fitted with a crankshaft and engine head.

The cylinders are fitted with intake and exhaust ports to operate the 2-stroke cycle, uniflow air intake and scavenging process. The phasing control is provided by the travelling time of the opposed-pistons, opening and closing the intake and exhaust ports, governed by cam design, that can accelerate or slowdown pistons travelling speeds, and its number of wave lengths.

Figure 18:
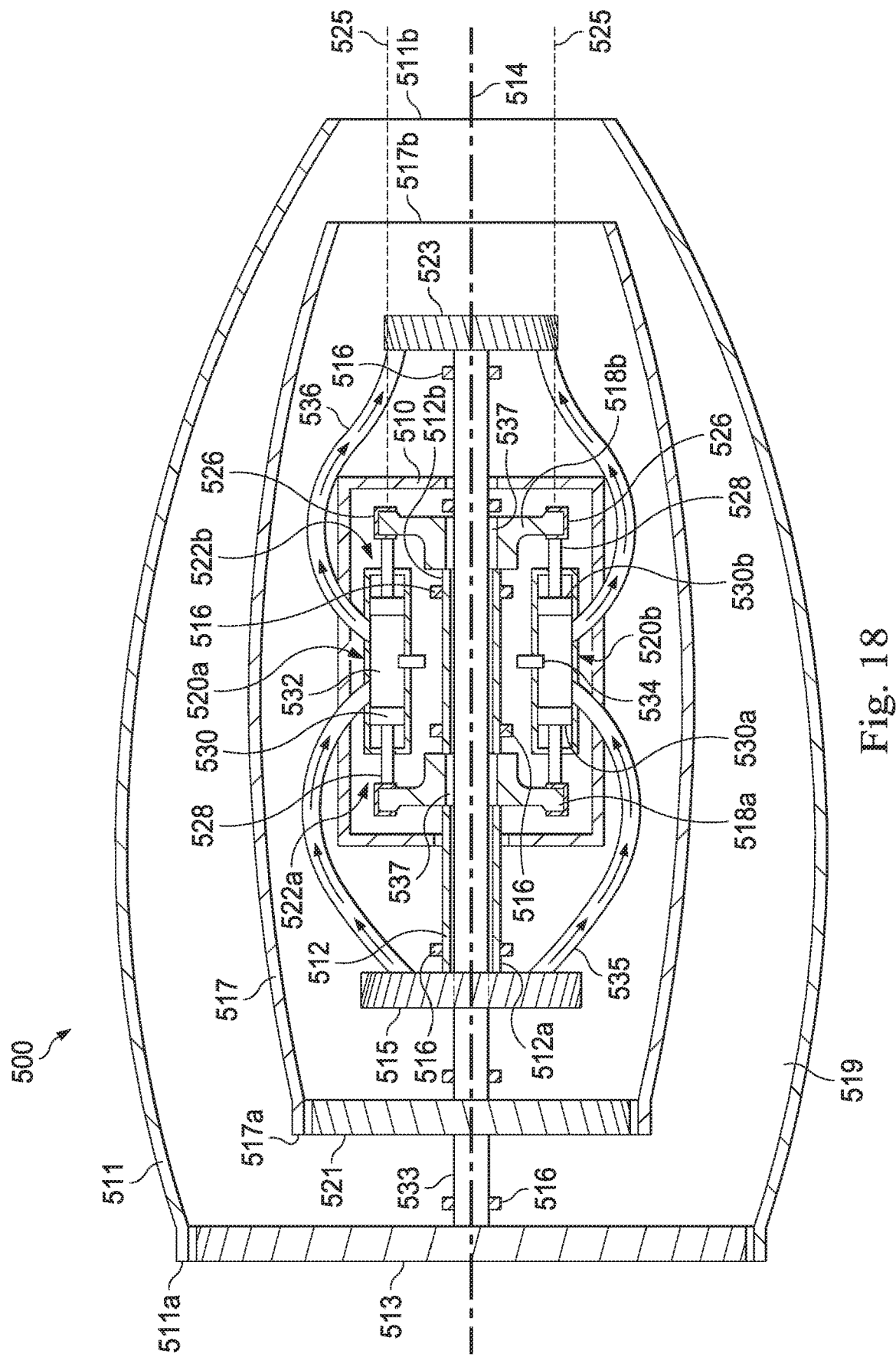
FIG. 18 is one embodiment of a turbofan engine utilizing a core internal combustion barrel engine driving output cams for powering a high-pressure turbine.

Turning to FIG. 18, it has been found that the lighter weight, low vibration and cooler operating temperatures of the engine 10 described above, render is particularly well suited for use in aircraft. In particular, the engine 10 described above may be incorporated as engine 510 into composite cycle aircraft engines, where the core turbojet engine of a prior art aircraft engine is replaced with engine 10 so that reciprocating pistons are parallel with the drive shaft(s) and spool(s) that drive the various components of the aircraft engine, such as turbines, fans and propellers. Thus, shown in FIG. 18 is one embodiment of a turbofan engine 500 utilizing a core internal combustion barrel engine 510 driving output cams 518 for powering a high-pressure compressor 515. Turbofan engine 500 generally includes an elongated nacelle 511 having a first open end 511a and a second open end 511b and enclosing barrel engine 510 and high-pressure compressor 515. A rotating component 513 may be mounted adjacent the first open end 511a of nacelle 511. In some embodiments, rotating component 513 may be a propeller. In other embodiments, rotating component 513 may be a fan or turbine or other mechanism utilized to move a volume of air through nacelle 511. A core duct 517 extends from a first open end 517a to a second open end 517b and at least partially encloses engine 510 and high-pressure compressor 515, thus forming an air flow annulus 519 between core duct 517 and nacelle 511. It will be appreciated that engine 510 may be the engine 10 as described above in FIG. 1 or any engine described in the Figures above. In any event, a first spool or driveshaft 512 extends along a driveshaft axis 514 and passes axially through the center of engine 510. Driveshaft 512 may be supported by bearings 516 in a fixed axial position. Positioned along driveshaft 512 in spaced apart relationship to one another are harmonic barrel cams 518a, 518b. Positioned radially outward from driveshaft 512 are two or more piston pairs 520, each piston pair 520 having a first piston assembly 522a and a second piston assembly 522b which piston assemblies 522a, 522b are axially aligned with one another along a cylinder axis 525. In the illustrated embodiment, two piston pairs 520a, 520b are illustrated, with each piston pair 520 having first and second piston assemblies 522a, 522b. Cylinder axis 525 is spaced apart from but generally parallel with driveshaft axis 514 of driveshaft 512. Each piston assembly 522 generally includes a piston arm 528 to which is mounted a piston 530, and each piston assembly 522 is attached to a cam follower assembly 526. The opposed pistons 530a, 530b of a piston pair 520 are adapted to reciprocate along cylinder axis 525. Each cam follower assembly 526 engages a corresponding cam 518 and acts on a piston 530 through its associated piston arm 528. Opposed pistons 530a, 530b within cylinder assembly 524 generally define a combustion chamber 532 therebetween into which fuel may be injected by a fuel injector 534.

In the illustrated embodiment, driveshaft 512 is hollow and extends from a first end 512a to a second end 512b, with a spool 533 axially aligned with driveshaft 512 and passing through driveshaft 512. Being hollow, it will be appreciated that driveshaft 512 and spool 533 may be rotated independently of one another. Second cam 518b is mounted adjacent the second end 512b of driveshaft 512 and first cam 518a is mounted between the second cam 518b and the first end 512a of driveshaft 512. A rotating component such as a high-pressure compressor 515 is mounted adjacent the first end 512a of the driveshaft 512. High-pressure compressor 515 is driven by cams 518a, 518b. High-pressure compressor turbine 515 pressurizes combustion air received from low-pressure compressor turbine 521, which lower pressure compressor 521 is positioned along driveshaft axis 514 between fan 513 and high-pressure compressor 515. Combustion air from high-pressure compressor 515 is directed into combustion cylinder assembly 524, and in particular, combustion chamber 532 by a combustion air intake manifold 535. Intake manifold 535 need not be limited to a particular configuration but may be any structure to direct flow of combustion air from high-pressure compressor 515 to combustion cylinder assembly 524. In one embodiment, intake manifold 535 may take the configuration of intake manifold 40 described above. It will be appreciated that multiple rotating components may be disposed on any of driveshaft 512 and spool 533 as desired for a particular purpose. For example, multiple turbines may be sequentially aligned along the combustion air intake path for staged compression of the combustion air.

Exhaust from combustion chamber 532 is directed from combustion cylinder assembly 524 via exhaust manifold 536 to a rotating component such as turbine 523 positioned along driveshaft axis 514 between second cam 518b and the second end 517b of core duct 517. In one or more embodiments, turbine 523 is a drive turbine for driving one or more components of the engine 500, such as other turbines, fans, propellers, electrical generators and the like. Exhaust manifold 536 need not be limited to a particular configuration but may be any structure to direct flow of exhaust from combustion cylinder assembly 524 to turbine 523. In one embodiment, exhaust manifold 536 may take the configuration of exhaust manifold 42 described above. Turbine 523 is mounted on driveshaft or spool 533 that, as described above, is coaxial with hollow driveshaft 512 and extends through hollow driveshaft 512 to drive low-pressure compressor 521 and fan 513. Driveshaft 512 and spool 533 are rotatable independently of one another. Where a driveshaft or spool passes through a cam 518, the cam 518 may have a through-bore 537 formed therein. The shape of each cam 518a, 518b in some embodiments may be as described in FIGS. 1-17. In this regard, barrel engine 510 may be the engine 10 as described in the various embodiments of FIGS. 1-17.

Figure 19:
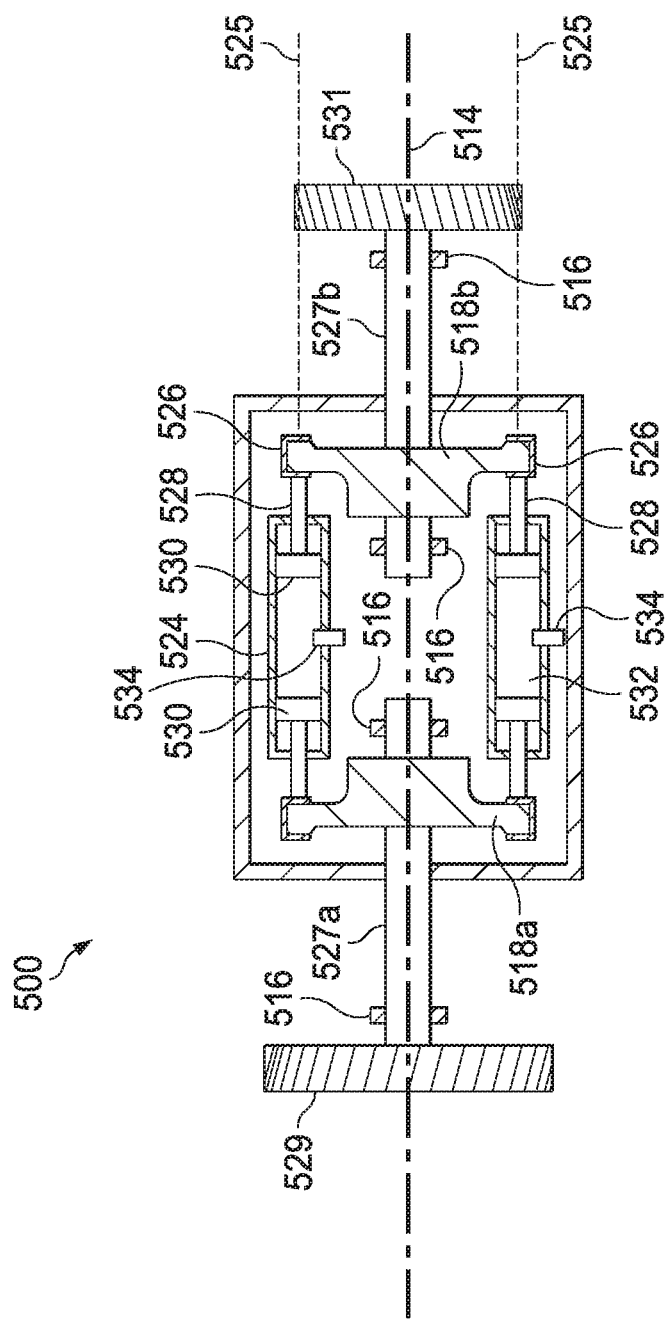
FIG. 19 is one embodiment of a turbofan engine utilizing a core internal combustion barrel engine driving isolated output cams for separately powering a high-pressure turbine and a low-pressure turbine.

Turning to FIG. 19, another embodiment of an internal combustion engine 500 is shown where the first cam 518a is mounted on a first spool or driveshaft 527a and second cam 518b is mounted on a second spool or driveshaft 527b coaxial with first spool 527a but separate therefrom. Internal combustion engine 500 may be particularly useful as a turbofan engine of an aircraft, but may likewise be incorporated into other vehicles, including land-based vehicles and marine vehicles. In any event, a first rotating component 529 is mounted on first spool 527a and is driven by rotation of first cam 518a. Likewise, a second rotating component 531 is mounted on the second spool 527b and is driven by rotation of second cam 518b. In one or more embodiments, first rotating component 529 is a compressor turbine that compresses combustion air prior to introduction into combustion cylinder assembly 524. In one or more embodiments, second rotating component 531 may be a drive turbine utilized to drive other components of engine 500; as an additional power source for other components of an aircraft (not shown); or to drive propulsive fluids out through second end 517b of core duct 517 from engine 500 (see FIG. 18). In other embodiments, rotating components 529, 531 may be a propeller, a fan, a turbine or a gear as may serve the particular purpose of engine 500. It will be appreciated that in FIG. 19, to simplify the description, various components of engine 500 are not shown but may generally include those components described with reference to FIG. 18.

Figure 20A:
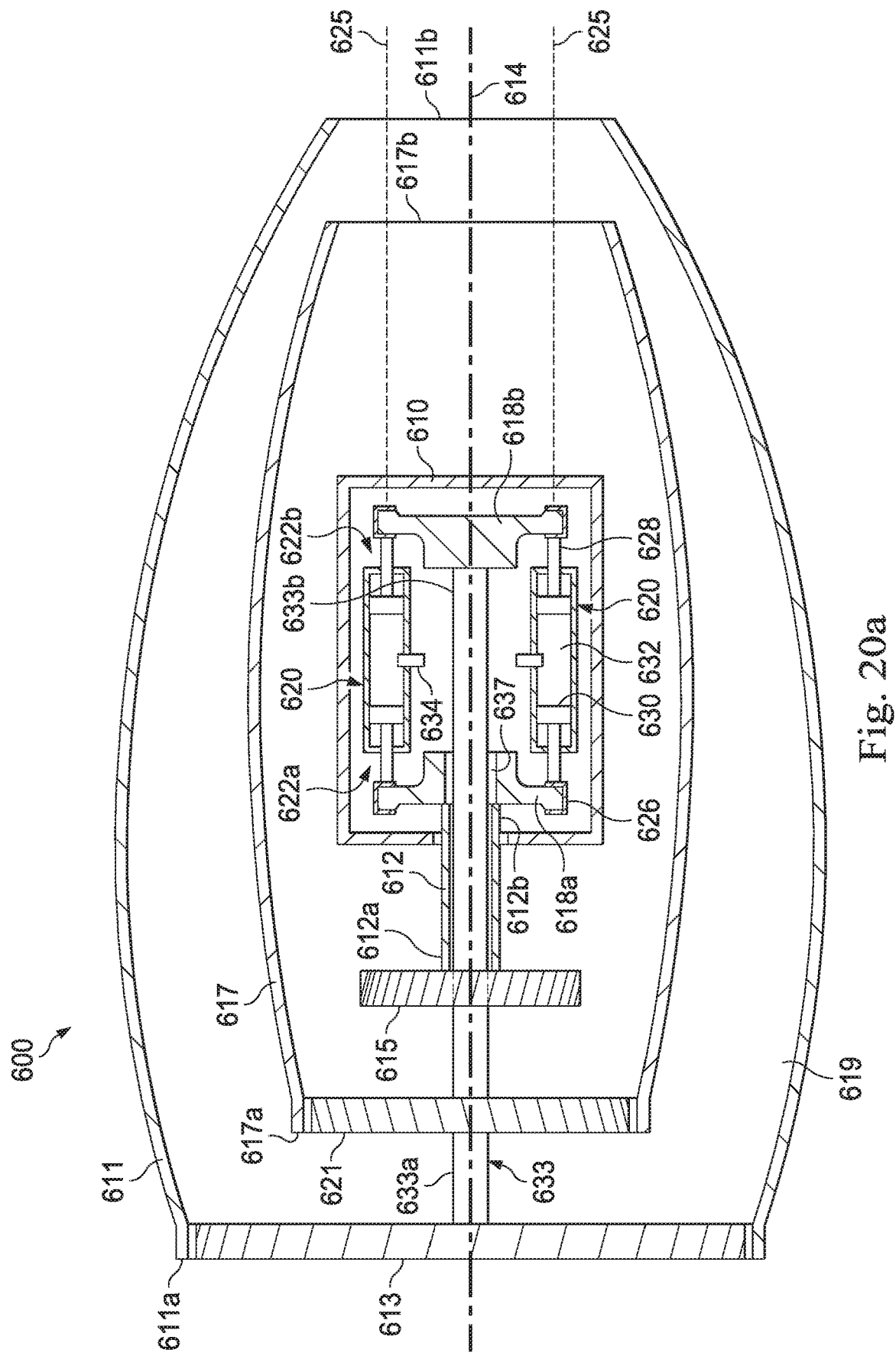
FIG. 20a is one embodiment of a turbofan engine utilizing a core internal combustion barrel engine driving isolated output cams for separately powering a high-pressure turbine and a large fan.
Figure 20B:
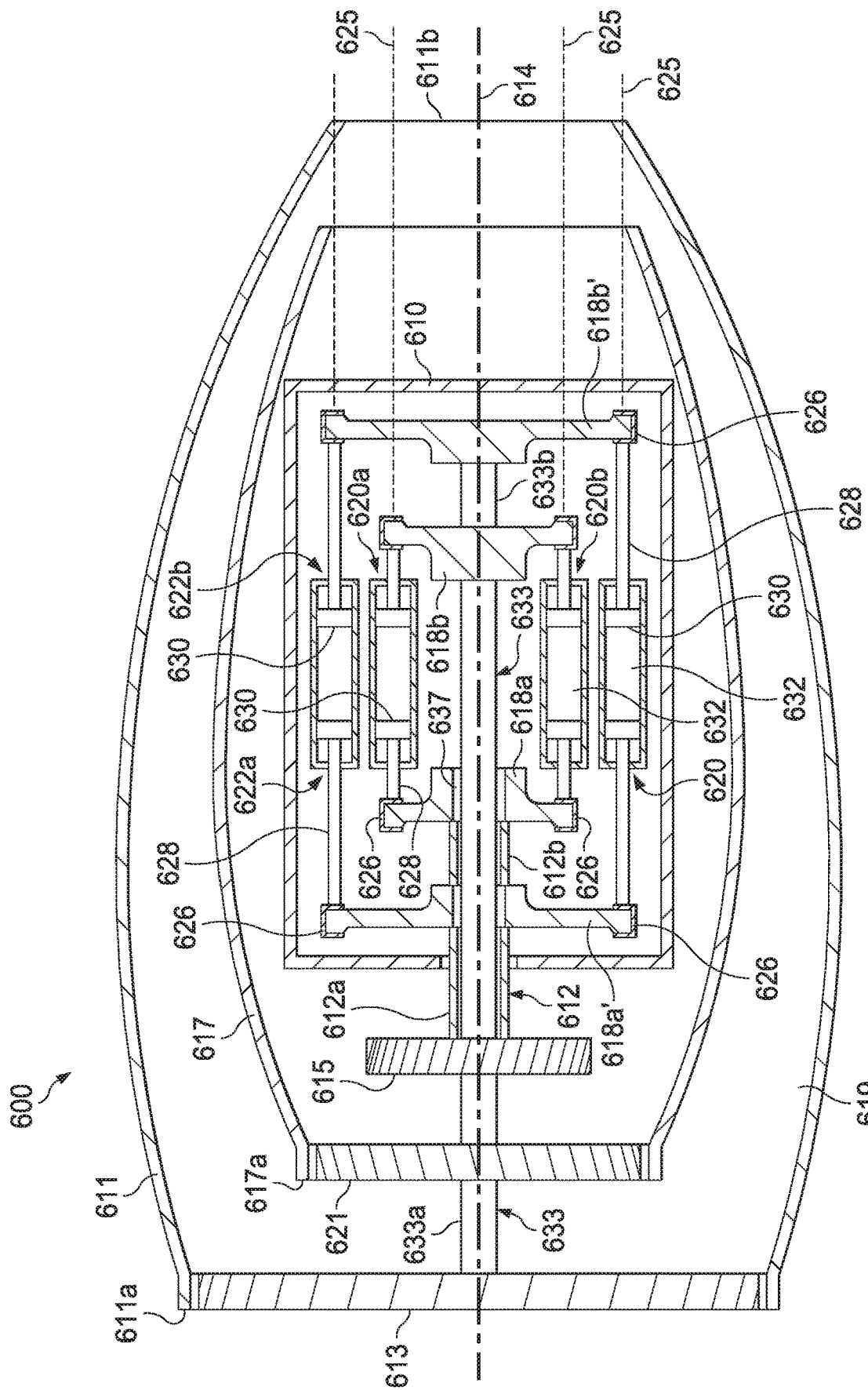
FIG. 20b is one embodiment of a turbofan engine utilizing a core internal combustion barrel engine with parallel combustion chambers driving isolated output cams for separately powering a high-pressure turbine and a large fan.

FIGS. 20A and 20B illustrate additional embodiments of a turbofan engine 600 utilizing a core internal combustion barrel engine 610 driving one or more output cams 618 for powering various engine components, such as a high-pressure compressor 615, a low-pressure compressor 621, a fan 613, and/or electrical equipment (not shown). Turbofan engine 600 generally includes an elongated nacelle 611 having an open first end 611a and an open second end 611b and enclosing barrel engine 610, a high-pressure compressor 615 and a low-pressure compressor 621. A fan 613 is mounted within nacelle 611 adjacent the first open end 611a. In some embodiments, fan 613 may be a propeller. A core duct 617 extends from a first end 617a to a second end 617b and at least partially encloses engine 610, high-pressure compressor 615 and lower pressure compressor 621, forming an air flow annulus 619 between core duct 617 and nacelle 611. It will be appreciated that engine 610 may be the engine 10 as described above in FIG. 1 or any engine as described in the Figures. In any event, a first spool or driveshaft 612 extends along a driveshaft axis 614. Positioned along driveshaft 612 is at least one harmonic barrel cams 618a. In other embodiments, such as engine arrangements as described above in FIGS. 13 and 14, multiple cams may be positioned on driveshaft 612 to drive high-pressure compressor 615. For example, in FIG. 20B, an additional cam 618a' is mounted on driveshaft 612.

In any event, positioned radially outward from driveshaft 612 are two or more piston pairs 620, each piston pair 620 having a first piston assembly 622a and a second piston assembly 622b which piston assemblies 622a, 622b are axially aligned with one another within a combustion cylinder assembly 624 disposed along a cylinder axis 625. Two piston pairs 620a, 620b are illustrated in FIG. 20A, while four piston pairs are illustrated in FIG. 20B, with each piston pair 620 having first and second piston assemblies 622a, 622b. Cylinder axis 625 is spaced apart from but generally parallel with driveshaft axis 614 of driveshaft 612. Each piston assembly 622 generally includes a piston arm 628 to which is mounted a piston 630 as these components are described above in more detail. Piston arm 628 is attached to a cam follower assembly 626. The opposed pistons 630a, 630b of a piston pair 620 are adapted to reciprocate along cylinder axis 625. Each cam follower assembly 626 engages a corresponding cam 618 and acts on a piston 630 through its associated piston arm 628. Opposed pistons 630a, 630b within cylinder assembly 624 generally define a combustion chamber 632 therebetween into which fuel may be injected by a fuel injector 634.

In the illustrated embodiment, driveshaft 612 is hollow and extends from a first end 612a to a second end 612b. In FIG. 20A, high-pressure compressor 615 is mounted on adjacent first end 612a of driveshaft 612 and first cam 618a is mounted adjacent second end 612b of driveshaft 612. In FIG. 20B, an additional cam 618a' is mounted on driveshaft 612 between high-pressure compressor 615 and first cam 618a to assist first cam 618a in driving high-pressure compressor 615.

Shown in FIGS. 20A and 20B is a second driveshaft or spool 633 extending along axis 614 from a first end 633a to a second end 633b, where spool 633 passes axially through hollow driveshaft 612. A second cam 618b is mounted adjacent the second end 633b of driveshaft 633 while a fan 613 is mounted adjacent the first end 633a of spool 633. Additionally, mounted along spool 633 between fan 613 and high-pressure compressor 615 is low-pressure compressor 621. Thus, rotation of second cam 618b drives fan 613 as well as low-pressure compressor 615, as it feeds combustion air to high-pressure compressor 615. In FIG. 20B, and additional cam 618b' is mounted on spool 633 adjacent the second end 633b to assist second cam 618b in driving low-pressure compressor 621 and fan 613. Where a driveshaft or spool passes through a cam 618, the cam 618 may have a through-bore 637 formed therein.

Figure 21:
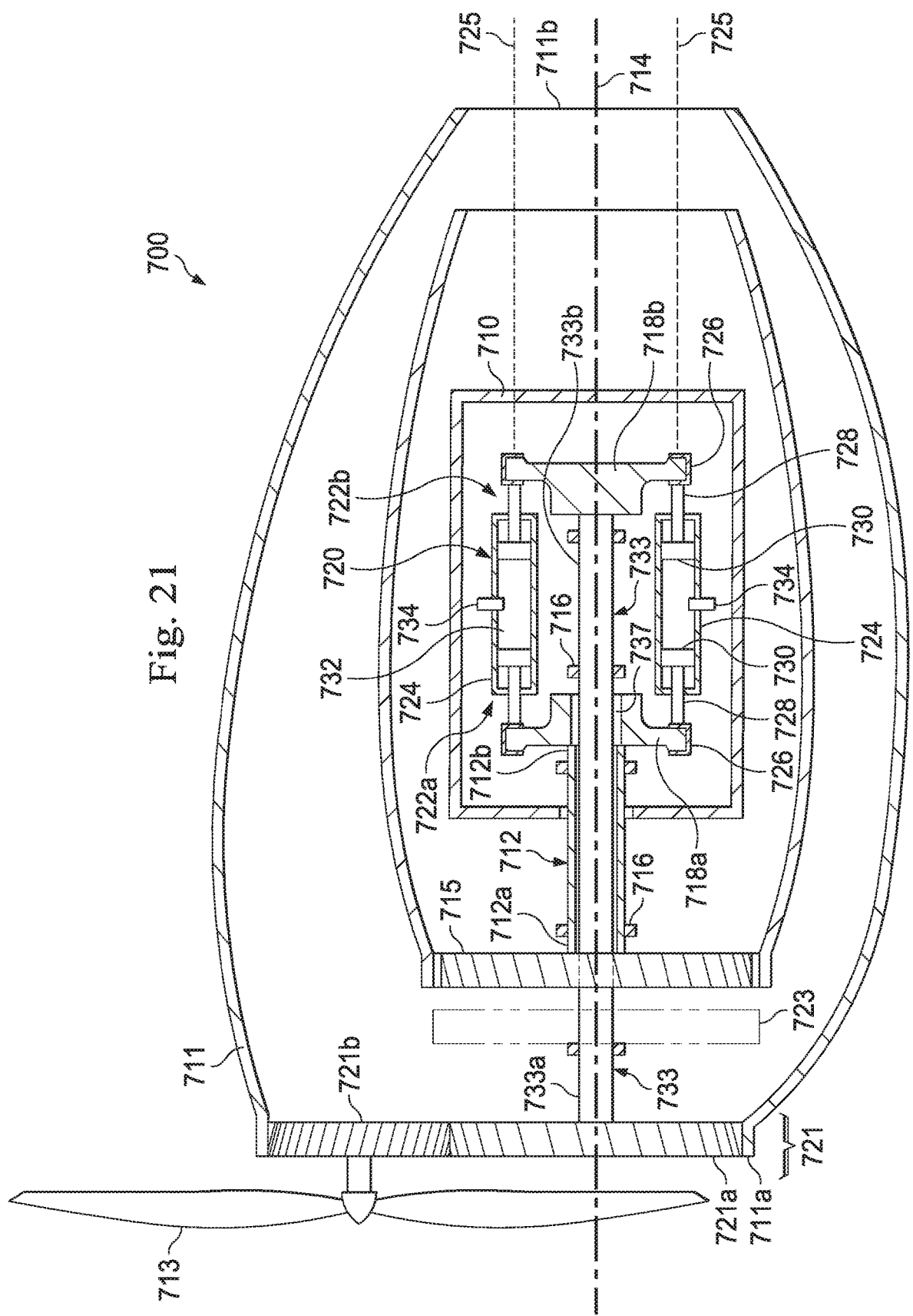
FIG. 21 is one embodiment of a turboprop engine utilizing a core internal combustion barrel engine driving isolated output cams for separately powering a turbine and a propeller.

Although each cam 618 need not be limited to a particular shape, in one or more embodiments, the shape of each cam 618 may be as described in the various embodiments of FIGS. 1-17. In this regard, barrel engine 610 may be as described in the various embodiments of FIGS. 1-17. FIG. 21 is one embodiment of a turboprop engine 700 utilizing a core internal combustion barrel engine 710 driving isolated output cams 718 for separately powering a turbine 715 and a propeller 713. Turboprop engine 700 generally includes an elongated nacelle 711 having a first open end 711a and an open second end 711b and enclosing barrel engine 710, a turbine 715 and gearset 721. Turbine 715 may be a compressor turbine. As used herein, a compressor turbine may be any rotating mechanism utilized to compress combustion air prior to introduction into engine 710. A propeller 713 is mounted on propeller driveshaft 717 engaged by gearset 721 adjacent the first end 711a of nacelle 711. Gearset 721 is not limited to any particular type of gearing arrangement. In one or more embodiments, gearset 721 includes at least a first gear 721a and a second gear 721b. It will be appreciated that engine 710 may be the engine 10 as described above in FIG. 1 or any engine as described in the Figures. In any event, a first driveshaft or spool 712 extends along a driveshaft combustion assembly axis 714. Positioned along driveshaft 712 is at least one harmonic barrel cam 718a disposed to drive a compressor turbine 715. In other embodiments, such as engine arrangements as described above in FIGS. 13 and 14, multiple cams may be positioned on driveshaft 712 to drive compressor turbine(s) 715. In the illustrated embodiment, driveshaft 712 is hollow and extends from a first end 712a to a second end 712b. Compressor turbine 715 is mounted adjacent first end 712a of driveshaft 712 and first cam 718a is mounted adjacent second end 712b of driveshaft 712. It will be appreciated that in FIG. 21, as well as all of the FIGS. 18-23, to simplify the description, various components of engine 700 are not shown but may generally include those components described above in FIGS. 1-17.

A second driveshaft or spool 733 extends along combustion assembly axis 714 from a first end 733a to a second end 733b. Second spool 733 passes axially through hollow driveshaft 712. A second cam 718b is mounted adjacent the second end 733b of driveshaft 733 while the first end first end 733a of spool 733 engages gearset 721 to drive gearset 721, and thereby drive propeller 713. In some embodiments, a low-pressure compressor 723 may also be mounted along spool 633 between gearset 721 and high-pressure compressor turbine 715. Where a driveshaft or spool passes through a cam 718, the cam 718 may have a through-bore 737 formed therein. In any event, combustion air passes through first open end 711a of nacelle 711 and passes to compressor turbine 715 where the combustion air is compressed before introduction into engine 710.

Positioned radially outward from driveshaft 712 are two or more piston pairs 720, each piston pair 720 having a first piston assembly 722a and a second piston assembly 722b which piston assemblies 722a, 722b are axially aligned with one another within a combustion cylinder assembly 724 disposed along a cylinder axis 725. Two piston pairs 720a, 720b are illustrated in FIG. 21, with each piston pair 720 having first and second piston assemblies 722a, 722b. Cylinder axis 725 is spaced apart from but generally parallel with driveshaft combustion assembly axis 714 of driveshaft 712. Each piston assembly 722 generally includes a piston arm 728 to which is mounted a piston 730 as these components are described above in more detail. Piston arm 728 is attached to a cam follower assembly 726. The opposed pistons 730a, 730b of a piston pair 720 are adapted to reciprocate along cylinder axis 725. Each cam follower assembly 726 engages a corresponding cam 718 and acts on a piston 730 through its associated piston arm 728. Opposed pistons 730a, 730b within cylinder assembly 724 generally define a combustion chamber 732 therebetween into which fuel may be injected by a fuel injector 734.

Although each cam 718 need not be limited to a particular shape, in one or more embodiments, the shape of each cam 718 may be as described in the various embodiments of FIGS. 1-17. In this regard, engine 710 may be as described in the various embodiments of FIGS. 1-17.

Figure 22:
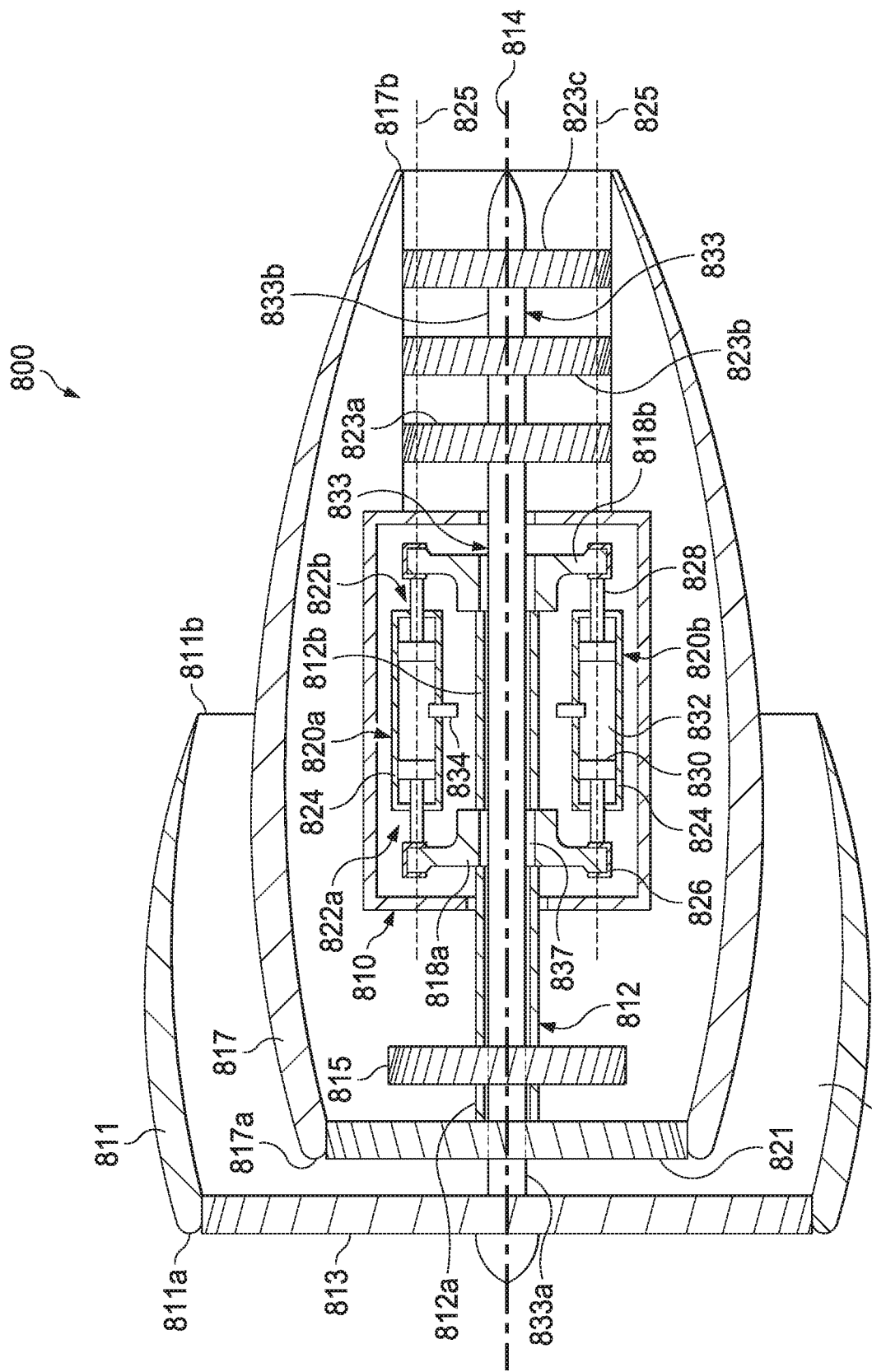
FIG. 22 is another embodiment of a turbofan engine utilizing a core internal combustion barrel engine with parallel combustion chambers.

FIG. 22 illustrates additional embodiments of a turbofan engine 800 utilizing a core internal combustion barrel engine 810 driving one or more output cams 818 for powering various engine components, such as a high-pressure compressor 815, a low-pressure compressor 821 and a fan 813. Turbofan engine 800 generally includes an elongated nacelle 811 having an open first end 811a and an open second end 811b and enclosing barrel engine 810, a high-pressure compressor 815 and a low-pressure compressor 821. A fan 813 is mounted within nacelle 811 adjacent the first open end 811a. In some embodiments, fan 813 may be a propeller. A core duct 817 extends from a first end 817a to a second end 817b and at least partially encloses engine 810, high-pressure compressor 815 and lower pressure compressor 821, forming an air flow annulus 819 between core duct 817 and nacelle 811. It will be appreciated that engine 810 may be the engine 10 as described above in FIG. 1 or any engine as described in the Figures. In any event, a first spool or driveshaft 812 extends along a driveshaft axis 814. Positioned along driveshaft 812 is a first harmonic barrel cam 818a and a second barrel cam 818b, spaced apart from first barrel cam 818a as described in the Figures above.

In any event, positioned radially outward from driveshaft 812 are two or more piston pairs 820, each piston pair 820 having a first piston assembly 822a and a second piston assembly 822b which piston assemblies 822a, 822b are axially aligned with one another within a combustion cylinder assembly 824 disposed along a cylinder axis 825. Two piston pairs 820a, 820b are illustrated in FIG. 22, with each piston pair 820 having first and second piston assemblies 822a, 822b. Cylinder axis 825 is spaced apart from but generally parallel with driveshaft axis 814 of driveshaft 812. Each piston assembly 822 generally includes a piston arm 828 to which is mounted a piston 830 as these components are described above in more detail. Piston arm 828 is attached to cam follower assembly 826. The opposed pistons 830a, 830b of a piston pair 820 are adapted to reciprocate along cylinder axis 825. Each cam follower assembly 826 engages a corresponding cam 818 and acts on a piston 830 through its associated piston arm 828. Opposed pistons 830a, 830b within cylinder assembly 824 generally define a combustion chamber 832 therebetween into which fuel may be injected by a fuel injector 834.

In the illustrated embodiment, driveshaft 812 is hollow and extends from a first end 812a to a second end 812b. In FIG. 22, low-pressure compressor turbine 821 is mounted on driveshaft 812 adjacent first end 812a and second cam 818b is mounted on driveshaft 812 adjacent second end 812b. First cam 818a is mounted along driveshaft 812 spaced apart from second cam 818b. Additionally, mounted along driveshaft 812 between fan 813 first cam 818a and low-pressure compressor turbine 821 is a high-pressure compressor 815. Where a driveshaft or spool passes through a cam 818, the cam 818 may have a through-bore 837 formed therein. Thus, rotation of the first and second cams 818a, 818b drive both low-pressure compressor turbine 21 as well as high-pressure compressor turbine 815 as they feed combustion air to engine 810.

Shown in FIG. 22 is a second driveshaft or spool 833 extending along axis 814 from a first end 833a to a second end 833b, where spool 833 passes axially through hollow driveshaft 812. A fan 813 is mounted on spool 833 at the first end 833a so as to be adjacent open first end 811a of nacelle 811. Additionally, mounted along spool 833 at the second end 833b are one or more turbines 823, such as turbines 823a, 823b and 823c. In one or more embodiments, exhaust from combustion chamber 832 may be directed from combustion cylinder assembly 824 via an exhaust manifold (not shown) to turbine(s) 823 positioned at the second end 833b of spool 833, generally adjacent the second end 817b of duct 817. In other embodiments, a portion of the air from low pressure compressor turbine 821 may be directed through core duct 817 to drive turbines 823. Thus, rotation turbine(s) 823 drives fan 813.

Although each cam 818 need not be limited to a particular shape, in one or more embodiments, the shape of each cam 818 may be as described in the various embodiments of FIGS. 1-17. In this regard, barrel engine 810 may be as described in the various embodiments of FIGS. 1-17.

Figure 23:
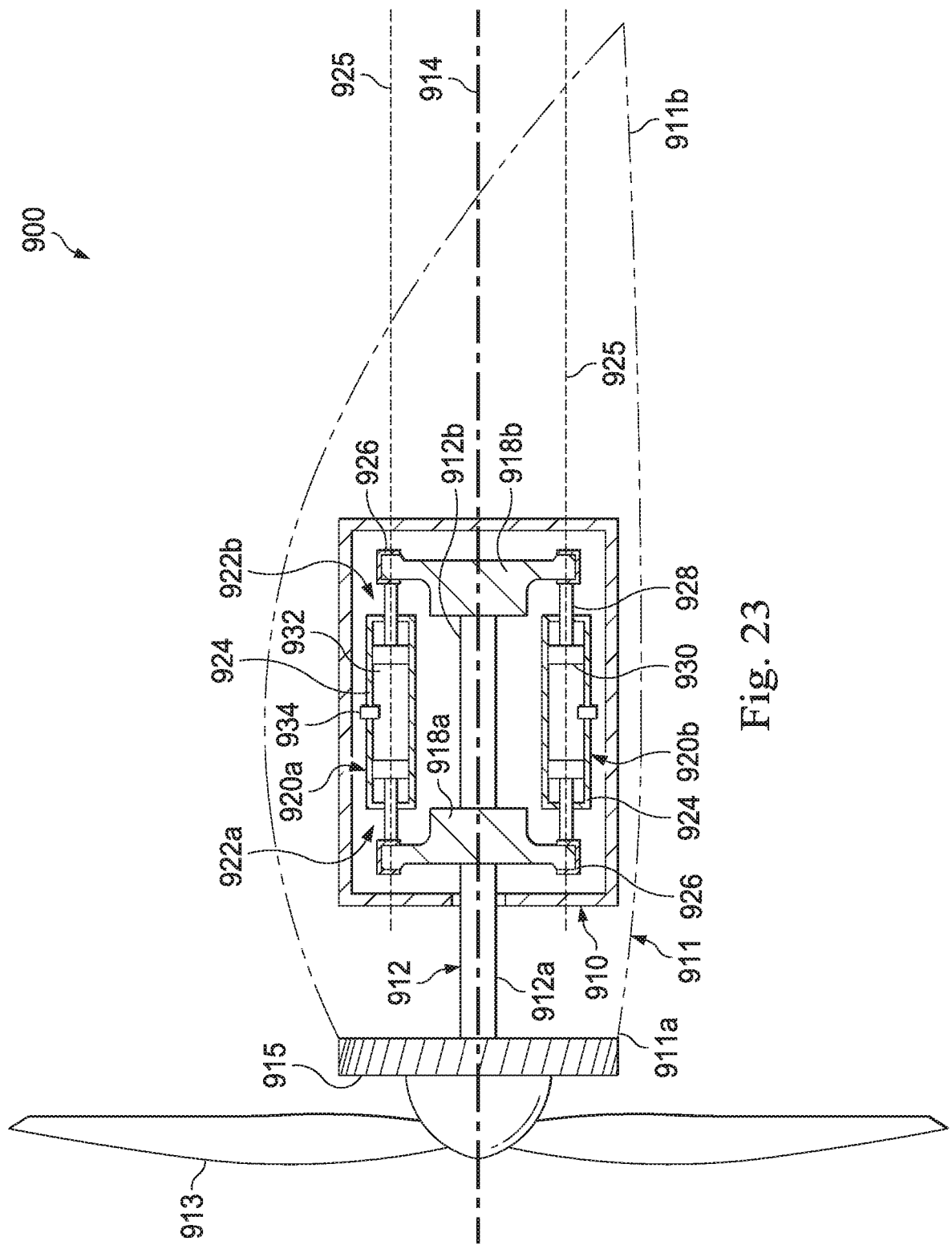
FIG. 23 is another embodiment of a turboprop engine utilizing a core internal combustion barrel engine with parallel combustion chambers.

Finally, with reference to FIG. 23 illustrated is another embodiment of a turboprop engine 900 utilizing a core internal combustion barrel engine 910 driving output cams 918a, 918b for powering a turbine 915 and a propeller 913. Turboprop engine 900 generally includes an elongated nacelle 911 having a first open end 911a and enclosing barrel engine 910. A turbine 915 is positioned adjacent first open end 911a of nacelle 911. Turbine 915 may be a compressor for compressing combustion air. It will be appreciated that engine 910 may be the engine 10 as described above in FIG. 1 or any engine as described in the Figures. In any event, a first driveshaft or spool 912 extends along a driveshaft axis 914. Positioned along driveshaft 912 is at least one harmonic barrel cam 918a disposed to drive turbine 915. In other embodiments, such as engine arrangements as described above in FIGS. 13 and 14, multiple cams may be positioned on driveshaft 912 to drive turbine 915. In the illustrated embodiment, driveshaft 912 extends from a first end 912a to a second end 912b. Propeller 913, along with turbine 915, is mounted adjacent first end 912a of driveshaft 912 and second cam 918b is mounted adjacent second end 912b of driveshaft 912. A first cam 918a is mounted along driveshaft 912 spaced apart from second cam 918b. In any event, combustion air passes through first open end 911a of nacelle 911 and passes to turbine 915 where the combustion air is compressed before introduction into engine 910.

Positioned radially outward from driveshaft 912 are two or more piston pairs 920, each piston pair 920 having a first piston assembly 922a and a second piston assembly 922b which piston assemblies 922a, 922b are axially aligned with one another within a combustion cylinder assembly 924 disposed along a cylinder axis 925. Two piston pairs 920a, 920b are illustrated in FIG. 23, with each piston pair 920 having first and second piston assemblies 922a, 922b. Cylinder axis 925 is spaced apart from but generally parallel with driveshaft axis 914 of driveshaft 912. Each piston assembly 922 generally includes a piston arm 928 to which is mounted a piston 930 as these components are described above in more detail. Piston arm 928 is attached to a cam follower assembly 926. The opposed pistons 930a, 930b of a piston pair 920 are adapted to reciprocate along cylinder axis 925. Each cam follower assembly 926 engages a corresponding cam 918 and acts on a piston 930 through its associated piston arm 928. Opposed pistons 930a, 930b within cylinder assembly 924 generally define a combustion chamber 932 therebetween into which fuel may be injected by a fuel injector 934.

Although each cam 918 need not be limited to a particular shape, in one or more embodiments, the shape of each cam 918 may be as described in the various embodiments of FIGS. 1-17. In this regard, barrel engine 910 may be as described in the various embodiments of FIGS. 1-17.

Thus, an aircraft engine has been described. Embodiments of an aircraft engine may include a hollow driveshaft having a first end and a second end and disposed along a driveshaft axis; a spool coaxial with the driveshaft and extending along the driveshaft axis from a first end to a second end and passing through the driveshaft; a first cam mounted on the driveshaft at the second end of the driveshaft, the first cam having a circumferential shoulder of a first cam diameter and a first curvilinear shape with a first frequency; a second cam mounted on the spool spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; a high-pressure compressor turbine attached to the first end of the driveshaft; a first gear attached to the first end of the spool; a propeller driveshaft parallel with but spaced apart from the driveshaft axis, the propeller driveshaft having a first end and a second end; a propeller attached to the first end of the propeller driveshaft; and a second gear attached to the second end of the propeller driveshaft, the second gear meshed with the first gear. Other embodiments of the aircraft engine may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; a high-pressure compressor turbine attached to the first end of the driveshaft; a spool coaxial with the driveshaft and extending along the driveshaft axis from a first end to a second end; a propeller attached to the first end of the spool; and a low-pressure compressor turbine adjacent the high-pressure compressor turbine, the low-pressure compressor turbine attached to the spool and positioned between the propeller and the high-pressure turbine. Still yet other embodiments of an aircraft engine may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; a high-pressure compressor turbine attached to the first end of the driveshaft; a spool coaxial with the driveshaft and extending along the driveshaft axis from a first end to a second end; a fan attached to the first end of the spool; and a low-pressure compressor turbine adjacent the high-pressure compressor turbine, the low-pressure compressor turbine attached to the spool and positioned between the fan and the high-pressure turbine. Other embodiments of an aircraft engine may include a hollow driveshaft having a first end and a second end and disposed along a driveshaft axis; a spool coaxial with the driveshaft and extending along the driveshaft axis from a first end to a second end and passing through the driveshaft; a first cam mounted on the driveshaft at the second end of the driveshaft, the first cam having a circumferential shoulder of a first cam diameter and a first curvilinear shape with a first frequency; a second cam mounted on the spool spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; a high-pressure compressor turbine attached to the first end of the driveshaft; a fan attached to the first end of the spool; a low-pressure compressor turbine adjacent the high-pressure compressor turbine, the low-pressure compressor turbine attached to the spool and positioned between the fan and the high-pressure turbine; and a turbine attached to the second end of the spool. Other embodiments of an aircraft engine may include a hollow driveshaft having a first end and a second end and disposed along a driveshaft axis; a spool coaxial with the driveshaft and extending along the driveshaft axis from a first end to a second end and passing through the driveshaft; a first cam mounted on the driveshaft at the second end of the driveshaft, the first cam having a circumferential shoulder of a first cam diameter and a first curvilinear shape with a first frequency; a second cam mounted on the spool spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; a high-pressure compressor turbine attached to the first end of the driveshaft; a fan attached to the first end of the spool; and a low-pressure compressor turbine adjacent the high-pressure compressor turbine, the low-pressure compressor turbine attached to the spool and positioned between the fan and the high-pressure turbine. In other embodiments, an internal combustion engine may have a first driveshaft having a first driveshaft end and a second driveshaft end and disposed along a driveshaft axis; a second driveshaft having a first driveshaft end and a second driveshaft end and disposed along the driveshaft axis, the second driveshaft spaced apart from the first driveshaft; a first cam mounted on the first driveshaft, the first cam having a circumferential shoulder of a first cam diameter and a first curvilinear shape with a first frequency; a second cam mounted on the second driveshaft and spaced apart from the first cam, the second cam having a circumferential shoulder of a second curvilinear shape which second curvilinear shape has a second frequency; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder; at least one fuel injector disposed within the combustion cylinder and in communication with said combustion chamber; a first rotating component mounted on the first driveshaft adjacent the first driveshaft end of the first driveshaft; a second rotating component mounted on the second driveshaft the adjacent the second driveshaft end of the second driveshaft; wherein the first rotating component is selected from the group consisting of a propeller, a fan, a turbine and a gear; and wherein the second rotating component is selected from the group consisting of a propeller, a fan, a turbine and a gear. In other embodiments, the aircraft engine may include a hollow driveshaft having a first driveshaft end and a second driveshaft end and disposed along a driveshaft axis; a spool coaxial with the driveshaft and extending along the driveshaft axis from a first spool end to a second spool end and passing through the driveshaft; a first cam mounted on the driveshaft, the first cam having a circumferential shoulder of a first cam diameter and a first curvilinear shape with a first frequency; a second cam disposed along a driveshaft axis and spaced apart from the first cam, the second cam having a circumferential shoulder of a second curvilinear shape which second curvilinear shape has a second frequency; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder; at least one fuel injector disposed within the combustion cylinder and in communication with said combustion chamber; and a turbine coaxially mounted on one of the driveshaft or the spool. In other embodiments, the aircraft engine may include a hollow driveshaft having a first driveshaft end and a second driveshaft end and disposed along a driveshaft axis; a spool coaxial with the driveshaft and extending along the driveshaft axis from a first spool end to a second spool end and passing through the driveshaft; a first cam mounted on the driveshaft, the first cam having a circumferential shoulder of a first cam diameter and a first curvilinear shape with a first frequency; a second cam mounted on the spool and spaced apart from the first cam, the second cam having a circumferential shoulder of a second curvilinear shape which second curvilinear shape has a second frequency; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder; at least one fuel injector disposed within the combustion cylinder and in communication with said combustion chamber; and a compressor turbine mounted on the driveshaft adjacent the first driveshaft end. In other embodiments, the aircraft engine may include a hollow driveshaft having a first driveshaft end and a second driveshaft end and disposed along a driveshaft axis; a spool coaxial with the driveshaft and extending along the driveshaft axis from a first spool end to a second spool end and passing through the driveshaft; a first cam mounted on the driveshaft, the first cam having a circumferential shoulder of a first cam diameter and a first curvilinear shape with a first frequency; a second cam mounted on the driveshaft and spaced apart from the first cam, the second cam having a circumferential shoulder of a second curvilinear shape which second curvilinear shape has a second frequency; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder; at least one fuel injector disposed within the combustion cylinder and in communication with said combustion chamber; a compressor turbine mounted on the driveshaft adjacent the first driveshaft end; and a rotating component coaxially mounted on the spool; wherein the rotating component is selected from the group consisting of a propeller, a fan, a turbine and a gear. In other embodiments, the aircraft engine may include a driveshaft having a first driveshaft end and a second driveshaft end and disposed along a driveshaft axis; a first cam mounted on the driveshaft, the first cam having a circumferential shoulder of a first cam diameter and a first curvilinear shape with a first frequency; a second cam mounted on the driveshaft and spaced apart from the first cam, the second cam having a circumferential shoulder of a second curvilinear shape which second curvilinear shape has a second frequency; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder; at least one fuel injector disposed within the combustion cylinder and in communication with said combustion chamber; a compressor turbine mounted on the driveshaft between the first cam and the first driveshaft end; and a rotating component mounted on driveshaft adjacent the first driveshaft end; wherein the rotating component is selected from the group consisting of a propeller, a fan, a turbine and a gear.

The following elements may be combined alone or in combination with any other elements for any of the foregoing engine embodiments:

The driveshaft is hollow.

A spool axially aligned with and extending through a hollow driveshaft.

A first turbine attached to the second end of the spool.

A second turbine attached to the second end of the driveshaft adjacent the first turbine.

The fan is a propeller.

The second cam is mounted on the driveshaft.

The turbine is a high-pressure compressor turbine mounted on the driveshaft adjacent the first driveshaft end and the second cam is mounted on the driveshaft adjacent the second driveshaft end.

A drive turbine disposed along a driveshaft axis and a low-pressure compressor turbine mounted on spool adjacent the high-pressure compressor turbine.

A fan mounted on the spool at the first spool end.

A propeller mounted on the spool at the first spool end.

The drive turbine is mounted on the spool adjacent the second spool end and the second cam is mounted on the driveshaft adjacent the second driveshaft end.

An engine core duct disposed about the first and second cams, the first combustion cylinder, the high-pressure compressor turbine, the drive turbine and the low-pressure compressor turbine, wherein the core duct extends from a first open end to a second open end, with the low-pressure compressor turbine disposed adjacent the first open end.

An elongated nacelle having a first open end and a second open end and at least partially enclosing the core duct but spaced apart from the core duct to form an air flow annulus between core duct and the nacelle.

A rotating component coaxially mounted on the first spool end adjacent the first open end of the nacelle.

The rotating component is selected from the group consisting of a propeller, a fan and a gear.

The compressor turbine mounted on the driveshaft is a high-pressure compressor turbine, the aircraft engine further comprising a turbine mounted on the spool.

The turbine mounted on the spool is a low-pressure compressor turbine mounted adjacent the high-pressure compressor turbine.

A rotating component coaxially mounted on the spool adjacent the first spool end; wherein the second cam is mounted on the spool adjacent the second spool end; and wherein the rotating component is selected from the group consisting of a propeller, a fan, a turbine and a gear.

The turbine mounted on the spool is a drive turbine mounted on the spool adjacent the second spool end.

A drive turbine mounted on the spool adjacent the second spool end.

A combustion air manifold extending between the compressor turbine and the intake port of the first combustion cylinder.

An exhaust manifold extending from the exhaust port to the drive turbine.

The compressor turbine is a high-pressure compressor turbine, and further comprising a low-pressure compressor turbine mounted on the driveshaft between the high-pressure compressor turbine and the first driveshaft end.

The rotating component is a drive turbine mounted on the spool adjacent the second spool end.

An engine core duct disposed about the first and second cams, the first combustion cylinder and the compressor turbine, wherein the core duct extends from a first open end to a second open end, with the low-pressure compressor turbine disposed adjacent the first open end; and an elongated nacelle having a first open end and a second open end and at least partially enclosing the core duct but spaced apart from the core duct to form an air flow annulus between core duct and the nacelle; with the rotating component adjacent the first open end of the nacelle.

A combustion air manifold extending between the compressor turbine and the intake port of the first combustion cylinder.

At least 4 cylinders symmetrically spaced around the driveshaft.

A second combustion cylinder having a first end and a second end, the second combustion cylinder defined along the center cylinder axis so as to be axially aligned with the first combustion cylinder; a third piston assembly disposed in the first cylinder end of the second combustion cylinder; and an opposing fourth piston assembly disposed in the second cylinder end of the second combustion cylinder.

The third piston assembly engages the curvilinear shaped shoulder of the second cam.

A third cam mounted on the driveshaft and spaced apart from the second cam, the third cam having a circumferential shoulder of a third curvilinear shape, wherein the fourth piston assembly engages the curvilinear shaped shoulder of the third cam.

Two or more combustion cylinders axially aligned along the central cylinder axis, each combustion cylinder having a first end and a second end with a piston assembly disposed in each cylinder end so that piston heads of the piston assemblies of a cylinder oppose one another within the cylinder.

Three or more cams coaxially mounted on the driveshaft and spaced apart from one another, each cam having a cylindrical shoulder of curvilinear shape, wherein each cam positioned between two successive combustion cylinders is engaged by a piston assembly extending from each of the successive combustion cylinders.

First, second and third piston assemblies, each comprising a piston arm having a first end and a second end, with a piston attached to the first end of the piston arm and a cam follower attached to the second end of the piston arm, wherein the cam follower assembly includes an elongated structure having a first end and a second end, wherein the elongated structure is generally cylindrically shaped at each end, the elongated structure having an axially extending first slot formed in the body adjacent the first end and an axially extending second slot formed in the body adjacent the second; a first roller mounted to the body in first slot; and a second roller mounted to the body in second slot.

The first roller of the first cam follower assembly has a larger diameter than the second roller of the first cam follower assembly; the first roller of the second cam follower assembly has a larger diameter than the second roller of the second cam follower assembly; and the first roller of the third cam follower assembly is the same diameter as the second roller of the third cam follower assembly.

The first roller has a diameter that is larger than the diameter of the second roller.

The combustion cylinder further comprises a cylinder wall and the exhaust port comprises a plurality of exhaust slots formed in the cylinder wall between the fuel injector and the second end, each exhaust slot extending along a slot axis generally parallel with the central cylinder axis, the intake port comprising a plurality of intake slots formed in the cylinder wall between the fuel injector and the first end, each intake slot extending along a slot axis generally diagonal with the central cylinder axis.

The exhaust slots only extend around a portion of a periphery of the cylinder.

The exhaust slots extend around no more than 180 degrees of the periphery of the cylinder.

The exhaust slots extend around no more than 90 degrees of the periphery of the cylinder.

The intake slots only extend around a portion of a periphery of the cylinder.

The intake slots extend around no more than 180 degrees of the periphery of the cylinder.

The intake slots extend around no more than 90 degrees of the periphery of the cylinder.

At least one annular flow manifold extending at least partially around the driveshaft, the annular flow manifold fluidically connecting the ports of two or more combustion cylinders.

The annular flow manifold is an annular intake manifold fluidically connecting the intake ports of two or more combustion cylinders.

The annular flow manifold is an annular exhaust manifold fluidically connecting the exhaust ports of two or more combustion cylinders.

Wherein the annular flow manifold extends around the driveshaft and forms an annular flowpath around the driveshaft fluidically connecting the intake or exhaust ports of all combustion cylinders.

A manifold extends fully around the driveshaft.

Both manifolds extend fully around the driveshaft.

An annular intake manifold extending at least partially around the driveshaft and fluidically connecting the intake ports of two or more combustion cylinders; and an annular exhaust manifold extending at least partially around the driveshaft, spaced axially apart from the annular intake manifold, the annular exhaust manifold fluidically connecting the exhaust ports of two or more combustion cylinders.

The annular intake manifold extends around the driveshaft and forms an annular combustion air flowpath around the driveshaft fluidically connecting the intake ports of all combustion cylinders and wherein the annular exhaust manifold extends around the driveshaft and forms an annular exhaust flowpath around the driveshaft fluidically connecting the exhaust ports of all combustion cylinders.

An engine block in which the driveshaft and combustion cylinder are supported, the engine block extends between a first end and a second end and includes an annular body portion therebetween, which annular body portion is characterized by an exterior surface and in which is formed a first annular channel and a second annular channel spaced apart from one another, the first annular channel in fluid communication with the intake port of the combustion cylinder and the second annular channel in fluid communication with the exhaust port of the combustion cylinder.

The annular channels extend from the exterior surface inwardly towards the driveshaft.

At least one annular channel extends around the entire circumference of the annular body portion.

At least one annular channel extends around only a portion of the circumference of the annular body portion.

The first and second annular channels are spaced apart from one another about the center of the annular body portion.

The engine block comprises a cylinder bore extending axially through the engine block and intersecting both of the annular channels, the combustion cylinder mounted in the cylinder bore so that the intake port aligns with the first annular channel and the exhaust port aligns with the second annular channel.

At least three cylinder bores extending axially through the engine block and intersecting both of the annular channels, the cylinder bores symmetrically spaced about the driveshaft, each cylinder bore having a combustion cylinder mounted therein, each combustion cylinder having an intake port in fluid communication with the first annular channel and an exhaust port in fluid communication with the second annular channel, each combustion cylinder further having a first end and a second end with a piston assembly disposed in each cylinder end so that piston heads of the piston assemblies of a cylinder oppose one another within the cylinder.

A fuel injector port formed in the exterior surface of the annular body portion adjacent the center of the annular body portion and extending towards the combustion cylinder, wherein the fuel injector is mounted in the fuel injector port.

A sparkplug port formed in the exterior surface of the annular body portion adjacent the fuel injector port, the spark plug port extending towards the combustion cylinder.

The first cam comprises a hub mounted on driveshaft with the circumferential shoulder extending around a periphery of hub, the curvilinear shaped first cam shoulder has at least two peaks and at least two troughs formed by the shoulder, wherein each trough includes a substantially flat portion at its base and wherein each peak is rounded at its apex; the second cam comprises a hub mounted on driveshaft with the circumferential shoulder extending around a periphery of hub, the curvilinear shaped second cam shoulder has at least two crests and at least two troughs formed by the shoulder and corresponding in number to the crests and troughs of the first cam, wherein each trough of the second cam is rounded at its base and wherein each peak includes a substantially flat portion at its apex.

The first cam comprises a hub mounted on driveshaft with the circumferential shoulder extending around a periphery of hub, the curvilinear shaped first cam shoulder has at least two peaks having a first peak amplitude and at least two troughs having a first trough amplitude, wherein the first trough amplitude is less than the first peak amplitude; the second cam comprises a hub mounted on driveshaft with the circumferential shoulder extending around a periphery of hub, the curvilinear shaped second cam shoulder has at least two peaks having a second peak amplitude and at least two troughs having a second trough amplitude, wherein the second trough amplitude is greater than the second peak amplitude.

The second cam has a second cam diameter which second cam diameter is the same as the first cam diameter.

The first peak amplitude is substantially equivalent to the second trough amplitude, and the first trough amplitude is substantially equivalent to the second peak amplitude.

The first and second cams have the same number of peaks and troughs.

The curvilinear shape of the first cam has a curvilinear frequency that is the same as the curvilinear frequency of the curvilinear shape of the second cam.

The amplitude of the curvilinear shaped shoulders of each cam is the same.

The shoulder of each cam has at least four crests and at least four troughs.

Each curvilinear shaped cam shoulder comprises an inwardly facing track and an outwardly facing track.

Each cam includes a cam index and each cam is mounted on the driveshaft and radially indexed with a driveshaft index, wherein the first cam and the second cam have the same curvilinear shape, and wherein one cam is angularly displaced on the driveshaft an angle of between zero and fifteen degrees relative to the other cam.

The angular displacement between the first and second cams is between .5 to 11 degrees.

The piston assembly comprises a piston arm having a first annular body of a piston arm diameter spaced apart from a second annular body having a similar piston arm diameter and interconnected by a smaller diameter neck, with a piston attached to the first annular body and a cam follower attached to the second annular body.

The neck is of solid cross-sectional area.

An annulus is formed around the neck between the first and second annular bodies.

Each annular body includes an annular groove formed around annular body with a sealing element disposed in the annular groove.

The piston assemblies each comprises a piston arm having a first end and a second end, with a piston attached to the first end of the piston arm.

A first cam follower linked to first and third piston assemblies and a second cam follower linked to the second and fourth piston assemblies, each cam follower assembly includes an elongated structure having a first end and a second end, wherein the elongated structure is generally cylindrically shaped at each end, which ends are interconnected by an arm, the elongated structure having an axially extending first slot formed in the body adjacent the first end and an axially extending second slot formed in the body adjacent the second; a first roller mounted to the body in the first slot; and a second roller mounted to the body in the second slot; and wherein the third and fourth piston assemblies each comprise a piston arm having a first end and a second end, wherein the first cam follower engages the curvilinear shaped shoulder of the first cam and the second cam follower engages the curvilinear shaped shoulder of the second cam.

The piston assembly comprises a piston arm having a first end and a second end, with a piston attached to the first end of the piston arm and a cam follower attached to the second end of the piston arm, wherein the cam follower assembly includes an elongated structure having a first end and a second end, wherein the elongated structure is generally cylindrically shaped at each end, which ends are interconnected by an arm within which is formed a lubrication passage extending along a portion of the length of the arm between the two ends, the elongated structure having an axially extending first slot in formed in the body adjacent the first end and an axially extending second slot formed in the body adjacent the second; a first roller mounted to the body in the first slot; and a second roller mounted to the body in the second slot, wherein the lubrication passage extends in the arm between the two rollers.

The first cylindrically shaped end of the cam follower assembly is of a first diameter and the second cylindrically shaped end of the cam follower assembly is of a second diameter smaller than the first diameter.

The piston assembly comprises a piston arm having a first end and a second end, with a piston attached to the first end of the piston arm and a cam follower attached to the second end of the piston arm, wherein the cam follower assembly includes an elongated structure having a first end and a second end, wherein the elongated structure is generally cylindrically shaped at each end, which ends are interconnected by an arm, the elongated structure having an axially extending first slot in formed in the body adjacent the first end and an axially extending second slot formed in the body adjacent the second; a first roller mounted to the body in the first slot; and a second roller mounted to the body in the second slot.

A port formed in the arm adjacent the first roller and in fluid communication with the lubrication passage, a port formed in the arm adjacent the second roller and in fluid communication with the lubrication passage, and an additional port formed in the elongated cam follower body in fluid communication with the lubrication passage.

A first roller bearing and a second roller bearing, wherein the first port is in fluid communication with the first roller bearing and the second port is in fluid communication with the second roller bearing.

The elongated structure has an outer surface and the additional port is formed in the outer surface of the elongated structure.

The cylindrically shaped second end of the cam follower body has a bore formed therein.

The cylindrically shaped second end of the cam follower body has a bore formed therein with a radially extending window formed in the second end and intersecting the bore.

The cam follower assembly further comprises a radially adjustable spacer pad mounted on the arm between the first and second rollers and extending inwardly of the arm between the first and second slots.

The first roller has a larger diameter than the second roller.

The first and second slots are formed along a plane and each roller has a rotational axis that is generally parallel with the rotational axis of the other roller and which axii are generally perpendicular to the plane along which the slots are formed.

The cam follower assembly engages the curvilinear shaped shoulder of a cam.

Each curvilinear shaped cam shoulder comprises an inwardly facing track facing the combustion cylinder and an outwardly facing track facing away from the combustion chamber, wherein the first roller bears against the inwardly facing track and the second roller bears against the outwardly facing track.

The adjustable spacer pad bears against the outer edge of the curvilinear shoulder.

The larger diameter first roller bears against the inwardly facing track and the smaller diameter second roller bears against the outwardly facing track.

A guidance cap coaxially mounted around a driveshaft end, outwardly of the cam between the cam and the driveshaft end, wherein the guidance cap comprises a central bore through which the driveshaft extends and two or more symmetrically positioned follower bores radially spaced outward of central bore with each follower bore slidingly receiving the cylindrically shaped second end of a cam follower assembly.

An engine block in which the driveshaft is supported, the engine block extending between a first end and a second end and includes an annular body portion therebetween, which annular body is generally coaxial with the driveshaft, and which annular body portion is characterized by an exterior surface, wherein at least one cylinder bore radially spaced apart from the driveshaft but parallel therewith is formed in the engine block and coaxial with a follower bore of the guidance cap.

The guidance cap comprises at least six symmetrically spaced follower bores, each slidingly receiving the cylindrically shaped second end of a cam follower assembly.

The follower bores are of a diameter less than the bores of the engine block.

The guidance cap comprises a port formed within the bore disposed to align with the port along the outer surface of the elongated structure of the cam follower assembly.

A first guidance cap positioned adjacent the first end of the driveshaft and a second guidance cap positioned adjacent the second end of the driveshaft.

The piston assembly comprises a piston arm having a first end and a second end, with a piston attached to the first end of the piston arm and a cam follower attached to the second end of the piston arm, wherein the piston is formed of an annular body having a first end attached to piston arm and a second end, with a crown formed at the second end of the annular body, the crown having an indention formed in an outwardly facing crown surface.

The indention has an indention depth.

The intention is conically shaped about the primary axis of the piston.

A notch formed at the periphery of annular body and extending inward to intersect with the indention.

The notch has a notch depth no deeper than indention depth.

The notch extends no more than approximately 90 degrees around the periphery of annular body.

The notch extends no more than approximately 60 degrees around the periphery of annular body.

The notch extends between 5 and 30 degrees around the periphery of annular body.

A portion of the fuel injector extends into the notch when the piston assembly is extended to the inner dead center position.

A portion of the notch extends around a portion of the fuel injector when the piston assembly is extended to the inner dead center position.

A first link interconnecting the first and third piston assemblies and a second link interconnecting the second and fourth piston assemblies.

The first and second piston assemblies each comprises a piston arm having a first end and a second end, with a piston attached to the first end of the piston arm and a cam follower attached to the second end of the piston arm, wherein the cam follower assembly includes an elongated structure having a first end and a second end, wherein the elongated structure is generally cylindrically shaped at each end, which ends are interconnected by an arm, the elongated structure having an axially extending first slot formed in the body adjacent the first end and an axially extending second slot formed in the body adjacent the second; a first roller mounted to the body in the first slot; and a second roller mounted to the body in the second slot; and wherein the third and fourth piston assemblies each comprise a piston arm having a first end and a second end, with a piston attached to the first end of the piston arm.

A first link interconnecting the first and third piston assemblies and a second link interconnecting the second and fourth piston assemblies.

The first link interconnects the cam follower assembly attached to the first piston assembly with the piston arm of the third piston assembly, and the second link interconnects the cam follower assembly attached to the second piston assembly with the piston arm of the fourth piston assembly.

The first link interconnects the piston arm of the first piston assembly with the piston arm of the third piston assembly, and the second link interconnects the piston arm of the second piston assembly with the piston arm of the fourth piston assembly.

The cam follower assembly attached to the first piston assembly engages the first cam and the cam follower assembly attached to the second piston assembly engages the second cam.

A second combustion cylinder having a first end and a second end and defined along second center cylinder axis parallel with the first combustion cylinder central axis but radially spaced outward from the first combustion cylinder central axis; a third cam mounted on the driveshaft between the first cam and the first driveshaft end, the third cam having a circumferential shoulder of a third cam diameter and a third curvilinear shape with a third frequency, the third cam diameter being larger than the first cam diameter; a fourth cam mounted on the driveshaft between the second cam and the second end of the driveshaft, the fourth cam having a circumferential shoulder of a fourth curvilinear shape which fourth curvilinear shape has the same frequency as the third curvilinear shape.

A third piston assembly disposed in the first cylinder end of the second combustion cylinder and an opposing fourth piston assembly disposed in the second cylinder end of the second combustion cylinder, the third piston assembly engaging the curvilinear shaped shoulder of the third cam and the fourth piston assembly engaging the curvilinear shaped shoulder of the fourth cam, each piston assembly movable between an inner dead center position in which the piston assembly is extended in the combustion chamber away from its corresponding cam and an outer dead center position in which the piston assembly is retracted in the combustion chamber away from the inner dead center position.

The fourth cam has a fourth cam diameter which fourth cam diameter is the same as the third cam diameter.

The frequency of the third cam is less than the frequency of the first cam.

The curvilinear shaped first cam shoulder of the first cam has at least two peaks having a first peak amplitude and at least two troughs having a first trough amplitude; and the curvilinear shaped third cam shoulder has at least two peaks having a second peak amplitude and at least two troughs having a second trough amplitude, wherein the amplitudes of the third cam shoulder are less than the amplitudes of the first cam shoulder.

A piston arm having a first end and a second end, with a piston attached to the first end of the piston arm and a cam follower attached to the second end of the piston arm, wherein the cam follower assembly includes an elongated structure having a first end and a second end, the elongated structure having an axially extending first slot formed in the body adjacent the first end and an axially extending second slot formed in the body adjacent the second; a first roller mounted to the body in first slot; and a second roller mounted to the body in second slot.

The second cam has a second cam diameter which second cam diameter is the same as the first cam diameter.

The curvilinear shape is sinusoidal shape.

The curvilinear shape is a segmented polynomial shape.

The cams are substantially in phase so that the peak of a lobe of the first cam is aligned with and substantially mirrors the peak of a lobe of the second cam.

The cams are substantially in phase so that the peak of each lobe of the first cam is aligned with and substantially mirrors a peak of each lobe of the second cam.

The average slope of the descending shoulder portion is greater than 45 degrees.

Each lobe is asymmetrical about its peak.

A segment of the shoulder shape extending from a peak towards the second trough is linear.

The linear segment of shoulder shape extending from a lobe peak has a slope greater than zero and less than 20 degrees.

Each adjacent lobe has a linear segment of shoulder shape extending from the lobe peak, and the linear segments have a changing slope that is the same.

The slope of the descending shoulder portion of a lobe of the first cam is the same as the slope of the descending shoulder portion of an adjacent lobe of the second cam.

The segmented polynomial shaped shoulder of the first cam has the same shape as the segmented polynomial shaped shoulder of the second cam.

The descending portions of the segmented polynomial shaped shoulder of the first cam have the same shape as the descending portions of the segmented polynomial shaped track of the second cam.

The ascending portions of the segmented polynomial shaped shoulder of the first cam have the same shape as the ascending portions of the segmented polynomial shaped shoulder of the second cam.

The ascending portions of the segmented polynomial shaped shoulder of the first cam have a different shape than the ascending portions of the segmented polynomial shaped shoulder of the second cam.

A combustion cylinder defined along the piston axis, the combustion cylinder having a first end and a second end with an intake port formed in the cylinder between the first and second ends and having an outer port edge closest to the first end and an inner port edge closest to the second end, an exhaust port formed in the cylinder between the intake port and the second end and having an outer port edge closest to the second end and an inner port edge closest to the first end, with inner dead center of the combustion cylinder defined approximately equidistance between the outer edge of the intake port and the outer edge of the exhaust port.

The inner port edge of the exhaust port is closer to inner dead center than the inner port edge of the intake port.

A first piston is reciprocatingly disposed in the first cylinder end of the combustion cylinder and engages the first cam along the first segmented polynomial shaped shoulder, and an opposing second piston is reciprocatingly disposed in the second cylinder end of the combustion cylinder and engages the second cam along the second segmented polynomial shaped shoulder.

The first piston and second piston are adjacent inner dead center of the combustion cylinder when the first piston engages the first cam at the peak of a first cam lobe, the first piston blocking flow through the intake port and the second piston blocking flow though the exhaust port.

The first piston is adjacent the outer edge of the intake port and second piston is adjacent the outer edge of the exhaust port when the first piston engages the first cam at a trough along the first segmented polynomial shaped shoulder.

The first piston blocks flow through the intake port when the first piston engages the first cam along a descending shoulder portion of a lobe of the first cam and the second piston is spaced apart from the inner port edge of the exhaust port when the first piston engages the first cam along the descending shoulder portion of the lobe.

The second piston blocks flow through the exhaust port when the second piston engages the second cam along an ascending shoulder portion of a lobe of the second cam and the first piston is spaced apart from the inner port edge of the intake port when the second piston engages the second cam along the ascending shoulder portion of the lobe.

A combustion chamber is defined within the cylinder between the two cylinder ends, the combustion cylinder further comprising a cylinder wall and the exhaust port comprises a plurality of exhaust slots formed in the cylinder wall between the fuel injector and the second end, each exhaust slot extending along a slot axis generally parallel with the central cylinder axis, the intake port comprising a plurality of intake slots formed in the cylinder wall between the fuel injector and the first end, each intake slot extending along a slot axis generally diagonal with the central cylinder axis.

A fuel injection port formed in the cylinder wall at inner dead center of the combustion cylinder.

A spark plug port formed in the cylinder wall between the plurality of exhaust slots and the plurality of intake slots.

The first and second segmented polynomial shaped shoulders are symmetric in shape extending from a respective lobe peak to a point along the descending shoulder portion and asymmetric in shape along the shoulders extending from the respective second trough to the lobe peak.

Each cam has a single lobe and the first trough and second trough are the same.

An engine block in which the driveshaft is supported, the engine block extending between a first end and a second end and includes an annular body portion therebetween, which annular body is generally coaxial with the driveshaft, and which annular body portion is characterized by an exterior surface, wherein at least one cylinder bore radially spaced apart from the driveshaft but parallel therewith is formed in the engine block.

The engine block comprises a first annular channel and a second annular channel spaced apart from one another, the first annular channel in fluid communication with the intake port of the combustion cylinder and the second annular channel in fluid communication with the exhaust port of the combustion cylinder.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; further comprising: a second combustion cylinder having a first end and a second end, the second combustion cylinder defined along the center cylinder axis so as to be axially aligned with the first combustion cylinder; a third piston assembly disposed in the first cylinder end of the second combustion cylinder; and an opposing fourth piston assembly disposed in the second cylinder end of the second combustion cylinder.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; further comprising two or more combustion cylinders axially aligned along the central cylinder axis, each combustion cylinder having a first end and a second end with a piston assembly disposed in each cylinder end so that piston heads of the piston assemblies of a cylinder oppose one another within the cylinder.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; wherein the combustion cylinder further comprises a cylinder wall and the exhaust port comprises a plurality of exhaust slots formed in the cylinder wall between the fuel injector and the second end, each exhaust slot extending along a slot axis generally parallel with the central cylinder axis, the intake port comprising a plurality of intake slots formed in the cylinder wall between the fuel injector and the first end, each intake slot extending along a slot axis generally diagonal with the central cylinder axis.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; further comprising at least one annular flow manifold extending at least partially around the driveshaft, the annular flow manifold fluidically connecting the ports of two or more combustion cylinders.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; further comprising an annular intake manifold extending at least partially around the driveshaft and fluidically connecting the intake ports of two or more combustion cylinders; and an annular exhaust manifold extending at least partially around the driveshaft, spaced axially apart from the annular intake manifold, the annular exhaust manifold fluidically connecting the exhaust ports of two or more combustion cylinders.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; further comprising an engine block in which the driveshaft and combustion cylinder are supported, the engine block extends between a first end and a second end and includes an annular body portion therebetween, which annular body portion is characterized by an exterior surface and in which is formed a first annular channel and a second annular channel spaced apart from one another, the first annular channel in fluid communication with the intake port of the combustion cylinder and the second annular channel in fluid communication with the exhaust port of the combustion cylinder.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; wherein the first cam comprises a hub mounted on driveshaft with the circumferential shoulder extending around a periphery of hub, the curvilinear shaped first cam shoulder has at least two peaks and at least two troughs formed by the shoulder, wherein each trough includes a substantially flat portion at its base and wherein each peak is rounded at its apex; the second cam comprises a hub mounted on driveshaft with the circumferential shoulder extending around a periphery of hub, the curvilinear shaped second cam shoulder has at least two crests and at least two troughs formed by the shoulder and corresponding in number to the crests and troughs of the first cam, wherein each trough of the second cam is rounded at its base and wherein each peak includes a substantially flat portion at its apex.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; wherein the first cam comprises a hub mounted on driveshaft with the circumferential shoulder extending around a periphery of hub, the curvilinear shaped first cam shoulder has at least two peaks having a first peak amplitude and at least two troughs having a first trough amplitude, wherein the first trough amplitude is less than the first peak amplitude; and the second cam comprises a hub mounted on driveshaft with the circumferential shoulder extending around a periphery of hub, the curvilinear shaped second cam shoulder has at least two peaks having a second peak amplitude and at least two troughs having a second trough amplitude, wherein the second trough amplitude is greater than the second peak amplitude.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; wherein the piston assembly comprises a piston arm having a first annular body of a piston arm diameter spaced apart from a second annular body having a similar piston arm diameter and interconnected by a smaller diameter neck, with a piston attached to the first annular body and a cam follower attached to the second annular body.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; wherein the piston assembly comprises a piston arm having a first end and a second end, with a piston attached to the first end of the piston arm and a cam follower assembly attached to the second end of the piston arm, wherein the cam follower assembly includes an elongated structure having a first end and a second end, wherein the elongated structure is generally cylindrically shaped at each end, which ends are interconnected by an arm within which is formed a lubrication passage extending along a portion of the length of the arm between the two ends, the elongated structure having an axially extending first slot in formed in the body adjacent the first end and an axially extending second slot formed in the body adjacent the second; a first roller mounted to the body in the first slot; and a second roller mounted to the body in the second slot, wherein the lubrication passage extends in the arm between the two rollers.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; comprising a first guidance cap positioned adjacent the first end of the driveshaft and a second guidance cap positioned adjacent the second end of the driveshaft.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; wherein the piston assembly comprises a piston arm having a first end and a second end, with a piston attached to the first end of the piston arm and a cam follower assembly attached to the second end of the piston arm, wherein the piston is formed of an annular body having a first end attached to piston arm and a second end, with a crown formed at the second end of the annular body, the crown having an indention formed in an outwardly facing crown surface.

A driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is extended in the combustion chamber away from its corresponding cam and an outer dead center position in which the piston assembly is retracted in the combustion chamber away from the inner dead center position; at least one fuel injector disposed adjacent the center of the combustion cylinder and in communication with said combustion chamber; further comprising: a second combustion cylinder having a first end and a second end and defined along second center cylinder axis parallel with the first combustion cylinder central axis but radially spaced outward from the first combustion cylinder central axis; a third cam mounted on the driveshaft between the first cam and the first driveshaft end, the third cam having a circumferential shoulder of a third cam diameter and a third curvilinear shape with a third frequency, the third cam diameter being larger than the first cam diameter; a fourth cam mounted on the driveshaft between the second cam and the second end of the driveshaft, the fourth cam having a circumferential shoulder of a fourth curvilinear shape which fourth curvilinear shape has the same frequency as the third curvilinear shape.

A third hydraulic passage extending along the driveshaft to a third outlet and a fourth hydraulic passage extending along the driveshaft to a fourth outlet spaced apart from the third outlet; a combustion chamber coaxial with the piston axis and in which the first piston reciprocates; a second piston disposed to reciprocate within the piston chamber opposite the first piston; a third collar formed along the driveshaft adjacent the third outlet and a fourth collar formed along the driveshaft adjacent the fourth outlet, each collar extending radially outward from driveshaft; and a second cam rotatably mounted on the driveshaft adjacent the second and third collars, the second cam having a second hub having a first end mounted adjacent the third collar so as to form a third pressure chamber between the second hub first end and the third collar, with the third outlet in fluid communication with the third pressure chamber, the second hub having a second end mounted adjacent the fourth collar so as to form a fourth pressure chamber between the second hub second end and the fourth collar, with the fourth outlet in fluid communication with fourth pressure chamber, with a circumferential cam shoulder extending around a periphery of the second hub, the cam shoulder having a second cam diameter and a second polynomial shaped track.

Aa third hydraulic passage extending along the driveshaft and a fourth hydraulic passage extending along the driveshaft, a third set of radial passages in fluid communication with the third hydraulic passage and a fourth set of radial passages in fluid communication with the fourth hydraulic passage; a combustion chamber coaxial with the piston axis and in which the first piston reciprocates; a second piston disposed to reciprocate within the piston chamber opposite the first piston; a second cam rotatably mounted on the driveshaft spaced apart from the first cam, the first cam having a second hub with a circumferential cam shoulder extending around a periphery of the second hub, the second cam shoulder having a second cam diameter and a second polynomial shaped track; a third radially extending lug formed along the driveshaft adjacent the second cam hub and a fourth radially extending lug formed along the driveshaft adjacent the second cam hub, a radial passage of the of radial passages terminating in a first ported lug outlet formed in the third lug and a radial passage of of radial passages terminating in a second ported lug outlet formed in the third lug, a radial passage of the third set of radial passages terminating in a third ported lug outlet formed in the fourth lug and a radial passage of the fourth set of radial passages terminating in a fourth ported lug outlet formed in the fourth lug; a first pressure chamber formed between the third lug and the second cam hub and a second pressure chamber formed between the fourth lug and the second cam hub, the first ported lug outlet in the third lug in fluid communication with the first pressure chamber and the third ported lug outlet in the third lug in fluid communication with the second pressure chamber; a third pressure chamber formed between the third lug and the second cam hub; and a fourth pressure chamber formed between the fourth lug and the second cam hub, the second ported lug outlet of the fourth lug in fluid communication with the third pressure chamber and the fourth ported lug outlet in the fourth lug in fluid communication with the fourth pressure chamber.

The first hub comprises a hub wall having spaced apart first and second slots formed along an inner circumference of the hub wall, wherein the first lug extends into the first slot and the second lug extends into the second slot.

The first slot has a first shoulder and a second shoulder, the first pressure chamber being formed between the first shoulder and the first lug and the second pressure chamber being formed between the second shoulder and the first lug, wherein the second slot has a third shoulder and a fourth shoulder, the third pressure chamber being formed between the third shoulder and the second lug and the fourth pressure chamber being formed between the fourth shoulder and the second lug.

The first cam is rotatable relative to the driveshaft between a first radial position and a second radial position, wherein the first pressure chamber has a volume that is greater than a volume of the second pressure chamber when the first cam is in the first radial position and the second pressure chamber has a volume that is greater than the volume of the first pressure chamber when the first cam is in the second radial position.

A hydraulic fluid source in fluid communication with each of hydraulic passages to alternatively supply pressurized fluid to one pressure chamber or another pressure chamber.

A control mechanism and a sensor, the sensor disposed to measure a condition of the engine and coupled to the control mechanism disposed to adjust the fluid source based on the measured condition in order to radially rotate the first cam relative to the driveshaft.

Each lug is integrally formed as part of driveshaft.

The second frequency of the second cam is the same as the first frequency of the first cam.

The second cam is mounted on the spool.

The turbine is a compressor turbine.

The turbine is a drive turbine.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

The invention claimed is:

1. An aircraft engine comprising:
a hollow driveshaft having a first driveshaft end and a second driveshaft end and disposed along a driveshaft axis;
a spool coaxial with the driveshaft and extending along the driveshaft axis from a first spool end to a second spool end and passing through the driveshaft;
a first cam mounted on the driveshaft, the first cam having a circumferential shoulder of a first cam diameter and a first curvilinear shape with a first frequency;
a second cam disposed along a driveshaft axis and spaced apart from the first cam, the second cam having a circumferential shoulder of a second curvilinear shape which second curvilinear shape has a second frequency;
a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends;
a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder;
at least one fuel injector disposed within the combustion cylinder and in communication with said combustion chamber;
a turbine coaxially mounted on one of the driveshaft or the spool, wherein the turbine is a high-pressure compressor turbine mounted on the driveshaft adjacent the first driveshaft end; and
a drive turbine disposed along a driveshaft axis and a low-pressure compressor turbine mounted on spool adjacent the high-pressure compressor turbine.

2. The aircraft engine of claim 1, further comprising a fan mounted on the spool at the first spool end.

3. The aircraft engine of claim 1, further comprising a propeller mounted on the spool at the first spool end.

4. The aircraft engine of claim 1, wherein the drive turbine is mounted on the spool adjacent the second spool end and the second cam is mounted on the driveshaft adjacent the second driveshaft end.

5. The aircraft engine of claim 1, further comprising an engine core duct disposed about the first and second cams, the first combustion cylinder, the high-pressure compressor turbine, the drive turbine and the low-pressure compressor turbine, wherein the core duct extends from a first open end to a second open end, with the low-pressure compressor turbine disposed adjacent the first open end.

6. The aircraft engine of claim 5, further comprising an elongated nacelle having a first open end and a second open end and at least partially enclosing the core duct but spaced apart from the core duct to form an air flow annulus between core duct and the nacelle.

7. The aircraft engine of claim 6, further comprising a rotating component coaxially mounted on the first spool end adjacent the first open end of the nacelle.

8. The aircraft engine of claim 7, wherein the rotating component is selected from the group consisting of a propeller, a fan and a gear.

9. An aircraft engine comprising:
a hollow driveshaft having a first driveshaft end and a second driveshaft end and disposed along a driveshaft axis;
a spool coaxial with the driveshaft and extending along the driveshaft axis from a first spool end to a second spool end and passing through the driveshaft;
a first cam mounted on the driveshaft, the first cam having a circumferential shoulder of a first cam diameter and a first curvilinear shape with a first frequency;
a second cam mounted on the spool and spaced apart from the first cam, the second cam having a circumferential shoulder of a second curvilinear shape which second curvilinear shape has a second frequency;
a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends;
a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder;
at least one fuel injector disposed within the combustion cylinder and in communication with said combustion chamber; and
a turbine coaxially mounted on one of the driveshaft or the spool.

10. The aircraft engine of claim 9, wherein the turbine is a compressor turbine mounted on the driveshaft adjacent the first driveshaft end and wherein the
compressor turbine mounted on the driveshaft is a high-pressure compressor turbine, the aircraft engine further comprising a turbine mounted on the spool.

11. The aircraft engine of claim 10, wherein the turbine mounted on the spool is a low-pressure compressor turbine mounted adjacent the high-pressure compressor turbine.

12. The aircraft engine of claim 11, further comprising a rotating component coaxially mounted on the spool adjacent the first spool end; wherein the second cam is mounted on the spool adjacent the second spool end; and wherein the rotating component is selected from the group consisting of a propeller, a fan, a turbine and a gear.

13. The aircraft engine of claim 9, further comprising an engine core duct disposed about the first and second cams, the first combustion cylinder and the turbine, wherein the core duct extends from a first open end to a second open end, with an additional turbine disposed adjacent an open end of the core duct.

14. The aircraft engine of claim 13, further comprising an elongated nacelle having a first open end and a second open end and at least partially enclosing the core duct but spaced apart from the core duct to form an air flow annulus between core duct and the nacelle.

15. The aircraft engine of claim 10, wherein the turbine mounted on the spool is a drive turbine mounted on the spool adjacent the second spool end.

16. An aircraft engine comprising:
a hollow driveshaft having a first driveshaft end and a second driveshaft end and disposed along a driveshaft axis;
a spool coaxial with the driveshaft and extending along the driveshaft axis from a first spool end to a second spool end and passing through the driveshaft;
a first cam mounted on the driveshaft, the first cam having a circumferential shoulder of a first cam diameter and a first curvilinear shape with a first frequency;
a second cam mounted on the driveshaft and spaced apart from the first cam, the second cam having a circumferential shoulder of a second curvilinear shape which second curvilinear shape has a second frequency;
a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends;
a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder;
at least one fuel injector disposed within the combustion cylinder and in communication with said combustion chamber;
a compressor turbine mounted on the driveshaft adjacent the first driveshaft end;
a drive turbine mounted on the spool adjacent the second spool end; and
a rotating component coaxially mounted on the spool.

17. The aircraft engine of claim 16, further comprising a combustion air manifold extending between the compressor turbine and the intake port of the first combustion cylinder.

18. The aircraft engine of claim 17, further comprising an exhaust manifold extending from the exhaust port to the drive turbine.

19. The aircraft engine of claim 17, wherein the compressor turbine is a high-pressure compressor turbine, and further comprising a low-pressure compressor turbine mounted on the driveshaft between the high-pressure compressor turbine and the first driveshaft end.

20. The aircraft engine of claim 16, wherein the rotating component is selected from the group consisting of a propeller, a fan, a turbine and a gear.

21. The aircraft engine of claim 19, further comprising an engine core duct disposed about the first and second cams, the first combustion cylinder and the compressor turbine, wherein the core duct extends from a first open end to a second open end, with the low-pressure compressor turbine disposed adjacent the first open end; and an elongated nacelle having a first open end and a second open end and at least partially enclosing the core duct but spaced apart from the core duct to form an air flow annulus between core duct and the nacelle; with the rotating component adjacent the first open end of the nacelle.

22. An aircraft engine comprising:
- a driveshaft having a first driveshaft end and a second driveshaft end and disposed along a driveshaft axis;
- a first cam mounted on the driveshaft, the first cam having a circumferential shoulder of a first cam diameter and a first curvilinear shape with a first frequency;
- a second cam mounted on the driveshaft and spaced apart from the first cam, the second cam having a circumferential shoulder of a second curvilinear shape which second curvilinear shape has a second frequency;
- a first combustion cylinder defined along a center cylinder axis, the combustion cylinder having a first end and a second end with an intake port formed in the cylinder between the first and second ends and an exhaust port formed in the cylinder between the intake port and the second end, the center cylinder axis being parallel with but spaced apart from the driveshaft axis, wherein a combustion chamber is defined within the cylinder between the two cylinder ends;
- a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable within the combustion cylinder;
- at least one fuel injector disposed within the combustion cylinder and in communication with said combustion chamber;
- a compressor turbine mounted on the driveshaft between the first cam and the first driveshaft end;
- and a rotating component mounted on driveshaft adjacent the first driveshaft end;
- wherein the rotating component is selected from the group consisting of a propeller, a fan, a turbine and a gear.

23. The aircraft engine of claim 22, further comprising an elongated nacelle having a first open end and at least partially enclosing the first cam, the second cam and the first combustion cylinder, wherein the compressor turbine is adjacent the first open end of the elongated nacelle.

24. The aircraft engine of claim 22, further comprising a combustion air manifold extending between the compressor turbine and the intake port of the first combustion cylinder.

\* \* \* \* \*